(12) United States Patent
Yessuf

(10) Patent No.: US 11,686,424 B2
(45) Date of Patent: Jun. 27, 2023

(54) APPARATUS HAVING PLURALITY OF STANDS

(71) Applicant: Alebachew Yirga Yessuf, New Haven, CT (US)

(72) Inventor: Alebachew Yirga Yessuf, New Haven, CT (US)

( * ) Notice: Subject to any disclaimer, the term of this patent is extended or adjusted under 35 U.S.C. 154(b) by 0 days.

(21) Appl. No.: 16/816,445

(22) Filed: Mar. 12, 2020

(65) Prior Publication Data

US 2021/0285594 A1    Sep. 16, 2021

(51) Int. Cl.
| | |
|---|---|
| *F16M 11/00* | (2006.01) |
| *F21V 21/14* | (2006.01) |
| *A47G 7/04* | (2006.01) |
| *F21V 21/12* | (2006.01) |

(52) U.S. Cl.
CPC ............ *F16M 11/00* (2013.01); *A47G 7/041* (2013.01); *F21V 21/12* (2013.01); *F21V 21/14* (2013.01); *F16M 2200/06* (2013.01)

(58) Field of Classification Search
CPC .... F16M 11/00; F16M 2200/06; A47G 7/041; F21V 21/12; F21V 21/14
See application file for complete search history.

(56) References Cited

U.S. PATENT DOCUMENTS

| | | | | |
|---|---|---|---|---|
| 2,606,664 | A * | 8/1952 | Messick .................. | A47F 5/025 74/436 |
| 9,642,314 | B1 * | 5/2017 | Joseph .................... | A01G 9/249 |
| 2007/0113469 | A1 * | 5/2007 | Primozic ................. | A47G 7/041 47/41.01 |

FOREIGN PATENT DOCUMENTS

| | | | | |
|---|---|---|---|---|
| CN | 107095531 A | * | 8/2017 | ............ A47G 7/041 |
| CN | 108523558 A | * | 9/2018 | |
| CN | 108652347 A | * | 10/2018 | |
| CN | 108738860 A | * | 11/2018 | |
| CN | 108836043 A | * | 11/2018 | |
| CN | 209074001 U | * | 7/2019 | ............ A47G 7/041 |

(Continued)

OTHER PUBLICATIONS

Pipe and Drape online ceiling drape hanging hardware: archive.org screen capture date Mar. 21, 2019; 28 Inch and 20 Inch diameter aluminum ceiling drape ring (hoop) https://www.pipeanddrapeonline.com/Ceiling-Drape-Hanging-Hardware_c_90.html (Year: 2019).*

*Primary Examiner* — Terrell L McKinnon
*Assistant Examiner* — Ding Y Tan

(57) ABSTRACT

One embodiment of an apparatus having plurality of stands includes a central stand member 3600H at middle; a plurality of peripheral stand members including a plurality of peripheral stand members wherein each peripheral stand member 3700A further including a horizontally elongated stand 3701A fastened to the central stand member 3600H, and a plurality of peripheral stand members wherein each peripheral stand member 3716 further including the horizontally curved stand 3717 mounted between and fastened to one peripheral stand member 3700A at left and other peripheral stand member 3700A at right; and an electrical system 3800D being installed in the central stand member 3600H and in each peripheral stand member 3700A of the plurality of peripheral stand members for lighting plurality of light bulbs being mounted on plurality of peripheral stand members and for operating water fountain on top of the central stand member 3600H. Other embodiments are described and shown.

2 Claims, 38 Drawing Sheets

(56) References Cited

FOREIGN PATENT DOCUMENTS

| | | | | | |
|---|---|---|---|---|---|
| CN | 110150925 | A | * | 8/2019 | |
| CN | 209284797 | U | * | 8/2019 | |
| CN | 210520657 | A | * | 5/2020 | |
| CN | 210520657 | U | * | 5/2020 | |
| CN | 111466231 | A | * | 7/2020 | ............ A01G 27/00 |
| FR | 2766685 | A1 | * | 2/1999 | ............ A01G 9/023 |
| KR | 2006085730 | A1 | * | 7/2006 | |

* cited by examiner

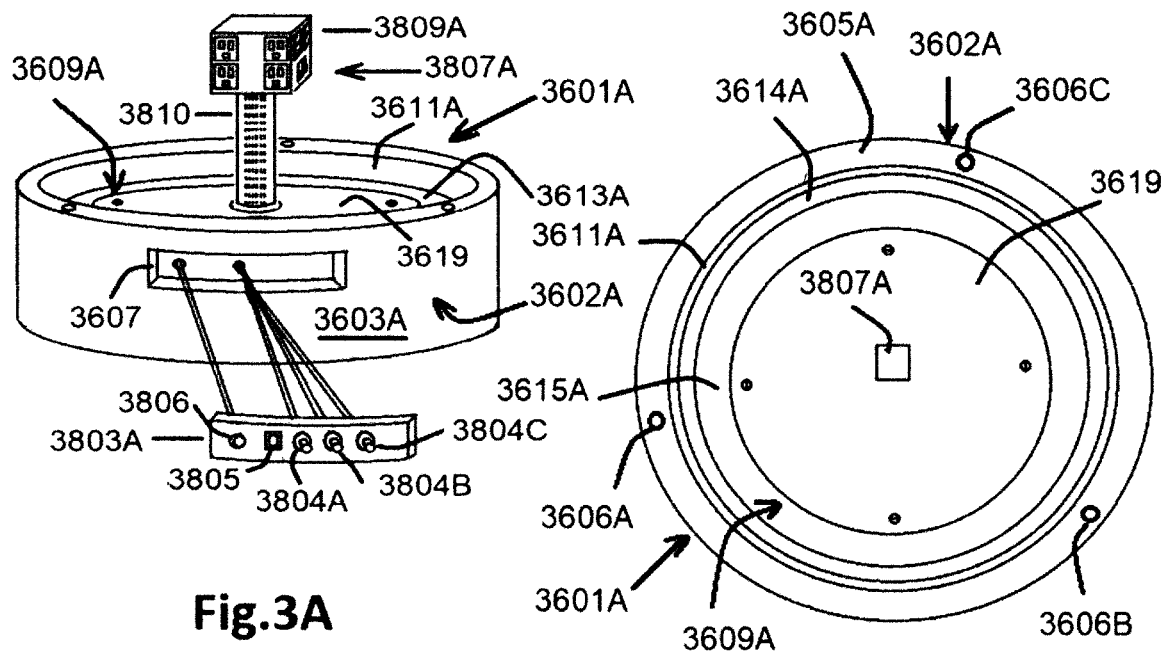
Fig.3A
Fig.3C
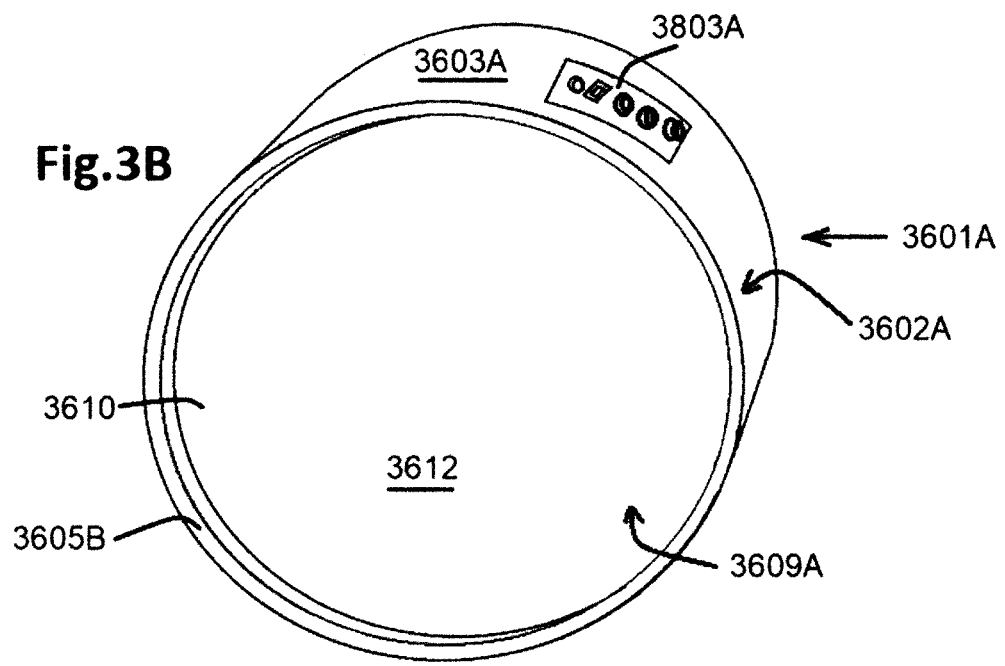
Fig.3B

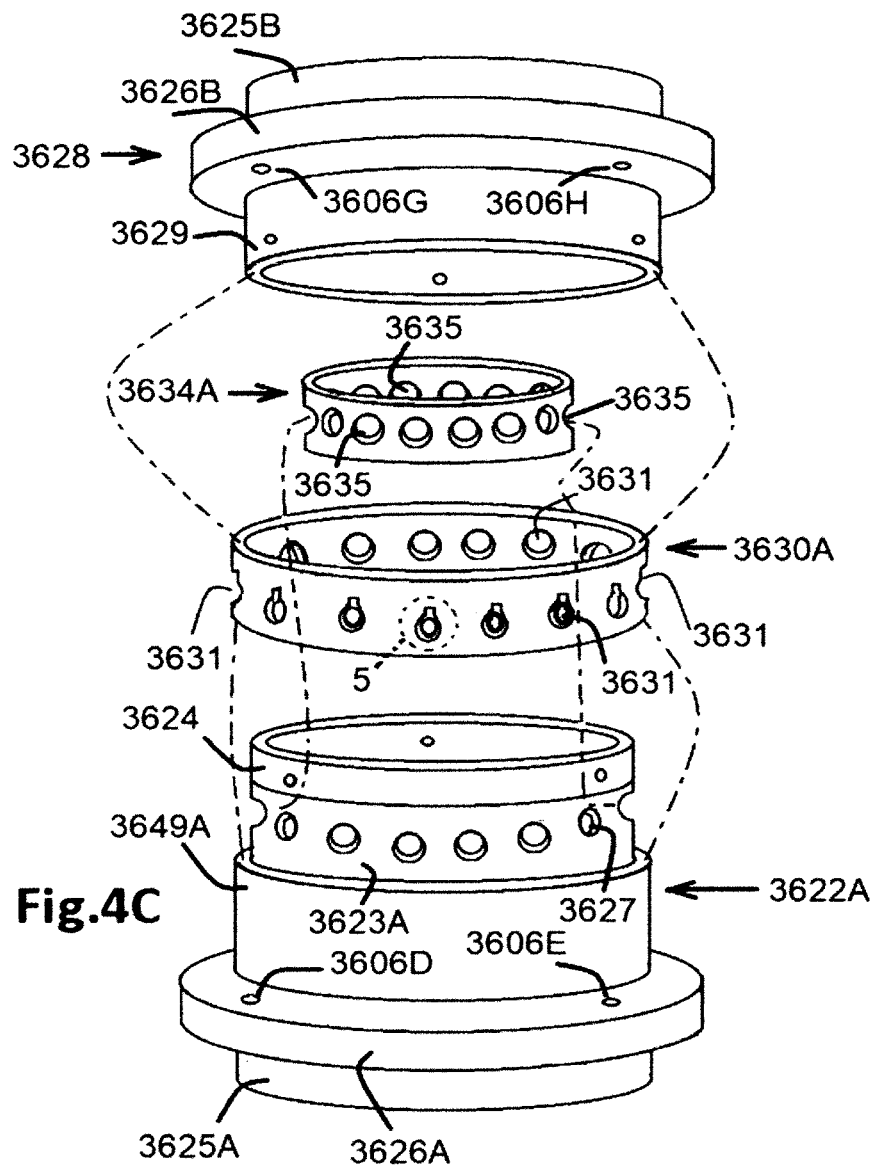
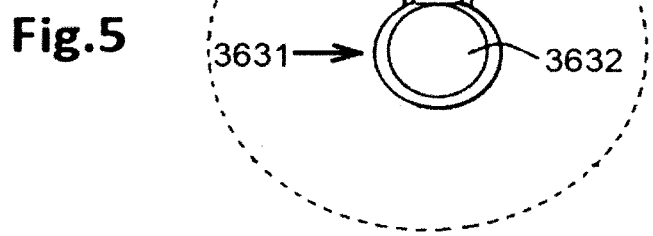
Fig.4C
Fig.5

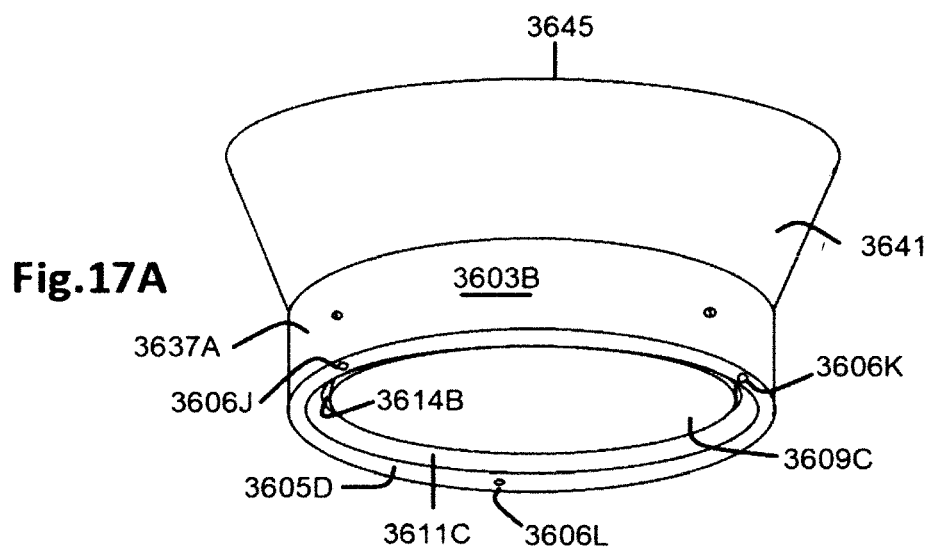
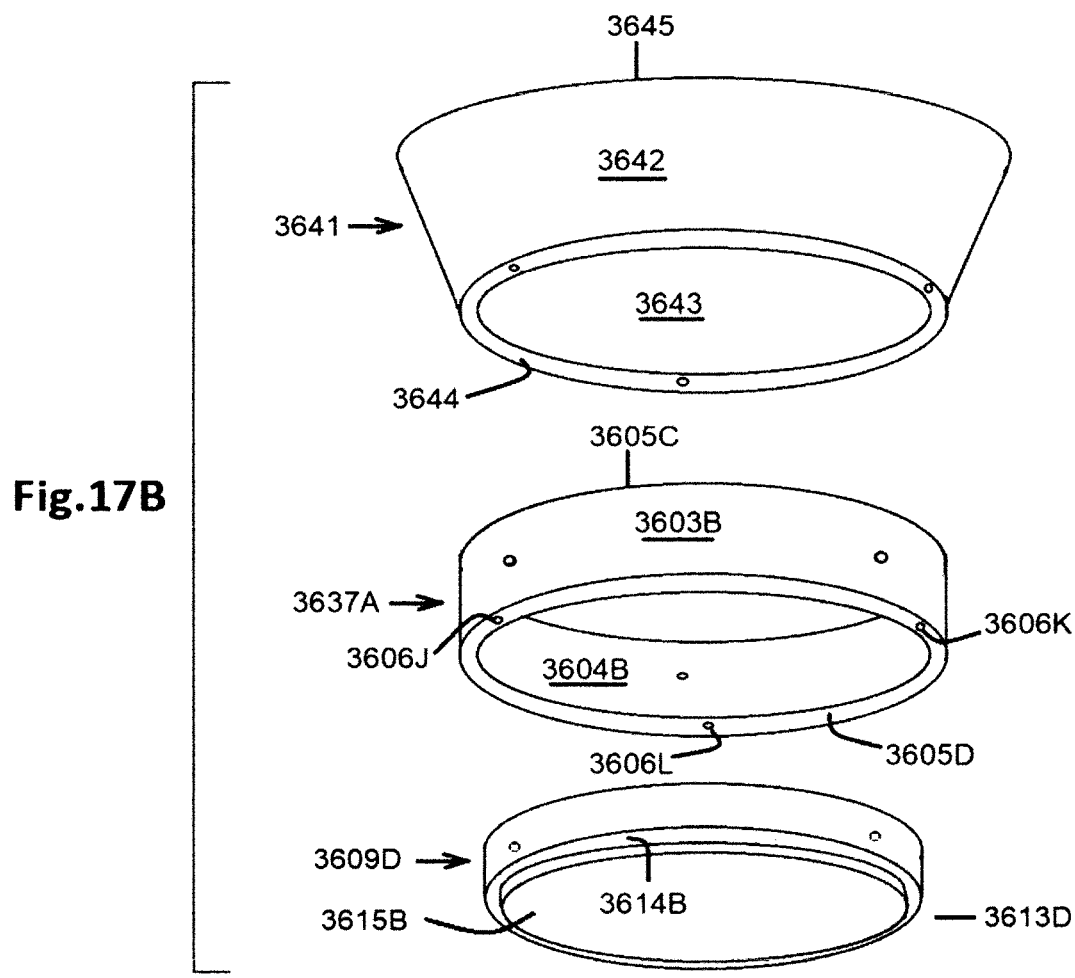

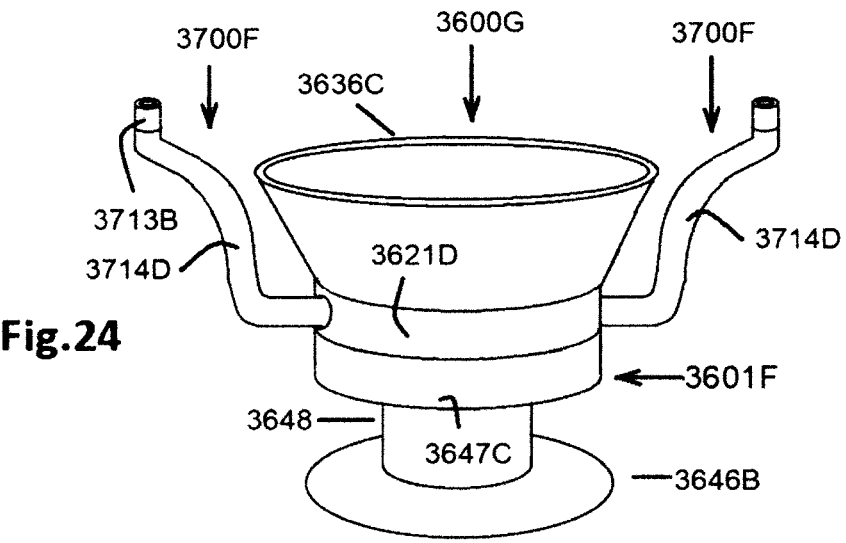
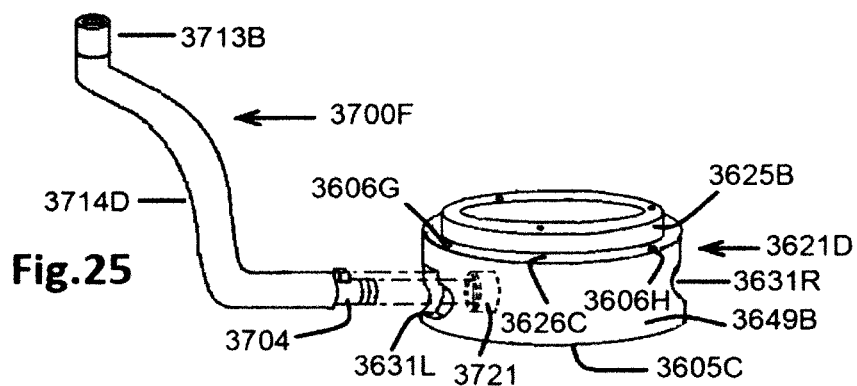
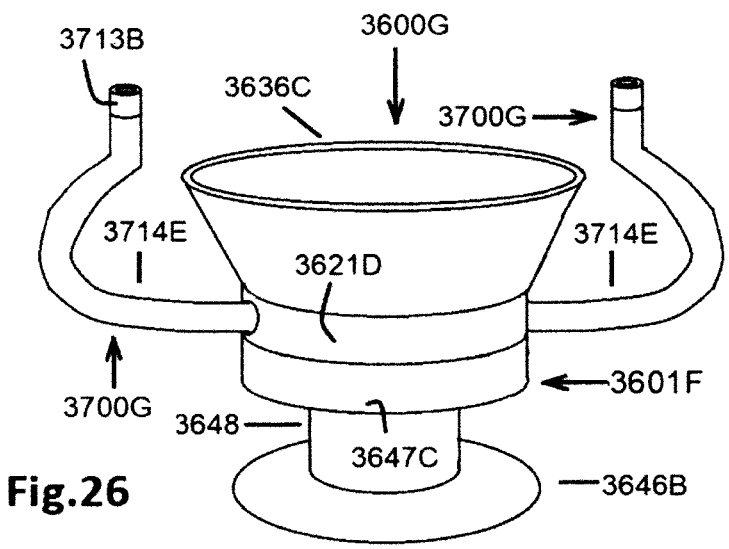

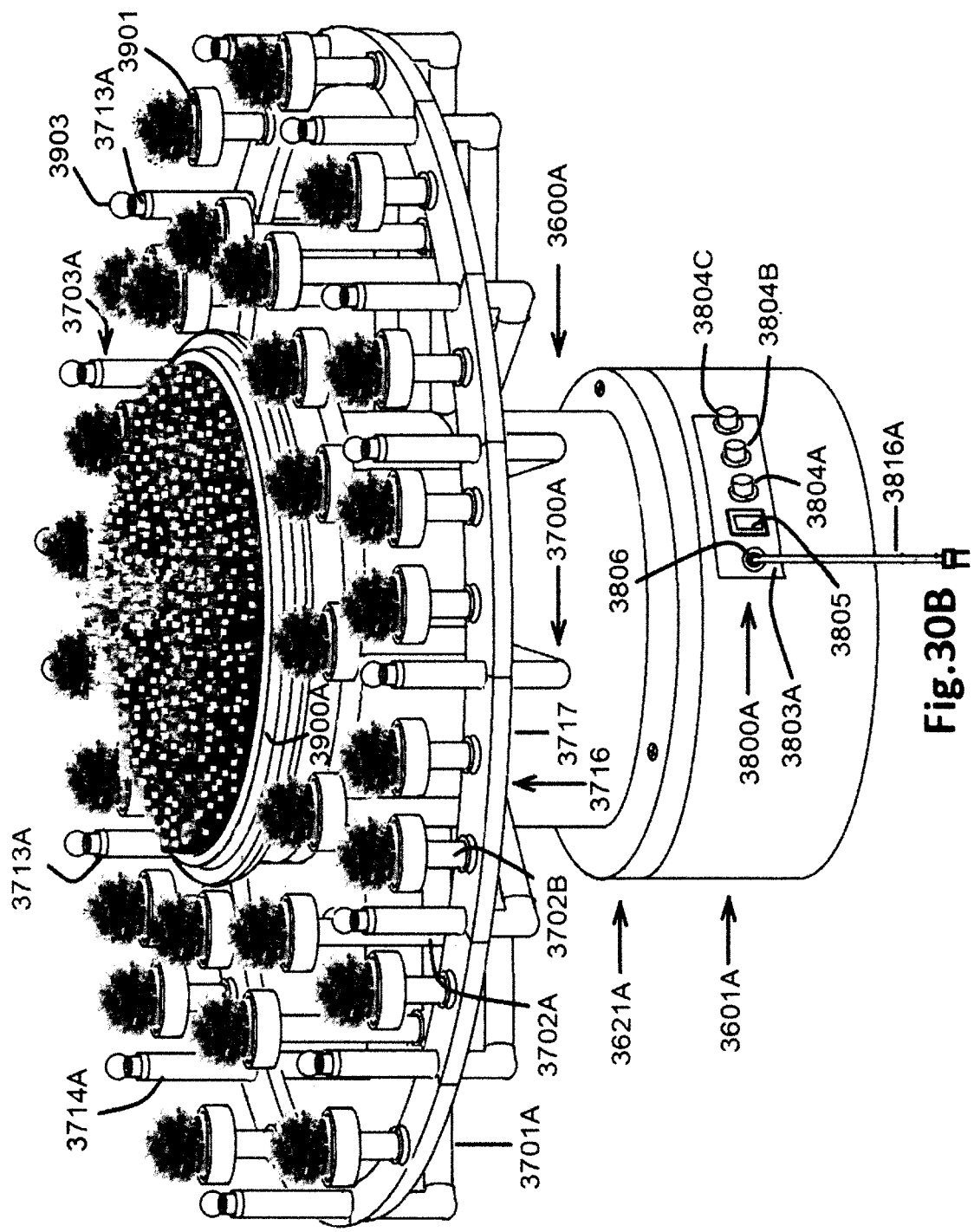

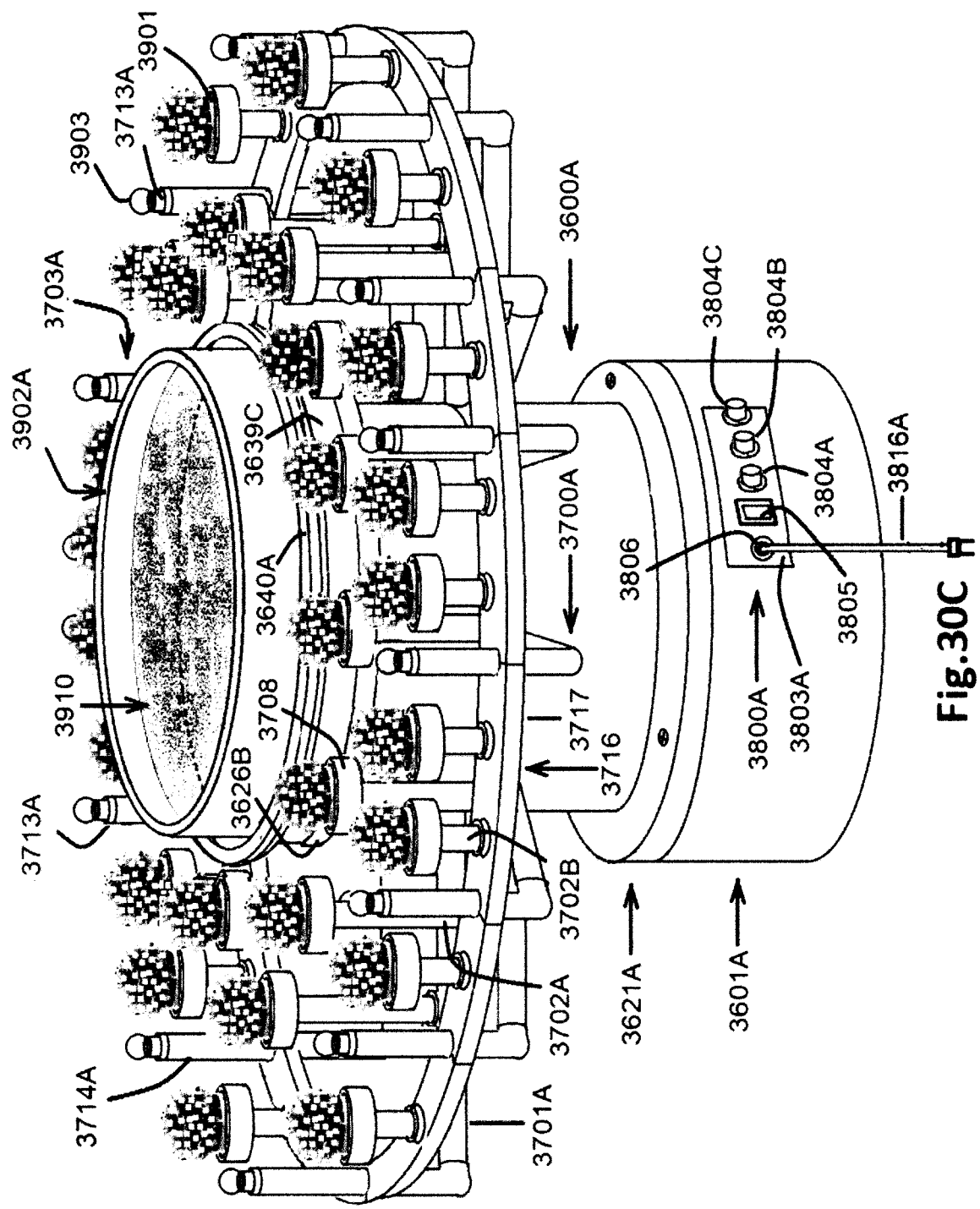

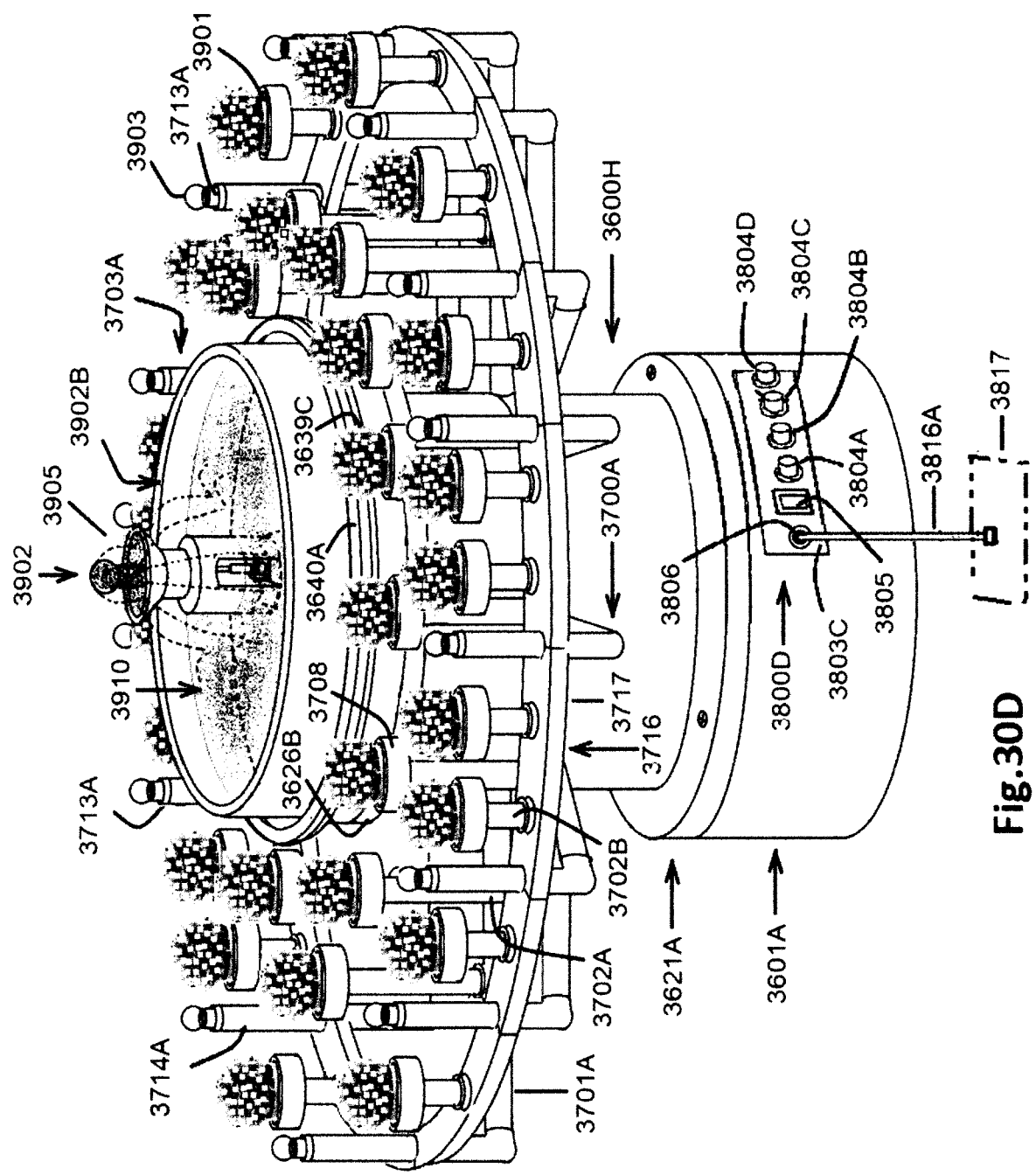

APPARATUS HAVING PLURALITY OF STANDS

BACKGROUND

A need for new alternative apparatuses having utility is natural. An apparatus having plurality of stands is a new alternative apparatus providing plurality of standing means for plurality of items such as objects of decoration.

For example, plurality of objects such as candles, light bulbs, flowerpots or water fountain be mounted or installed on plurality stands of an apparatus having plurality of stands thereby decorating floors and/or tables of indoor or outdoor places.

SUMMARY

An apparatus having plurality of stands includes a central stand member at the middle and a plurality of peripheral stand members being fastened to a central stand member.

Accordingly advantages of one or more aspects that an apparatus having plurality of stands can provide are: a flowerpot or plurality of flowerpots with flowers and a light bulb or plurality of light bulbs be mounted on plurality of stands; a ceremonial item holder such as a cake holder be placed and a flowerpot or plurality of flowerpots with flowers and a light bulb or plurality of light bulbs be mounted on plurality of stands; a flowerpot or plurality of flowerpots with flowers and a candle or plurality of candles be mounted on plurality of stands; a flowerpot or plurality of flowerpots with flowers, a light bulb or plurality of light bulbs, and a water fountain means for operating water fountain be mounted on plurality of stands; a flowerpot or plurality of flowerpots with flowers and a light bulb or plurality of light bulbs be mounted on plurality of stands of an apparatus wherein a peripheral table is configured; a flowerpot or plurality of flowerpots with flowers and a candle or plurality of candles be mounted on plurality of stands of an apparatus wherein a peripheral table is configured; a flowerpot or plurality of flowerpots with flowers, a light bulb or plurality of light bulbs, and a water fountain means for operating water fountain be mounted on plurality of stands of an apparatus wherein a peripheral table is configured; plurality of other decorative objects and/or nondecorative objects be mounted on plurality of stands; plurality of other decorative objects and/or nondecorative objects be mounted on plurality of stands of an apparatus wherein a peripheral table is configured. Other advantages of one or more aspects will be apparent from a consideration of the drawings and ensuing description.

BRIEF DESCRIPTION OF DRAWINGS

FIGS. 1 to 31B show various embodiments of an apparatus having plurality of stands, and components and/or parts thereof.

FIG. 1 shows front perspective from top view of an apparatus having plurality of stands in accordance with embodiment one.

FIG. 3A shows front perspective from top view of a supporting base element of the central stand member in accordance with embodiment one wherein parts of an electric system being mounted.

FIG. 3B shows bottom perspective from front view of the supporting base element of the central stand member in accordance with embodiment one wherein parts of the electric system being mounted.

FIG. 3C shows top perspective view of the supporting base element of the central stand member in accordance with embodiment one wherein parts of the electric system being mounted.

FIG. 4C shows exploded view of the middle element of the central stand member in accordance with embodiment one.

FIG. 5 shows enlarged outside view of a section of an outer belt of the middle element in accordance with embodiment one wherein a plugging hole being configured.

FIG. 8 shows detached views from top of the supporting base element, cutout right sections of parts of the middle element and the peripheral stand member having the horizontally elongated stand, in accordance with embodiment one, wherethrough parts of the electrical system being mounted and connected.

FIG. 11 shows outside perspective from top view of the peripheral stand member having horizontally curved stand being detached from a left vertically elongated stand of light bulb at left and a right vertically elongated stand of light bulb at right.

FIG. 12 shows front perspective from top view of an apparatus having plurality of stands in accordance with embodiment two.

FIG. 13A shows top perspective view of a supporting base element of a central stand member in accordance with embodiment two.

FIG. 13B shows exploded view of the supporting base element of the central stand member in accordance with embodiment two.

FIG. 14 shows exploded view of a peripheral stand member having the horizontally elongated stand, in accordance with embodiment two.

FIG. 15 shows front perspective from top view of an apparatus having plurality of stands in accordance with embodiment three.

FIG. 16 shows exploded views of a middle element of a central stand member being detached from a horizontally elongated stand of a peripheral stand member wherethrough a cord of electric connection is mounted, in accordance with embodiment three.

FIG. 17A shows front perspective from bottom view of a top element of the central stand member in accordance with embodiment three.

FIG. 17B shows exploded view of the top element of the central stand member in accordance with embodiment three.

FIG. 18 shows front perspective from top view of an apparatus having plurality of stands in accordance with embodiment four.

FIG. 19 shows exploded view of a central stand member of the apparatus having plurality of stands being detached from a peripheral stand member, in accordance with embodiment four, wherethrough parts of an electrical system being mounted and connected.

FIG. 21 shows exploded view of a supporting base element of a central stand member in accordance with embodiment five wherein parts of an electrical system being mounted.

FIG. 22 shows front perspective from top view of an apparatus having plurality of stands in accordance with embodiment six.

FIG. 23 shows a supporting base element and a middle element of a central stand member in accordance with embodiment six being detached.

FIG. 24 shows front perspective from top view of an apparatus having plurality of stands in accordance with embodiment seven.

FIG. 25 shows front perspective from top left view of a middle element of a central stand member and a left peripheral stand member in accordance with embodiment seven being detached.

FIG. 26 shows front perspective from top view of an apparatus having plurality of stands in accordance with embodiment eight.

FIG. 27 shows front perspective from top view of an apparatus having plurality stands in accordance with embodiment nine.

FIG. 28 shows a supporting base element and an upper part of a middle element of a central stand member of the apparatus having plurality of stands in accordance with embodiment nine wherethrough parts of an electrical system being mounted and connected.

FIG. 29 shows exploded view of a top element of the central stand member of the apparatus having plurality stands in accordance with embodiment nine wherethrough parts of the electrical system being mounted and connected.

FIG. 30B shows front perspective from top view of the apparatus having plurality of stands in accordance with embodiment one wherein a flowerpot having flowers being mounted on the top element of the central stand member, and plurality of mini plant pots having plants and plurality of light bulbs being mounted on plurality of vertically elongated stands of peripheral members.

FIG. 30C shows front perspective from top view of the apparatus having plurality of stands in accordance with embodiment one wherein a water bowl being mounted on the top element of the central stand member, and plurality of mini flowerpots having flowers and plurality of light bulbs being mounted on plurality of vertically elongated stands of peripheral members.

FIG. 30D shows front perspective from top view of the apparatus having plurality of stands in accordance with embodiment nine wherein the top element being filled with water and a water fountain being operated, and plurality of mini flowerpots having flowers and plurality of light bulbs being mounted on plurality of vertically elongated stands of peripheral members.

FIG. 31B shows front perspective from top view as the apparatus having plurality of stands in accordance with embodiment four being on a table; and a plant pot having plants being mounted on the top element of the central stand member; two light bulbs of which one light bulb being mounted on a left peripheral stand member, and another light bulb being mounted on a right peripheral stand member; and two candles of which one candle being mounted on a front peripheral stand member, and another candle being mounted on a rear peripheral stand member.

FIG. 32 shows front perspective from top view of the apparatus having plurality of stands wherein the peripheral table is configured in accordance with one embodiment.

FIG. 33 shows front perspective from top view of an apparatus having plurality of stands of the apparatus having plurality of stands wherein the peripheral table is configured in accordance with one embodiment.

FIG. 34 shows detached views of table legs and table top parts of a peripheral table of the apparatus having plurality of stands wherein the peripheral table is configured; and table top holders fastened to vertically elongated stands of peripheral stand members of the apparatus having plurality of stands.

FIG. 35 shows front perspective from top view of the apparatus having plurality of stands wherein the peripheral table is configured in accordance with one embodiment, wherein the top element of the apparatus having plurality of stands being filled with water and a water fountain being operated, and plurality of mini flowerpots having flowers and plurality of light bulbs being mounted on plurality of vertically elongated stands of peripheral stand members of the apparatus having plurality of stands.

Figure 1:
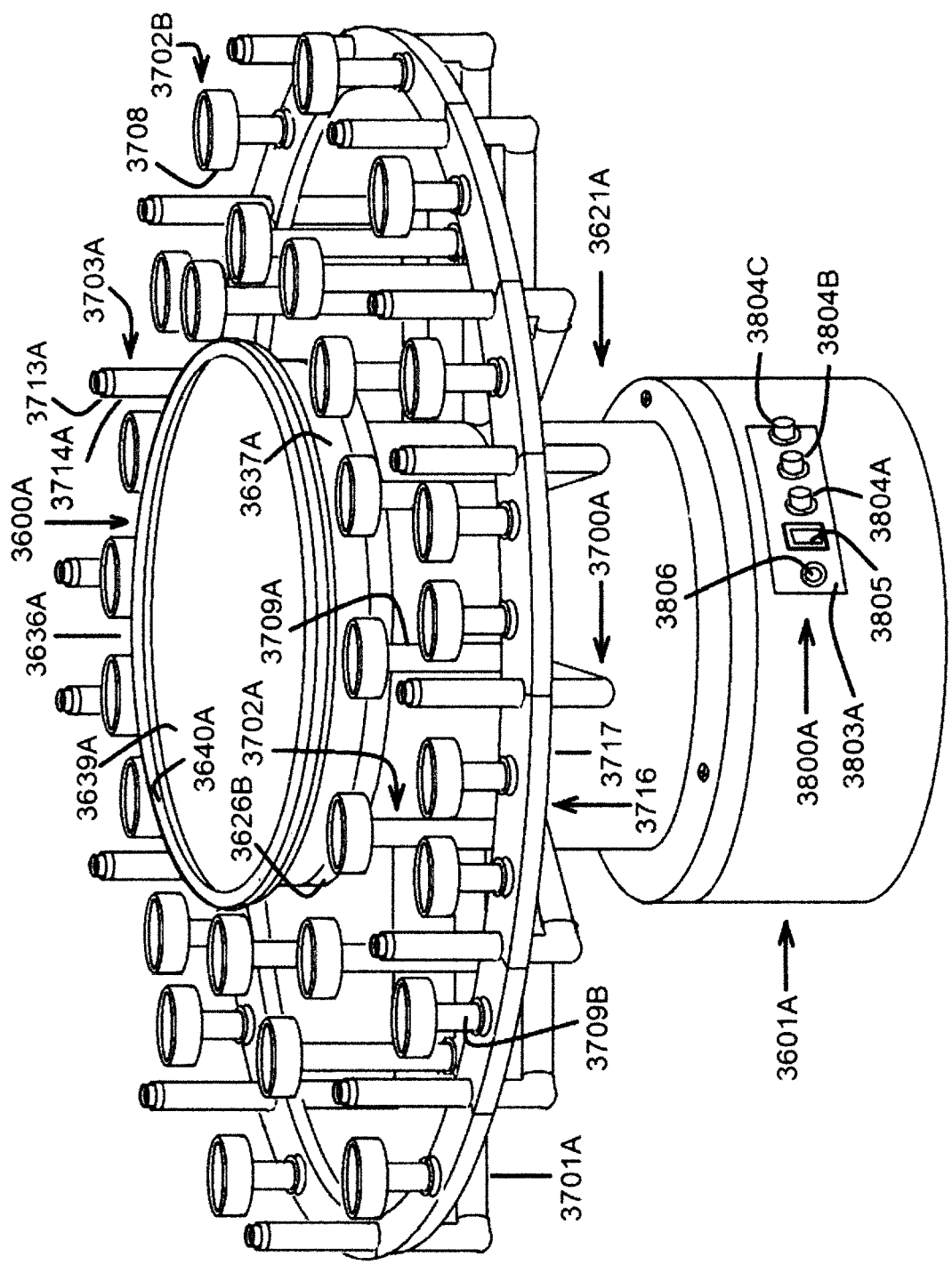

It is to be noted that the drawing Figures presented are intended solely for the purpose of illustration and that they are, therefore, neither desired nor intended to limit the subject matter of the claimed to any or all of the exact details of construction shown, except insofar as they may be deemed essential to that which is claimed.

DETAILED DESCRIPTION

This detailed description section has two sub sections. A first sub section of the detailed description deals with an apparatus having plurality of stands. Some embodiments of various embodiments detailed in this section are illustrated from FIGS. 1 to 31B. Finally this sub section will conclude the specificities and/or exemplifications of the embodiments described, will deal ramifications therefrom.

A second sub section of the detailed description deals with an apparatus having plurality of stands wherein a peripheral table is configured, and after its conclusion and ramifications part, finalizes by describing the scope and by emphasizing possibility of many other variations with respect to both an apparatus having plurality of stands and an apparatus having plurality of stands wherein a peripheral table is configured.

The Apparatus Having Plurality of Stands

The apparatus having plurality of stands has various embodiments. Embodiments having features detailed below from embodiment one to embodiment nine are among the various embodiments of the apparatus having plurality of stands.

Embodiment One

Embodiment one of the apparatus having plurality of stands is illustrated in FIG. 1. The apparatus having plurality of stands in accordance with embodiment one includes a central stand member 3600A at the middle; a plurality of peripheral stand members including a plurality of peripheral stand members wherein each peripheral stand member 3700A being illustrated in FIGS. 7A and 7B further including a horizontally elongated stand 3701A fastened to the central stand member 3600A, and a plurality of peripheral stand members wherein each peripheral stand member 3716 being illustrated in FIGS. 9A and 9B further including a horizontally curved stand 3717 mounted between and fastened to one peripheral stand member 3700A at left and other peripheral stand member 3700A at right; and an electrical system 3800A being installed in the central stand member 3600A and in the plurality of peripheral stand members wherein each peripheral stand member 3700A including the horizontally elongated stand 3701A.

For further illustration of components and/or detail parts in embodiment one see FIGS. 2A to 11. And the manner of using and operating in accordance with embodiment one is illustrated from FIGS. 30A to 30C.

The Central Stand Member 3600A

Figure 2A:
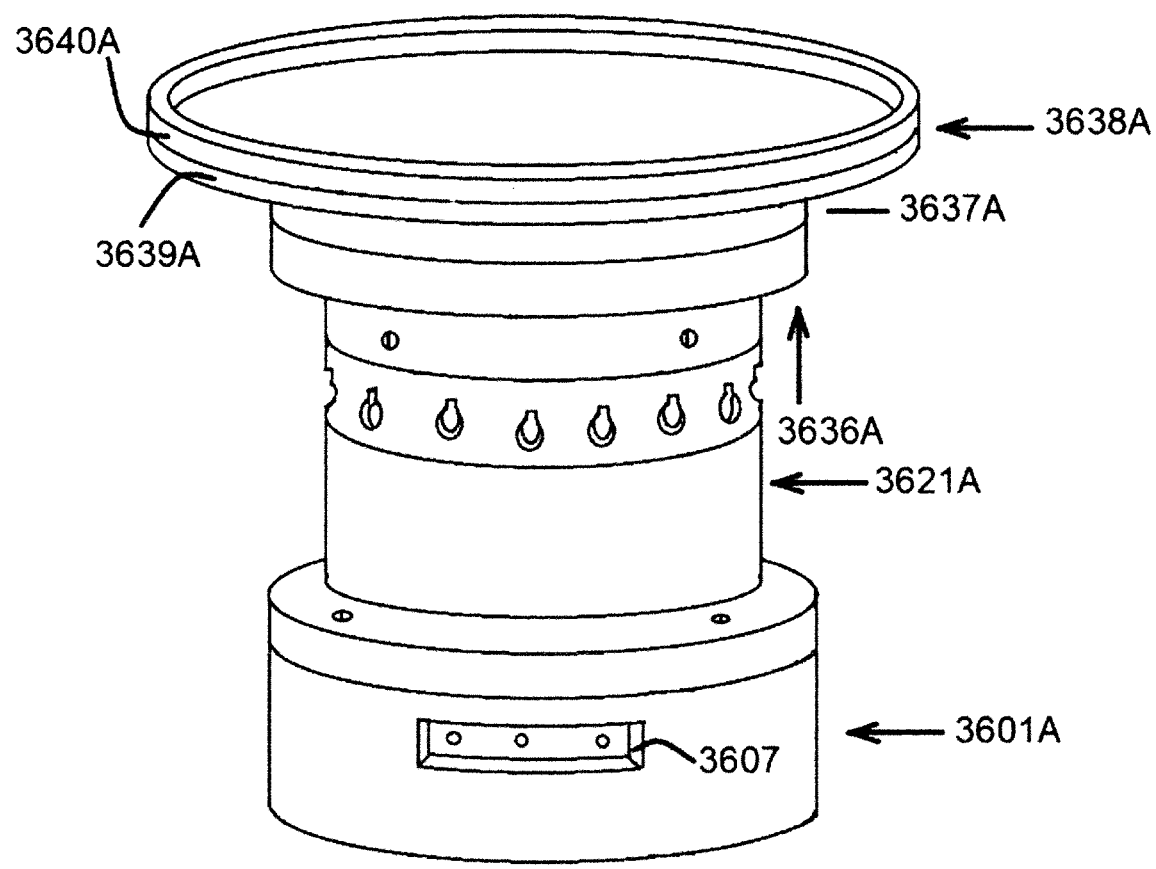
FIG. 2A shows front perspective from top view of a central stand member of the apparatus having plurality of stands in accordance with embodiment one.
Figure 2B:
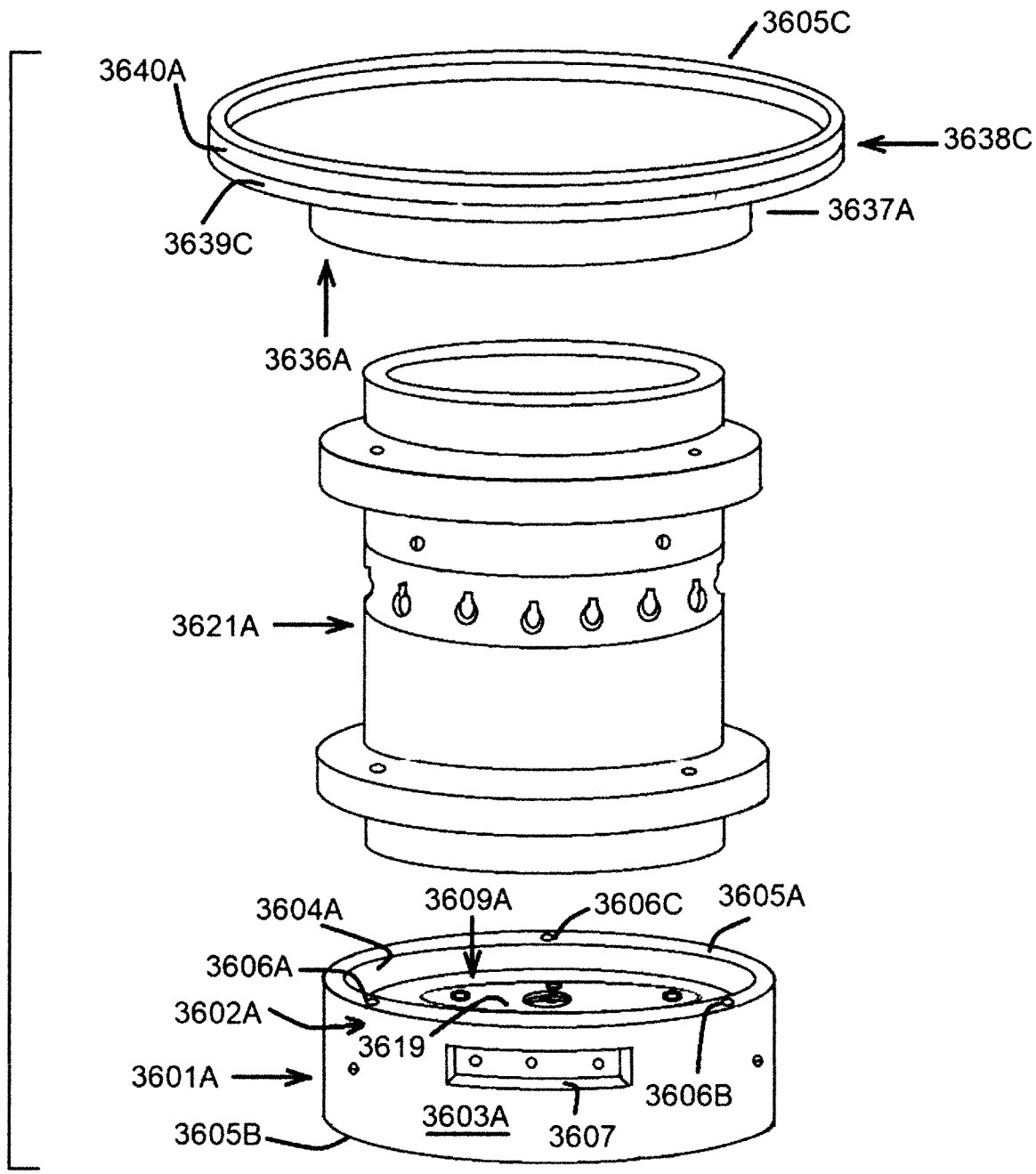
FIG. 2B shows exploded view of the central stand member of the apparatus having plurality of stands in accordance with embodiment one.

The central stand member 3600A is illustrated in FIGS. 2A and 2B. The central stand member 3600A includes a supporting base element 3601A for standing, a middle element 3621A mounted on the supporting base element 3601A, and a top element 3636A mounted on the middle element 3621A.

The supporting base element 3601A further includes a cylindrical component 3602A, another component 3609A mounted inside the cylindrical component 3602A, and a circular lid component 3619 fastened to top side of the component 3609A. The cylindrical component 3602A has outside vertical surface 3603A, inside vertical surface 3604A, a top circular edge 3605A having a surface wherein a screw hole 3606A, a screw hole 3606B and a screw hole 3606C being configured, a bottom circular edge 3605B to stand, a hole 3607 being configured on the outside vertical surface 3603A for mounting a power connector board 3803A, and a hollow space 3608 from top to bottom. FIGS. 3A to 3D show different views of the supporting base element 3601A wherein parts of the electric system 3800A being installed.

The component 3609A is mounted inside the cylindrical component 3602A being fastened to inside vertical surface 3604A with screws thereby the supporting base element 3601A has opened down base 3610 below the component 3609A and plugging feature 3611A above the component 3609A. The component 3609A has a bottom surface 3612A to the side of the opened down base 3610, and a top 3613A to the side of the plugging feature 3611A wherein a peripheral circular feature 3614A for mounting the middle element 3621A being configured. At the middle of the peripheral circular feature 3614A another circular feature 3615A wherein the feature to be fastened to the circular lid 3619 and a circular compartment 3616A are configured. A hole 3617 is configured between the circular compartment 3616A and an outside vertical surface 3618 of component 3609A to mount plurality of electrical connection bundles of wires connected to the power connector board 3803A at one side and to an electrical connection device 3807A at another side. The circular feature 3615A has a circular lid 3619 having a hole 3620 at center wherein the power divider 3807A is mounted.

Figure 4A:
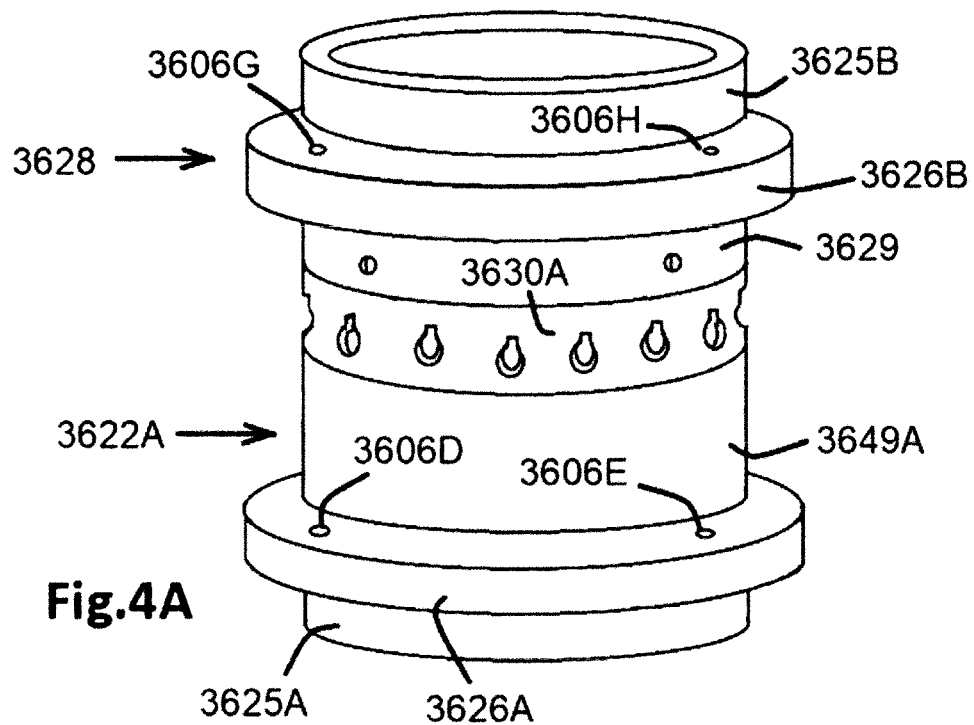
FIG. 4A shows front perspective from top view of a middle element of the central stand member in accordance with embodiment one.
Figure 4B:
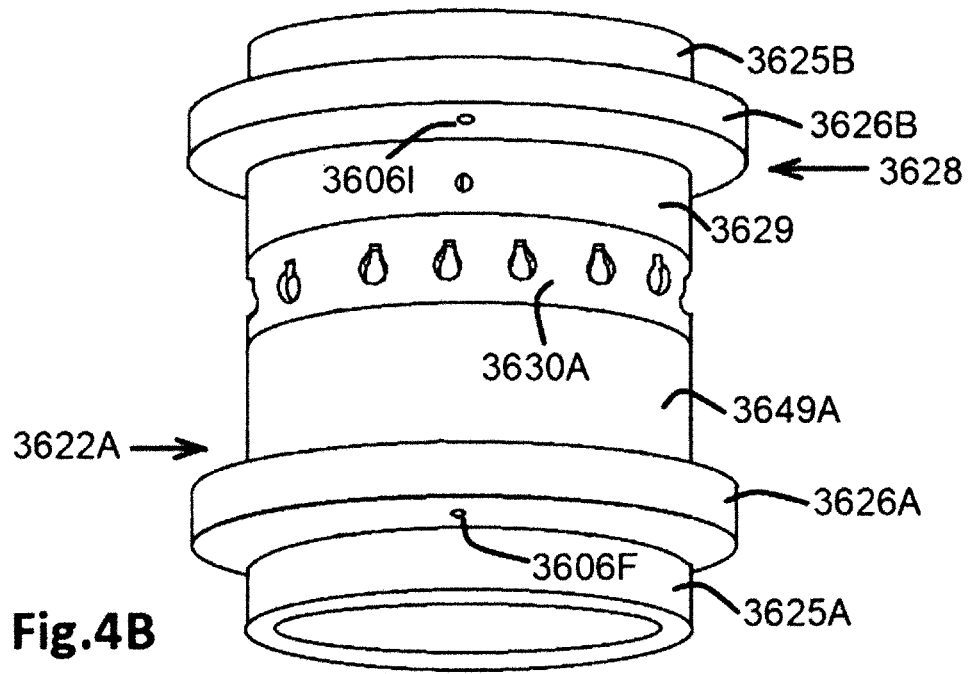
FIG. 4B shows front perspective from bottom view of the middle element of the central stand member in accordance with embodiment one.

The middle element 3621A is illustrated from FIGS. 4A to 4C. The middle element 3621A includes a lower part 3622A, an outer belt 3630A, an inner belt 3634A, and an upper part 3628.

The lower part 3622A has a belt mounting section 3623A; an upper part mounting section 3624 above the belt mounting section 3623A; a lower plugging part 3625A plugged into the opened up plugging feature 3611A of the supporting base member 3602A; a lower circular curb 3626A having a screw hole 3606D, a screw hole 3606E, and a screw hole 3606F being configured to be fastened with screws respectively to the screw hole 3606A, the screw hole 3606B, and the screw hole 3606C of the supporting base element 3602A; and a section 3649A between the belt mounting section 3623A and the lower circular curb 3626A. The belt mounting section 3623A of the lower part 3622A has plurality of plugging holes, each plugging hole 3627 of the plurality of plugging holes being configured to have circular feature.

The outer belt 3630A and the inner belt 3634A are mounted at the belt mounting section 3623A of the lower part 3622A. The upper part 3628 is mounted at the upper part mounting section 3624 of the lower part 3622A. The outer belt 3630A and the inner belt 3634A are mounted and fastened to the belt mounting section 3623A of the lower part 3622A in such a way that the belt mounting section 3623A of the lower part 3622A is between the outer belt 3630A and the inner belt 3634A, see FIG. 8. And a lower section 3629 of the upper part 3628 is mounted at the upper part mounting section 3624 of the lower part 3622A above the belt mounting section 3623A of the lower part 3622A.

The upper part 3628 has an upper plugging section 3625B plugged into an opened down plugging feature 3611B of the top element 3636A; and an upper circular curb 3626B having a screw hole 3606G, a screw hole 3606H, and a screw hole 3606I being configured to be fastened with screws to the top element 3636A. Below the upper circular curb 3626B is a lower section 3629 of the upper part 3628 being configured to be fastened to the upper part mounting section 3624 of the lower part 3622A above the belt mounting section 3623A of the lower part 3622A.

The outer belt 3630A has a plurality of plugging holes corresponding to the number of plugging holes of the belt mounting section 3623A of the lower part 3622A. Each plugging hole 3631 of the plurality of plugholes of the outer belt 3630A is configured to have a circular plugging hole feature 3632 and above the circular plugging hole feature 3632 a rectangular rotational movement curbing hole 3633.

The inner belt 3634A has a plurality of plugging holes corresponding to the number of plugging holes of the belt mounting section 3623A of the lower part 3622A. Each plugging hole 3635 of the plurality of plugging holes of the inner belt 3634A is configured to have a circular feature.

Figure 6A:
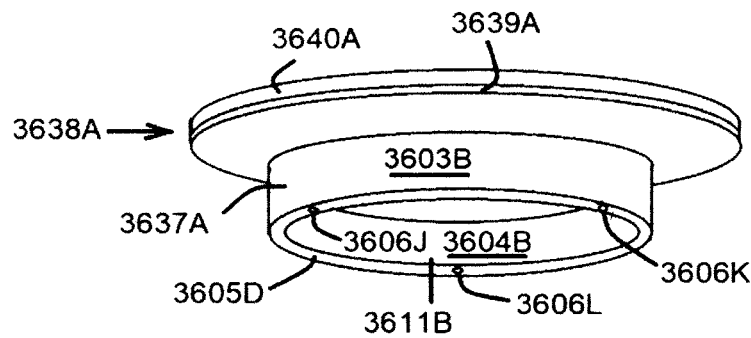
FIG. 6A shows front perspective from bottom view of a top element of the central stand member in accordance with embodiment one.
Figure 6B:
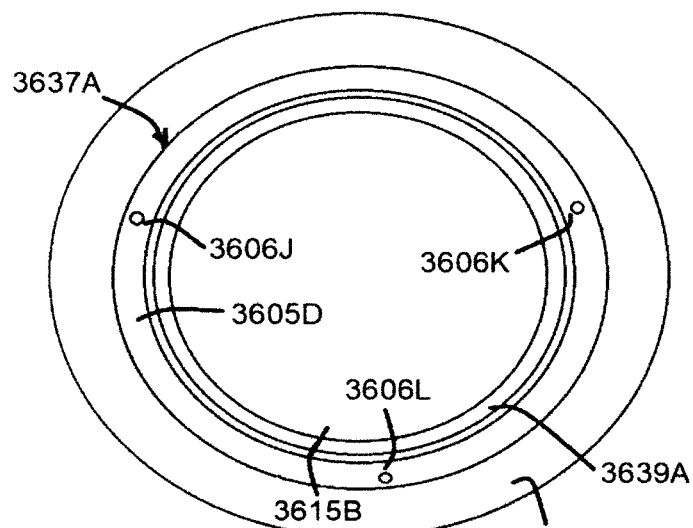
FIG. 6B shows bottom perspective view of the top element of the central stand member in accordance with embodiment one.
Figure 6C:
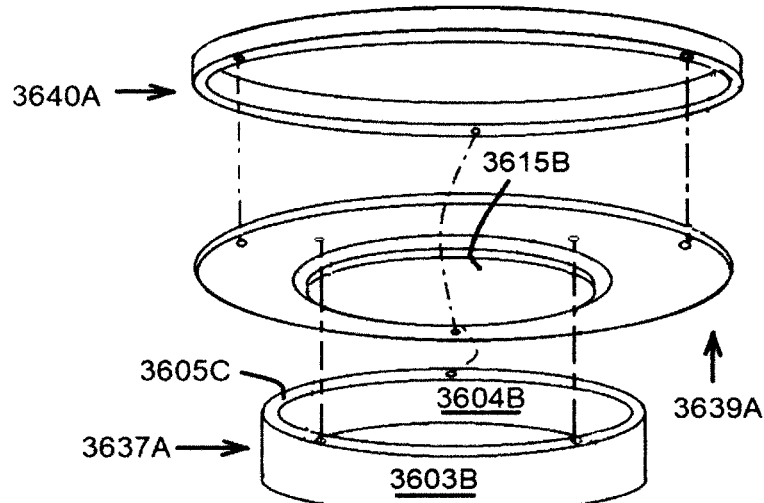
FIG. 6C shows exploded view of the top element of the central stand member in accordance with embodiment one.

The top element 3636A is illustrated from FIGS. 6A to 6C; and includes a cylindrical component 3637A, and a top component 3638A mounted on the cylindrical component 3637A. The cylindrical component 3637A has outside vertical surface 3603B; inside vertical surface 3604B; a top circular edge 3605C having a surface fastened to the top component 3638A; a bottom circular edge 3605D having a surface wherein a screw hole 3606J, a screw hole 3606K and a screw hole 3606L being configured to be fastened with screws respectively to the screw hole 3606G, the screw hole 3606H and the screw hole 3606I of the upper circular curb 3626B of the middle element 3621A.

The top component 3638A includes a circular subcomponent 3639A mounted horizontally on and fastened to the top circular edge 3605C of the cylindrical component 3637A and wherein to the side of the opened down plugging feature 3611B a circular feature 3615B being configured for mounting the upper plugging section 3625B of the middle element 3621A; and a cylindrical sub component 3640A mounted on top periphery of the circular sub component 3639A.

The Plurality of Peripheral Stand Members

Figure 7A:
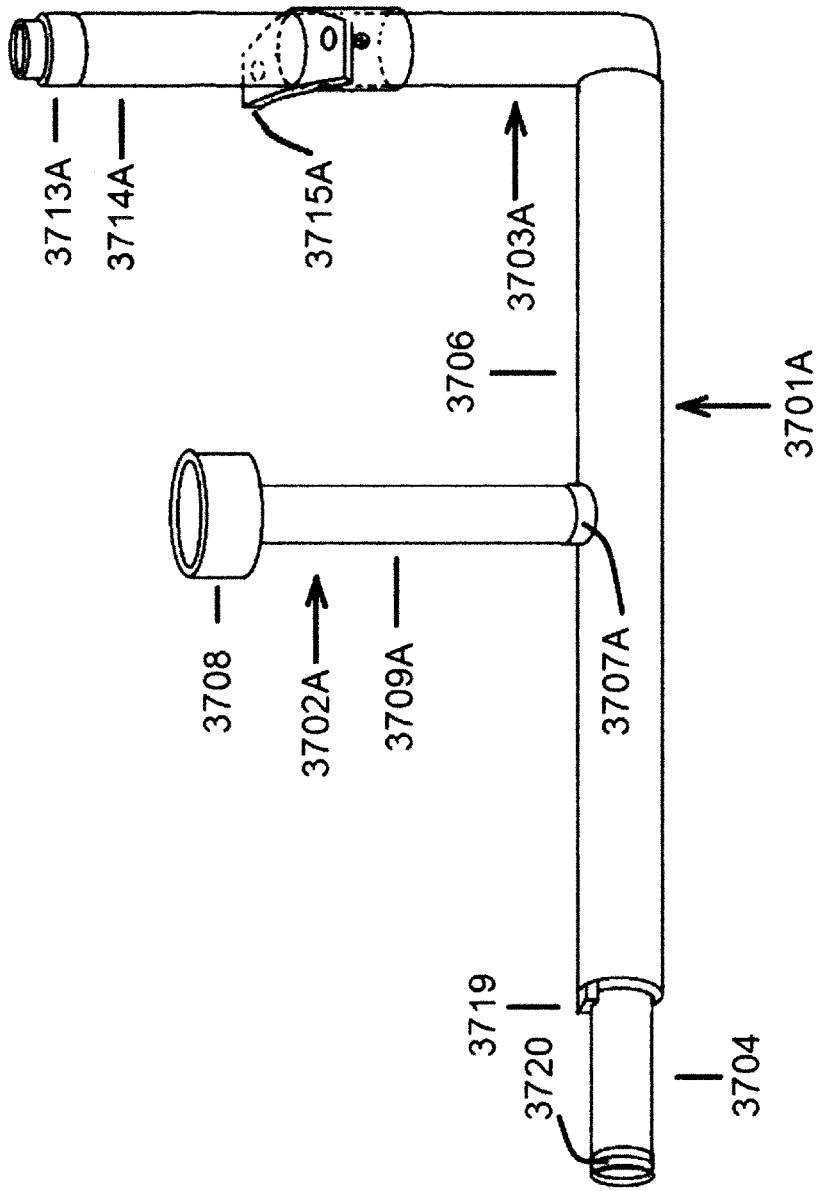
FIG. 7A shows top perspective from left view of a peripheral stand member having a horizontally elongated stand, in accordance with embodiment one.
Figure 7B:
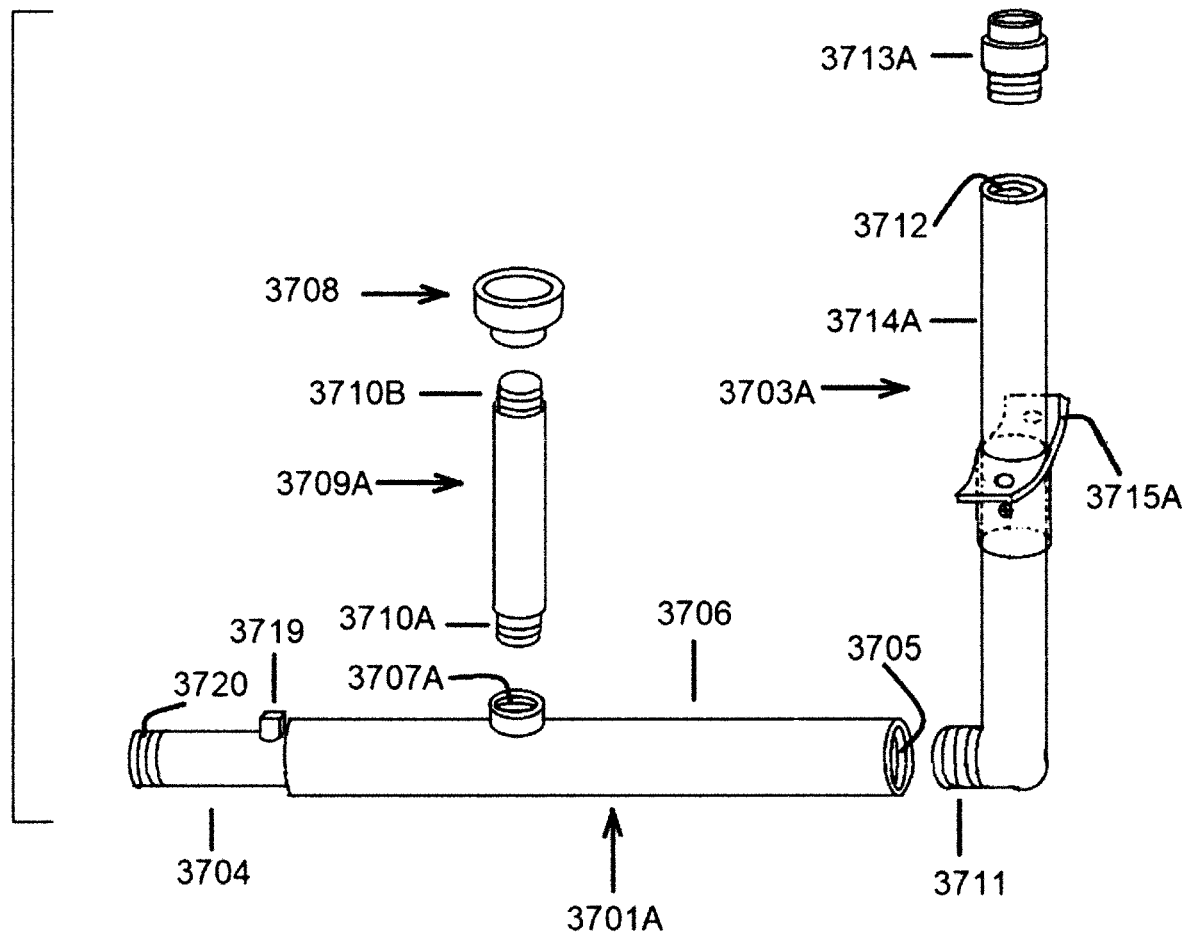
FIG. 7B shows exploded view of the peripheral decoration stand member having a horizontally elongated stand, in accordance with embodiment one.
Figure 9A:
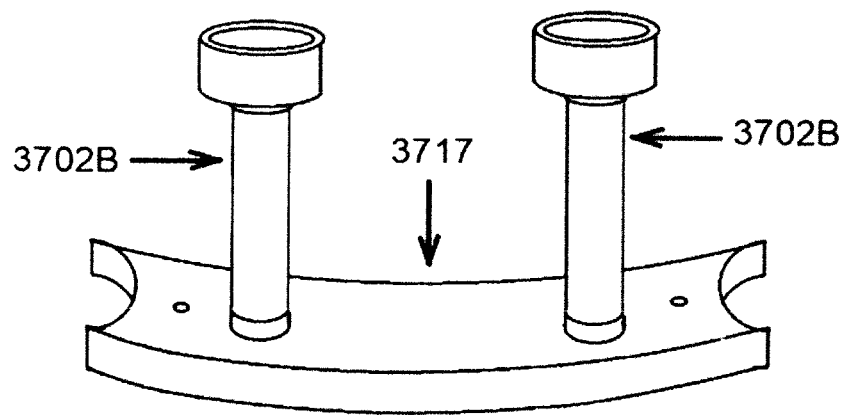
FIG. 9A shows front perspective from top view of a peripheral stand member having a horizontally curved stand, in accordance with embodiment one.
Figure 9B:
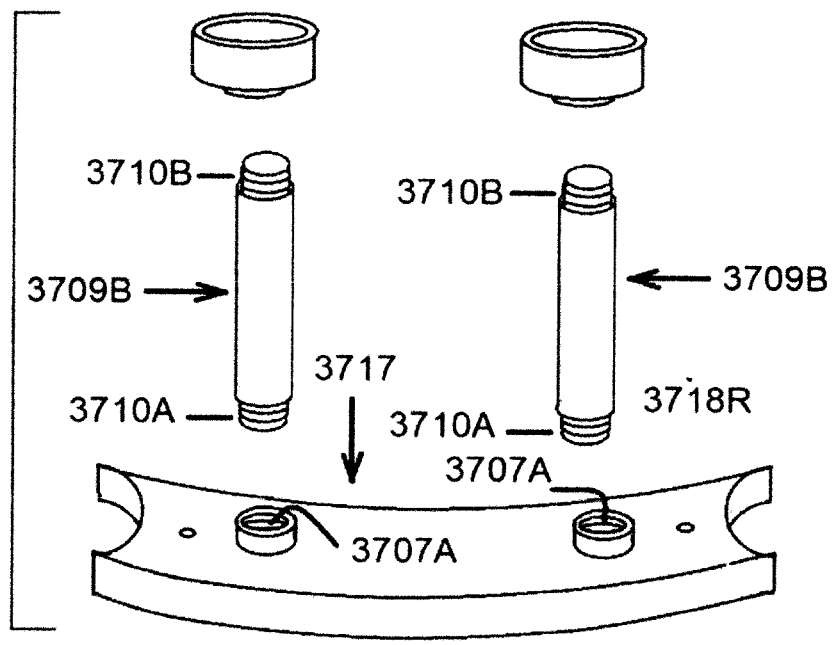
FIG. 9B shows exploded view of the peripheral stand member having the horizontally curved stand, in accordance with embodiment one.

The plurality of peripheral stand members in accordance with embodiment one of the apparatus having plurality of stands includes plurality of peripheral stand members wherein each peripheral stand member 3700A being illustrated in FIGS. 7A and 7B having the horizontally elongated stand 3701A fastened to the central stand member 3600A; and the plurality of peripheral stand members wherein each peripheral stand member 3716 being illustrated in FIGS. 9A and 9B having the horizontally curved stand 3717 mounted between, and fastened to one peripheral stand member 3700A at left and other peripheral stand member 3700A at right.

In case of plurality of peripheral stand members wherein each peripheral stand member 3700A having features shown in FIGS. 7A and 7B, each peripheral stand member 3700A includes the horizontally elongated stand 3701A having a plugging section 3704 at one end and a plugging hole section 3705 at other end; a mini flowerpot stand 3702A mounted on a middle section 3706 of the horizontally elongated stand 3701A; and a vertically elongated stand 3703A of light bulb plugged into the plugging hole section 3705 of the horizontally elongated stand 3701A.

The horizontally elongated stand 3701A has inside hallow feature from one end to another end, a plugging section 3704 at one end, a plugging hole section 3705 at other end, a middle section 3706 between the plugging section 3704 and the plugging hole section 3705 wherein a screwing hole 3707A is configured. A feature 3719 is configured on the plugging section 3704 of the horizontally elongated stand 3701A to be plugged into the rectangular rotational movement curbing hole 3633 of the outer belt 3630A. A screwing feature 3720 externally threaded is configured on the plugging section 3704 of the horizontally elongated stand 3701A to be tightened or released by torquing a nut 3721 after being plugged in the plugging hole 3631 of the outer belt 3630A, plugging hole 3627 of the belt mounting section 3623A of the lower part 3622A, and plugging hole 3635 of the inner belt 3634A. See FIG. 8.

Figure 10A:
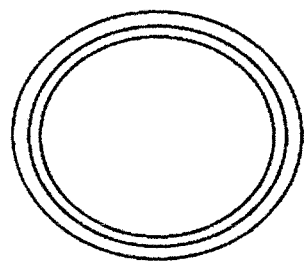
FIG. 10A shows top perspective view of a mini flowerpot holder of a vertically elongated stand of flowerpot.
Figure 10B:
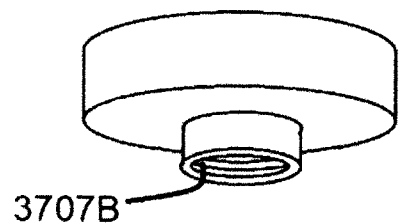
FIG. 10B shows front perspective from bottom view of the mini flowerpot holder of the vertically elongated stand of flowerpot.

The mini flowerpot stand 3702A includes a mini flowerpot holder 3708 at top being illustrated in FIGS. 10A and 10B wherein a screwing hole 3707B being configured; and a vertically elongated part 3709A wherein a bottom externally threaded section 3710A being configured to screw down into the internally threaded screwing hole 3707A of the horizontally elongated stand 3701A, and a top externally threaded screw section 3710B being configured to screw up into the internally threaded screwing hole 3707B of the mini flowerpot holder 3708.

The vertically elongated stand 3703A of light bulb includes a light bulb holder 3713A; a vertically elongated part 3714A having inside hallow feature from bottom to top, a bottom section 3711 being fastened to the plugging hole section 3705 of the horizontally elongated stand 3701A, a screw hole 3712 at top wherein a screw section of the light bulb holder 3713A being screwed in, and a middle section configured to be fastened to a holder 3715A; and the holder 3715A of the horizontally curved stand being mounted at middle of the vertically elongated part 3714A to hold one horizontally curved stand 3717 at left side and other horizontally curved stand 3717 at right side.

In case of plurality of peripheral stand members wherein each peripheral stand member 3716 having features shown in FIGS. 9A and 9B, each peripheral stand member 3716 includes the horizontally curved stand 3717, and a mini flowerpot stand 3702B and/or a plurality of mini flowerpot stands each having features of the mini flower pot stand 3702B being mounted on the horizontally curved stand 3717.

Figure 11:
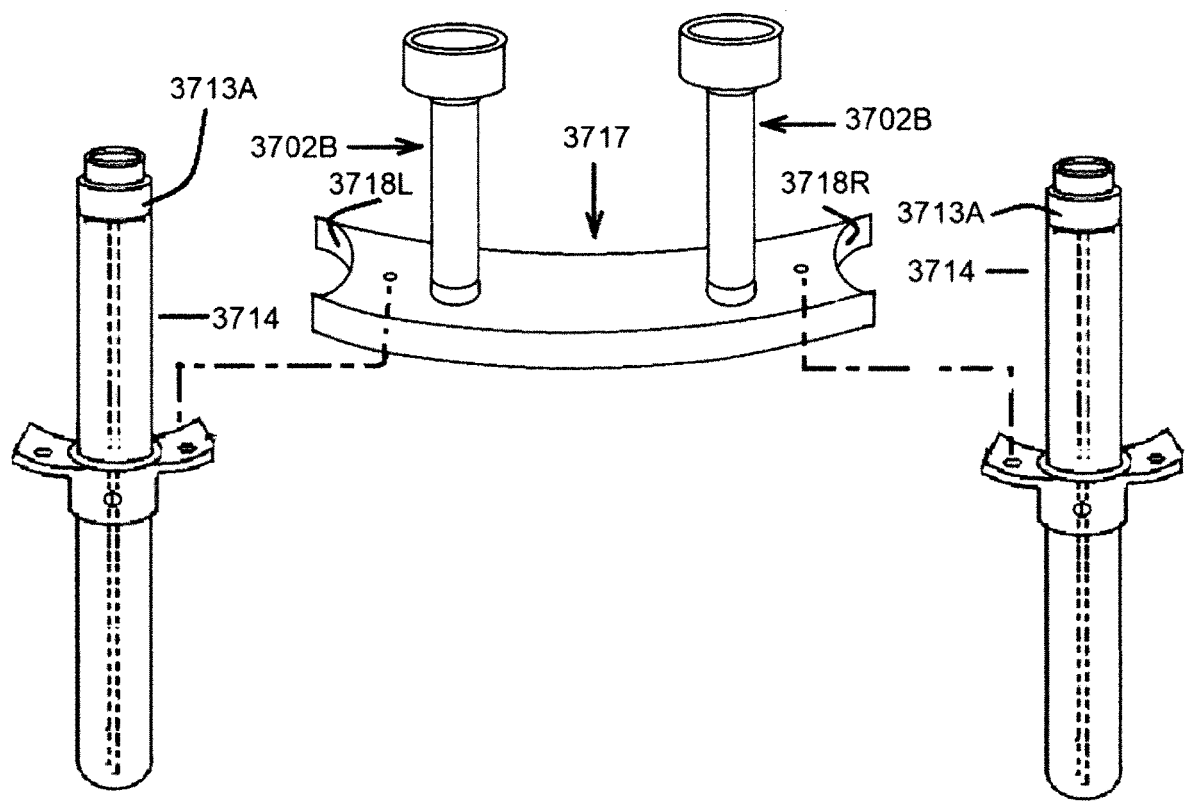

The horizontally curved stand 3717 is mounted between two vertically elongated stands of light bulbs; and has a left end 3718L connected to left vertically elongated stand 3703A of light bulb being fastened to the holder 3715A of the horizontally curved stand, and a right end 3718R connected to right vertically elongated stand 3703A of light bulb being fastened to the holder 3715A of the horizontally curved stand; see FIG. 11. The screwing hole 3707A is or plurality of screwing holes each having features of screwing hole 3707A are configured between the left end 3718L and the right end 3718R of the horizontally curved stand 3717.

The mini flowerpot stand 3702B includes a mini flowerpot holder 3708 at top wherein a screwing hole 3707B being configured; and a vertically elongated part 3709B wherein the bottom screw section 3710A being configured to screw down into the screwing hole 3707A of the horizontally curved stand 3717, the top screw section 3710B being configured to screw up into the screwing hole 3707B of the mini flowerpot holder 3708.

The Electrical System

The electrical system 3800A is installed in the central stand member 3600A and in each peripheral stand member 3700A; see from FIGS. 3A to 3D and 8. The electrical system 3800A includes the power connector board 3803A; the electrical connection device 3807A; a bundle of wires 3811S; and fourteen electrical connection cords, each electrical connection cord 3812 of the fourteen cords being mounted in each peripheral stand member 3700A.

The power connector board 3803A is mounted in the hole 3607 being configured at the outside vertical surface 3603A of the cylindrical component 3602A. A power connector 3806, a switch on-off button 3805, a light dimmer switch 3804A, a light dimmer switch 3804B, and a light dimmer switch 3804C are mounted on the power connector board 3803A.

The electrical connection device 3807A includes a six sided box 3809A and a standing part 3810. The six sided box 3809A has three left electrical connection plugging holes at left side, three right electrical connection plugging holes at right side, four front electrical connection plugging holes at front side, four rear electrical connection plugging holes at rear side, totally fourteen electrical connection plugging holes; and internally threaded screw hole at bottom.

fourteen electrical connection cords are mounted in the peripheral stand members in such a way that an electrical connection cord 3812 is mounted in a peripheral stand member 3700A; one end of an electrical connection cord 3812 is plugged into a light bulb holder 3713A mounted on the vertically elongated part 3714A; and by passing through the vertically elongated part 3714A and the horizontally elongated stand 3701A other end of an electrical connection cord 3812 is plugged into an electrical connection plugging hole of the six sided box 3809A.

The three left electrical connection plugging holes are configured in such a way that a first plugging hole is configured at upper left corner, a second plugging hole is configured at upper right corner, and a third plugging hole is configured at lower middle. The three right electrical connection plugging holes are configured in such a way that a first plugging hole is configured at upper left corner, a second plugging hole is configured at upper right corner, and a third plugging hole is configured at lower middle. The four front electrical connection plugging holes are configured in such a way that a first plugging hole is configured at upper left corner, a second plugging hole is configured at upper right corner, a third plugging hole is configured at lower left corner, and a fourth plugging hole is configured at lower right corner. The four rear electrical connection plugging holes are configured in such a way that a first plugging hole is configured at upper left corner, a second plugging hole is configured at upper right corner, a third plugging hole is configured at lower left corner, and a fourth plugging hole is configured at lower right corner.

Figure 3D:
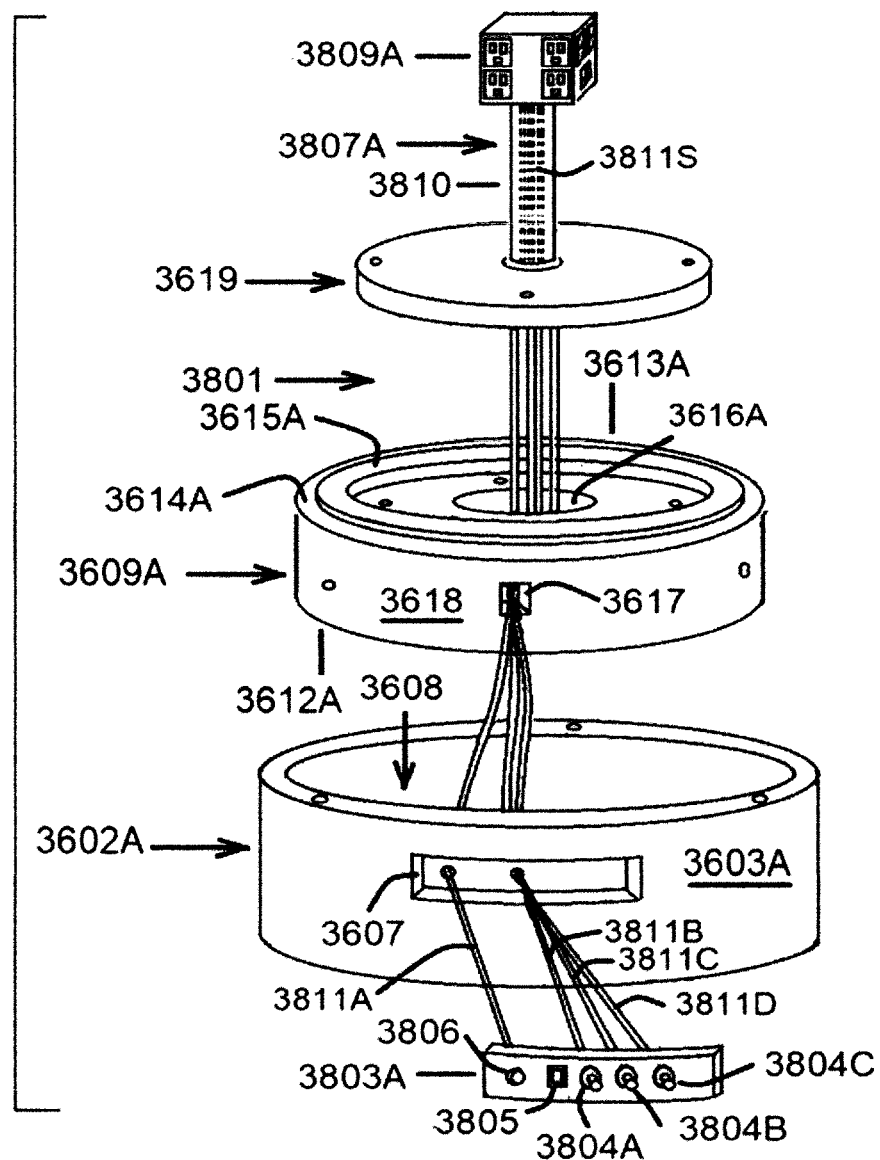
FIG. 3D shows exploded view of the supporting base element of the central stand member in accordance with embodiment one wherein parts of the electric system being mounted.
Figure 21:
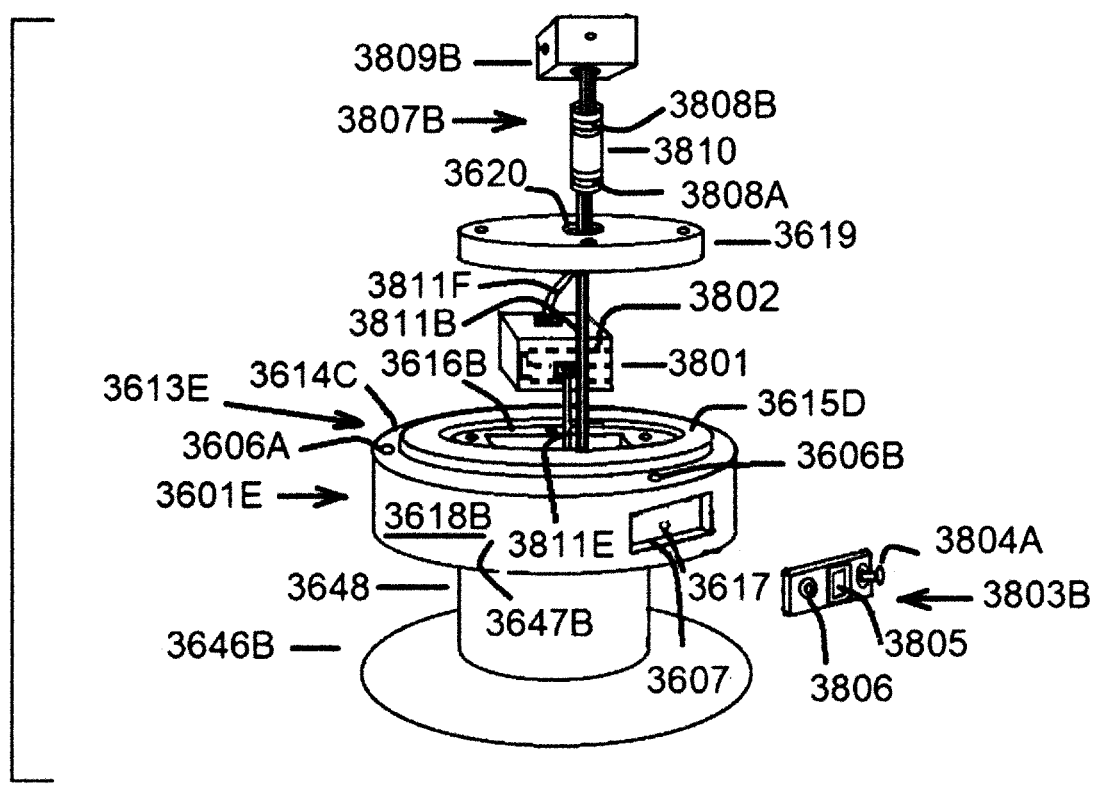

The standing part 3810 has inside hollow space for mounting the bundle of wires 3811S, a bottom section 3808A having externally threaded feature to screw down in the circular lid 3619, and a top section 3808B having externally threaded feature to screw up in the internally threaded screw hole configured at bottom side of the six sided box 3809A; see FIGS. 3D and 21.

The bundle of wires 3811S further includes a sub bundle of electrical connection wires 3811A, a sub bundle of electrical connection wires 3811B, a sub bundle of electrical connection wires 3811C, and a sub bundle of electrical connection wires 3811D. The sub bundles of electrical connection wires are connected to the power connector board 3803A at one side and to the electrical connection plugging holes of the six sided box 3809A at other side. Each sub bundle of electrical connection wires comprises wires connected to opposite electrical connections being covered and separated by insulating material.

The sub bundle of electrical connection wires 3811A is connected to the power connector 3806 of the power connector board 3803A at one side, and at other side to the fourteen electrical connection plugging holes of the six sided box 3809A being connected to the sub bundle of electrical connection wires 3811B, the sub bundle of electrical connection wires 3811C, and the sub bundle of electrical connection wires 3811D in accordance with electrical connection circuit system. The switch on-off button 3805 is configured on the power connector board 3803A being connected to the power connector 3806 to switch on-off electric connection between a power inlet of a power supply 3817 and the sub bundle of electrical connection wires 3811A.

The sub bundle of electrical connection wires 3811B is connected at one side to the light dimmer switch 3804A of the power connector board 3803A; and at other side to a lower middle plugging hole of the three left electrical connection plugging holes, a lower left corner plugging hole of the four front electrical connection plugging holes, a lower right corner plugging hole of the four front electrical connection plugging holes, a lower middle plugging hole of the three right electrical connection plugging holes, a lower left corner plugging hole of the four rear electrical connection plugging holes, and a lower right corner plugging hole of the four rear electrical connection plugging holes. The light dimmer switch 3804A is configured on the power connector board 3803A to switch on-off electrical connection between the sub bundle of electrical connection wires 3811B and the cords 3812 being connected the electrical connection plugging holes of the six sided box 3809A wherein the sub bundle of electrical connection wires 3811B being connected; or to increase or decrease the intensity of light output of bulbs electrically connected to the cords 3812 being connected to the electrical connection plugging holes of the six sided box 3809A wherein the sub bundle of electrical connection wires 3811B being connected.

The sub bundle of electrical connection wires 3811C is connected at one side to the light dimmer switch 3804B of the power connector board 3803A; and at other side to an upper right corner plugging hole of the three left electrical connection plugging holes, an upper right corner plugging hole of the four front electrical connection plugging holes, an upper right corner plugging hole of the three right electrical connection plugging holes, and an upper right corner plugging hole of the four rear electrical connection plugging holes. The light dimmer switch 3804B is configured on the power connector board 3803A to switch on-off electrical connection between the sub bundle of electrical connection wires 3811C and the cords 3812 being connected the electrical connection plugging holes of the six sided box 3809A wherein the sub bundle of electrical connection wires 3811C being connected; or to increase or decrease the intensity of light output of bulbs electrically connected to the cords 3812 being connected to the electrical connection plugging holes of the six sided box 3809A wherein the sub bundle of electrical connection wires 3811C being connected.

The sub bundle of electrical connection wires 3811D is connected at one side to the light dimmer switch 3804C of the power connector board 3803A; and at other side to an upper left corner plugging hole of the three left electrical connection plugging holes, an upper left corner plugging hole of the four front electrical connection plugging holes, an upper left corner plugging hole of the three right electrical connection plugging holes, and an upper left corner plugging hole of the four rear electrical connection plugging holes. The light dimmer switch 3804C is configured on the power connector board 3803A to switch on-off electrical connection between the sub bundle of electrical connection wires 3811D and the cords 3812 being connected the electrical connection plugging holes of the six sided box 3809A wherein the sub bundle of electrical connection wires 3811D being connected; or to increase or decrease the intensity of light output of bulbs electrically connected to the cords 3812 being connected to the electrical connection plugging holes of the six sided box 3809A wherein the sub bundle of electrical connection wires 3811D being connected.

Figure 8:
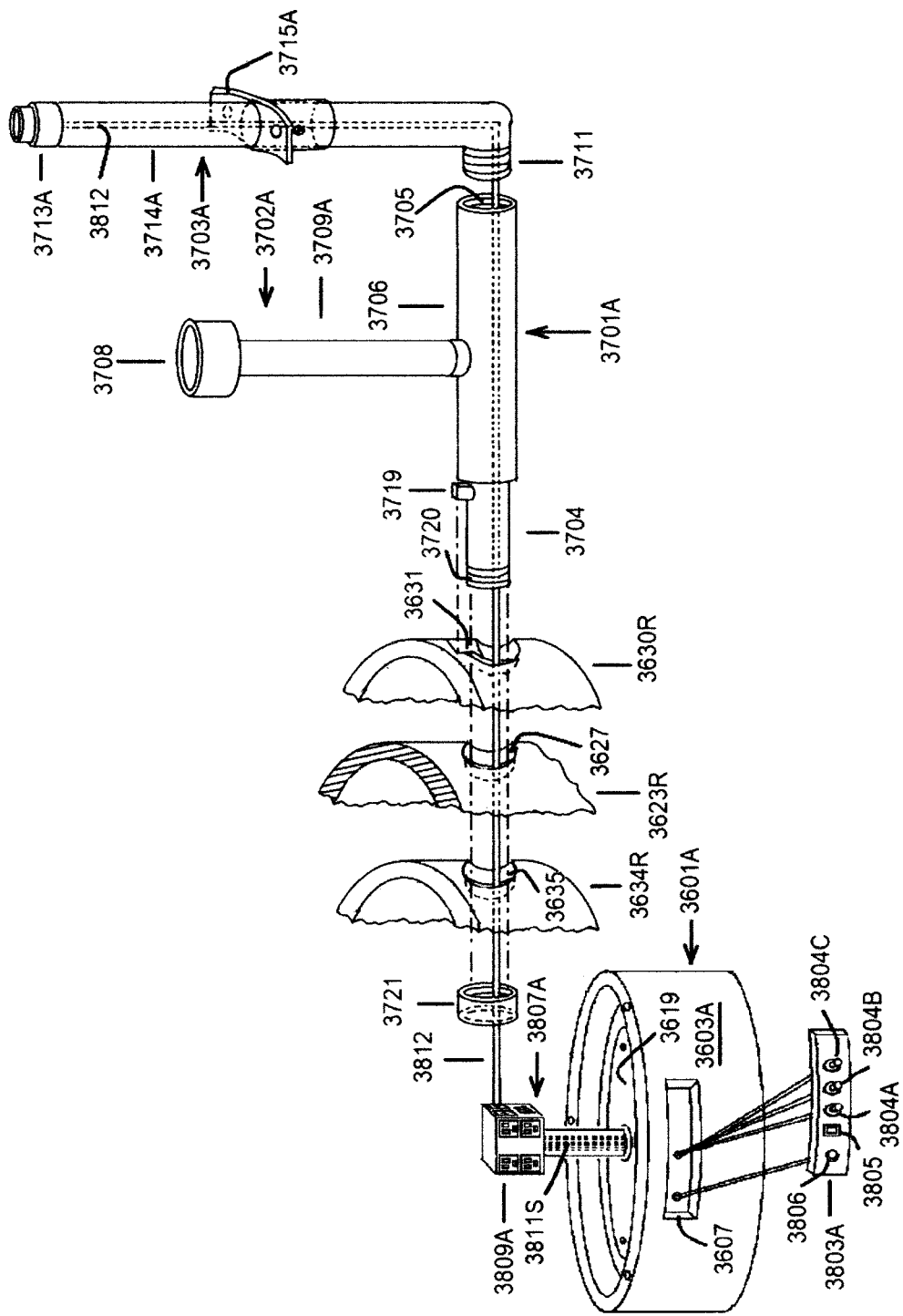

FIG. 8 shows detached views of the exploded peripheral stand member 3700A, a cutout section 3630R of the outer belt 3630A, a cutout section 3623R of the belt mounting section 3623A, a cutout section 3634R of the inner belt 3634A and a nut 3721 of the plugging section 3704 wherethrough the electrical connection cord 3812 of the electrical system 3800A is mounted; and the electrical connection cord 3812 of the electrical system 3800A is plugged into the six sided box 3809A of the electrical connection device 3807A being mounted in the supporting base element 3601A.

Operation and Manner of Using

The manner of using and operating the apparatus having plurality of stands in accordance with embodiment one is detailed below.

A plurality of mini flowerpots are mounted on plurality of mini flowerpot holders of mini flowerpot stands in such a way that each mini flowerpot 3901 having flowers is mounted on a mini flowerpot holder 3708 of a mini flowerpot stand 3702A, and on a mini flowerpot holder 3708 of a mini flowerpot stand 3702B.

Figure 30A:
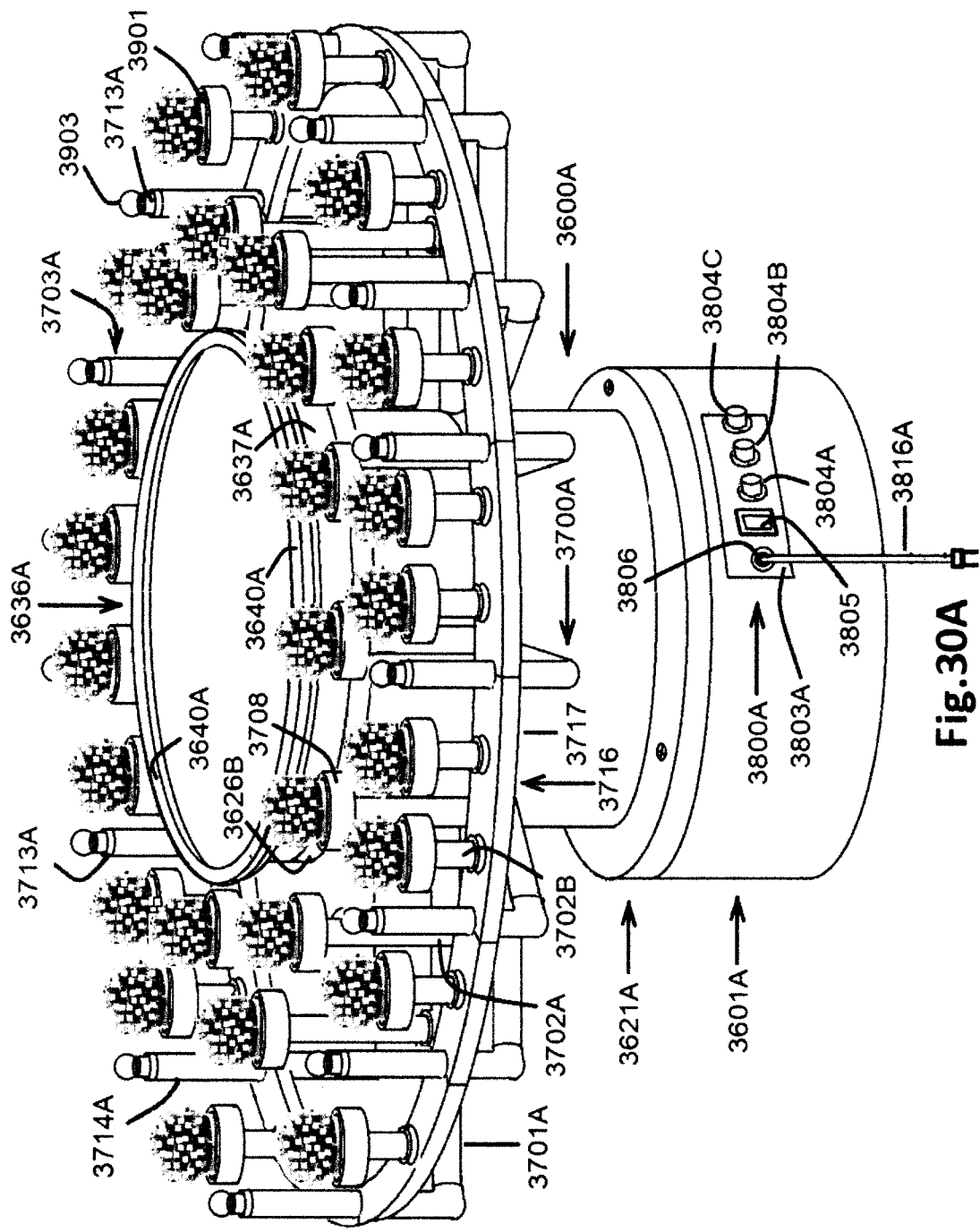
FIG. 30A shows front perspective from top view of the apparatus having plurality of stands in accordance with embodiment one wherein no item being mounted on the top element of the central stand member, and plurality of mini flowerpots having flowers and plurality of light bulbs being mounted on plurality of vertically elongated stands of peripheral members.

A space on the top component 3638A of the top element 3636A be left open as shown in FIG. 30A for mounting or installing or putting different items or objects such as decorating objects or a standing items such as a cake stand for holding wedding, party or birth day cake; or as shown in FIG. 30B a flowerpot 3900A having flowers is mounted on the top component 3638A of the top element 3636A; or as shown in FIG. 30C a water bowl 3902A is mounted on the top component 3638A. And as illustrated in FIGS. 30A, 30B and 30C plurality of light bulbs are mounted on plurality of stands in such a way that each light bulb 3903 is mounted on a light bulb holder 3713A being mounted on a vertically elongated part 3714 of a vertically elongated stand 3703A.

A cord 3816A having a plug and a connector for the connection of the electrical system 3800A to inlet of electrical supply 3817 is connected to the power connector 3806 being mounted in the power connector board 3803A. By switching on the switch on-off button 3805, and by switching on either selectively or all the light dimmer switch 3804A, the light dimmer switch 3804B, and/or the light dimmer switch 3804C being mounted on the power connector board 3803A the light bulbs mounted on light bulb holders provide light so that the apparatus having plurality of stands provides plurality of flower decorations having the same color or plurality of colors combined with plurality of light decorations having the same color or plurality of light colors. As illustrated in FIG. 30C the water bowl 3902A is filled with water to reflect light and provide further decoration.

Embodiment Two

Figure 12:
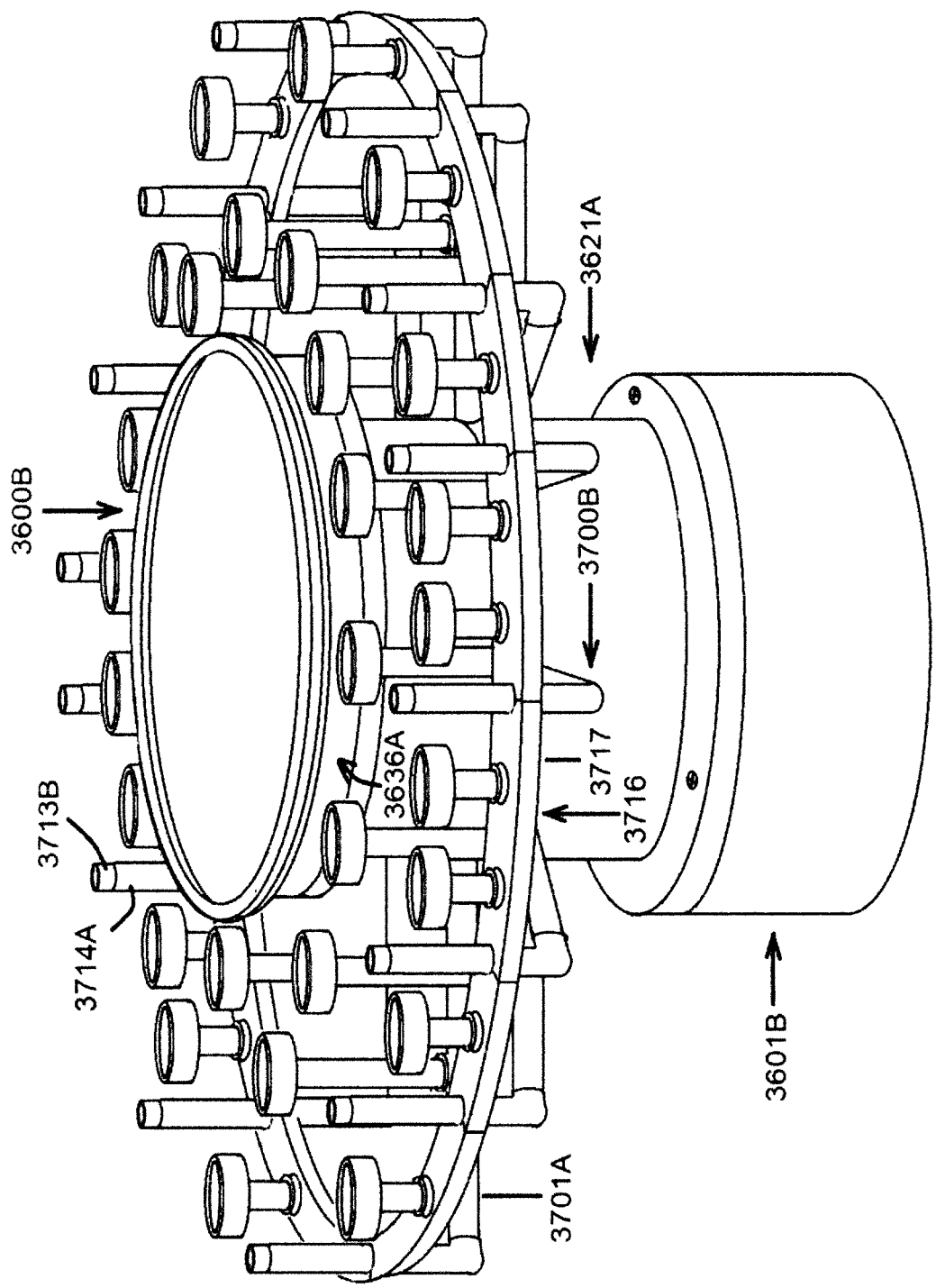
Figure 13:
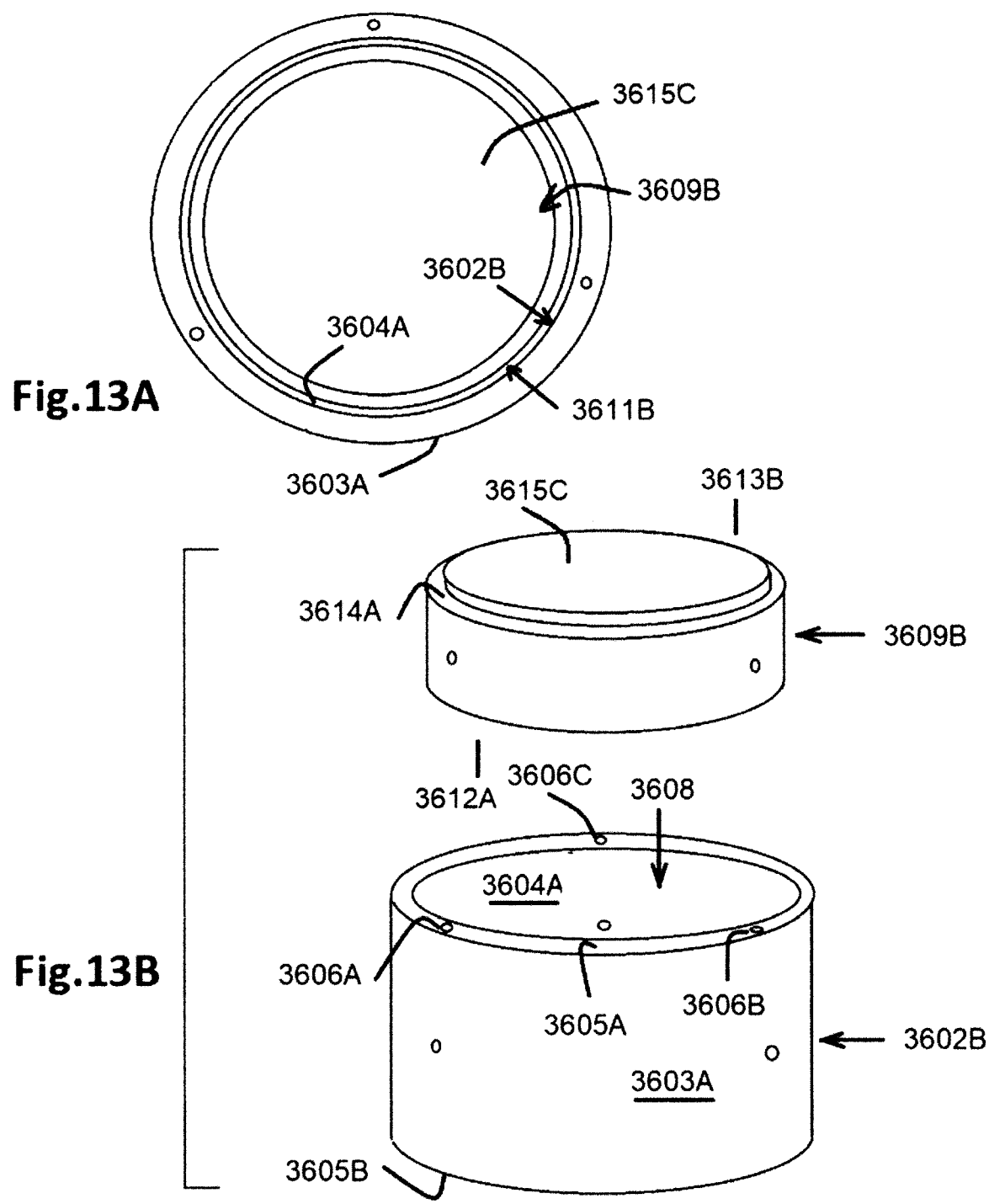

An apparatus having plurality of stands in accordance with embodiment two is illustrated in FIG. 12. The apparatus having plurality of stands in accordance with embodiment two includes a central stand member 3600B at middle; a plurality of peripheral stand members further comprising a plurality of peripheral stand members wherein each peripheral stand member 3700B shown in FIG. 14 further including the horizontally elongated stand 3701A fastened to the central stand member 3600B, and the plurality of peripheral stand members wherein each peripheral stand member 3716 illustrated in FIGS. 9A and 9B further including the horizontally curved stand 3717 being mounted between and fastened to one peripheral stand member 3700B at left and other peripheral stand member 3700B at right.

The central stand member 3600B includes the top element 3636A shown from FIGS. 6A to 6C, the middle element 3621A illustrated from FIGS. 4A-4C, and a supporting base element 3601B illustrated in FIGS. 13A and 13B.

The supporting base element 3601B illustrated in FIGS. 13A and 13B includes a cylindrical component 3602B and another component 3609B mounted inside the cylindrical component 3602B. The cylindrical component 3602B has outside vertical surface 3603A; inside vertical surface 3604A; top circular edge 3605A having the surface wherein the screw hole 3606A, the screw hole 3606B and the screw hole 3606C being configured; the bottom circular edge 3605B to stand; and the hollow space 3608 from top to bottom.

The component 3609B is mounted inside the cylindrical component 3602B being fastened to inside vertical surface 3604A of the cylindrical component 3602B with fastening means such as screws thereby the supporting base element 3601B has opened down base 3610 under the component 3609B and opened up plugging feature 3611B above the component 3609B. The component 3609B has the bottom surface 3612A to the side of the opened down base 3610 and a top 3613B to the side of the plugging feature 3611B wherein the circular feature 3614A being configured for mounting the middle element 3621A. At the middle of the peripheral circular feature 3614A another circular feature 3615C is configured.

Figure 14:
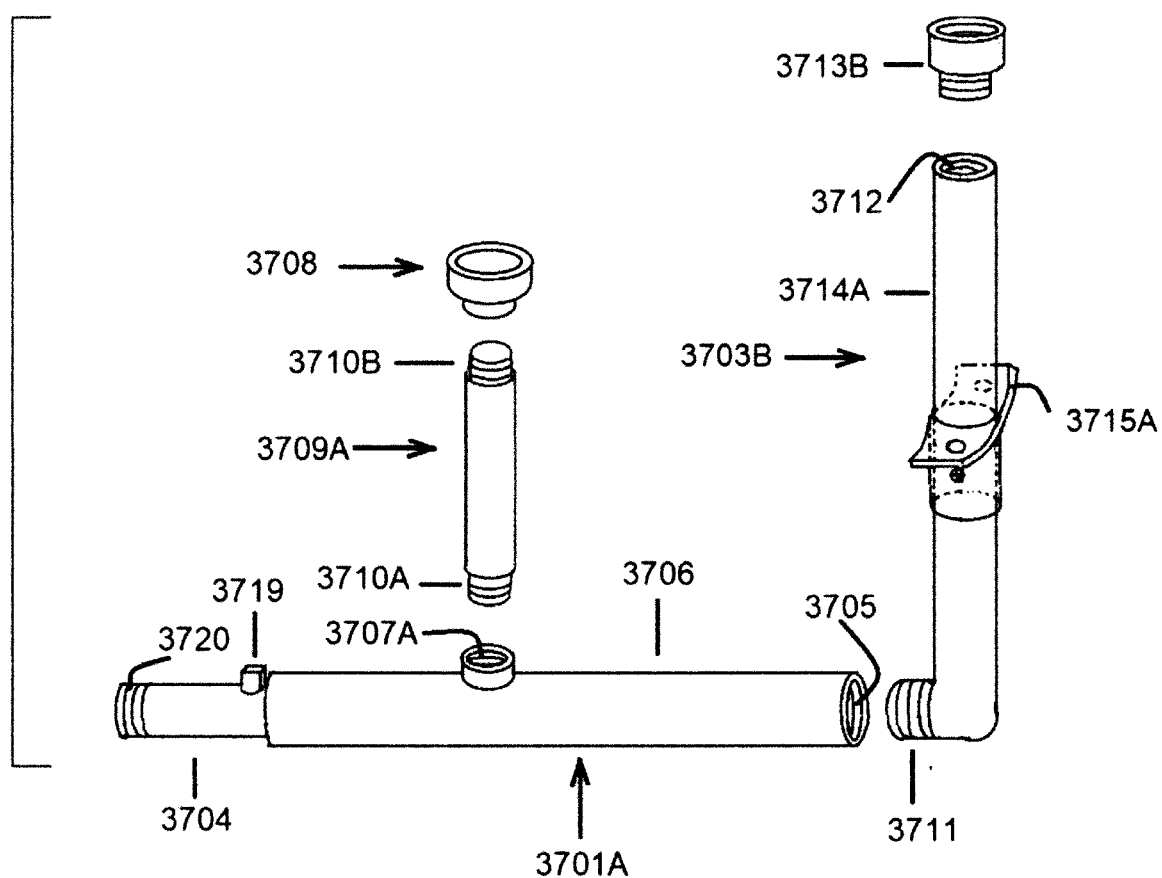

The peripheral stand member 3700B further includes the horizontally elongated stand 3701A, the mini flowerpot stand 3702A mounted on the middle section of the horizontally elongated stand 3701A and a vertically elongated stand 3703B of candle mounted at one end of the horizontally elongated stand 3701A. FIG. 14 shows exploded view of the peripheral stand member 3700B.

The vertically elongated stand 3703B of candle includes a candle holder 3713B; the vertically standing part 3714A having the bottom section 3711 being fastened to the plugging hole section 3705 of the horizontally elongated stand 3701A, the screw hole 3712 at top wherein a screw section of the candle holder 3713B being screwed in, and a middle section configured to be fastened to the holder 3715A; and the holder 3715A of the horizontally curved stand being mounted at middle of the vertically standing part 3714A to hold one horizontally curved stand 3717 at left side and other horizontally curved stand 3717 at right side.

Embodiment Three

Figure 15:
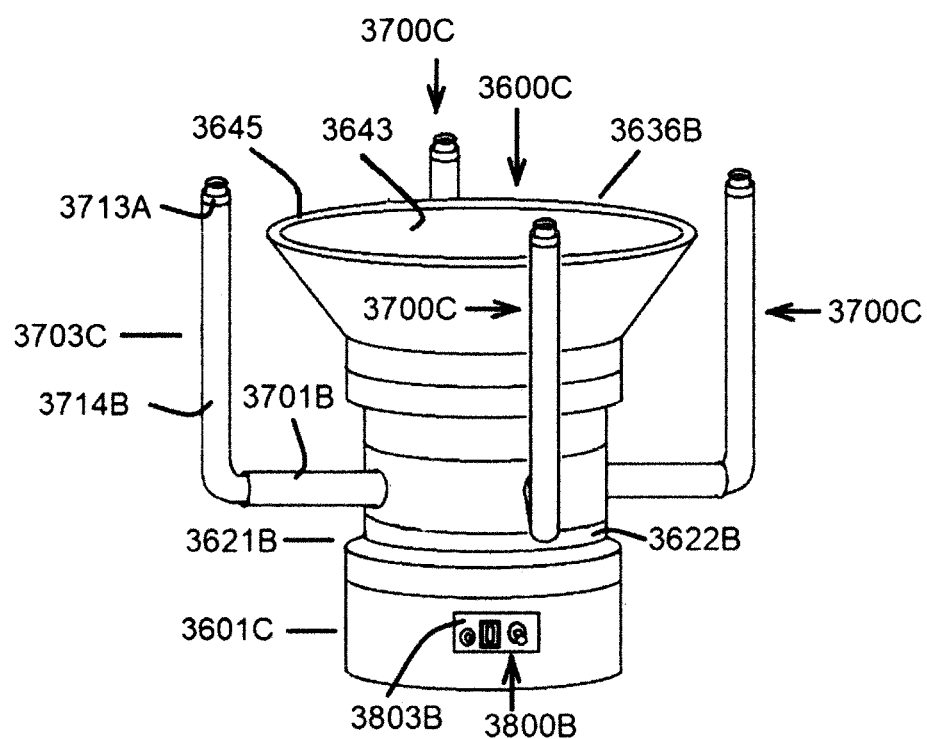
Figure 16:
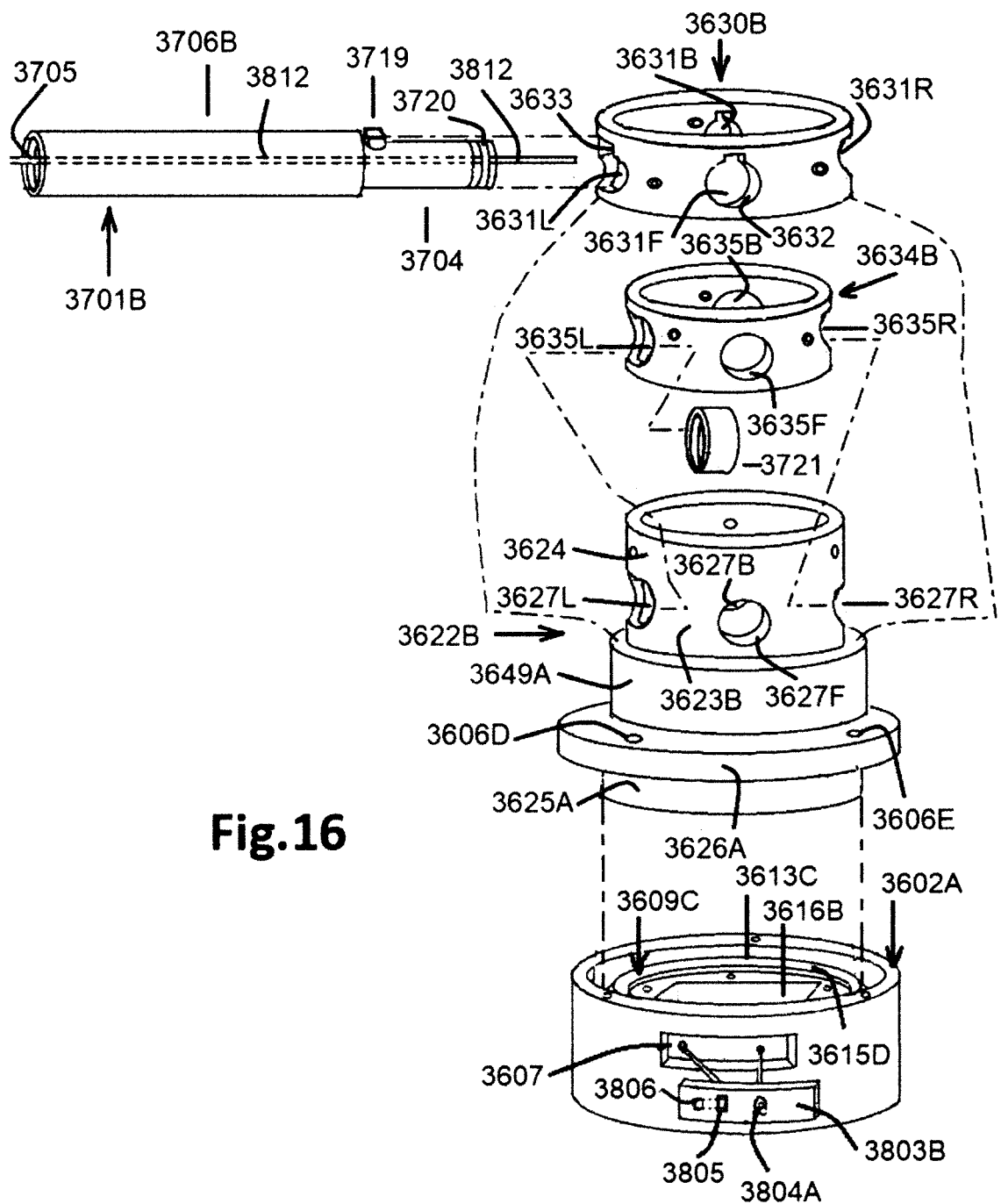

An apparatus having plurality of stands in accordance with embodiment three is illustrated in FIG. 15. The apparatus having plurality of stands in accordance with embodiment three includes a central stand member 3600C at the middle, four peripheral stand members wherein each peripheral stand member 3700C of the four peripheral stand members further including a horizontally elongated stand 3701B fastened to the central stand member 3600C, and an electrical system 3800B being installed in the central stand member 3600C and in each peripheral stand member 3700C. Further detail parts or components in embodiment three are illustrated in FIGS. 16 to 17B.

The Central Stand Member 3600C

The central stand member 3600C includes a supporting base element 3601C, a top element 3636B, and a middle element 3621B. The supporting base element 3601C further includes the cylindrical component 3602A, another component 3609C mounted inside the cylindrical component 3602A, and the circular lid component 3619 fastened to top side of the component 3609C.

The component 3609C is mounted inside the cylindrical component 3602A being fastened to inside vertical surface 3604A with fastening means such as screws thereby the supporting base element 3601C has opened down base 3610 below the component 3609C and opened up plugging feature 3611A above the component 3609C. The component 3609C has the bottom surface 3612A to the side of the opened down base 3610, and a top 3613C to the side of the opened up plugging feature 3611A wherein a peripheral circular feature 3614A for mounting the middle element 3621B being configured. At the middle of the peripheral circular feature 3614A another circular feature 3615D wherein the feature to be fastened to the circular lid 3619 and a rectangular compartment 3616B are configured. The hole 3617 is configured between the rectangular compartment 3616B and an outside vertical surface 3618 of component 3609C to mount plurality of electrical connection bundles of wires connected to the power connector board 3803B at one side, and to a battery chamber 3801 and an electrical connection device 3807B at another side. The circular feature 3615D is fastened to the circular lid 3619 having the threaded hole 3620 at center wherein the bottom section of the electrical connection device 3807B being screwed in.

The middle element 3621B includes a lower part 3622B, an outer belt 3630B, an inner belt 3634B, and the upper part 3628. Sub components of the middle element 3621B are illustrated in FIG. 16 and shown by projection lines how they are connected one to the other, to parts of the supporting base element 3601C and to the horizontally elongated stand 3701B of the peripheral stand member 3700C.

The lower part 3622B has a belt mounting section 3623B; the upper part mounting section 3624 above the belt mounting section 3623B; the lower plug-in section 3625A plugged into the opened up plugging feature 3611A of the supporting base member 3601C; the lower circular curb 3626A having the screw hole 3606D, the screw hole 3606E, and the screw hole 3606F being configured to be fastened with screws respectively to the screw hole 3606A, the screw hole 3606B, and the screw hole 3606C of the cylindrical component 3602A; and the section 3649A between the belt mounting section 3623B and the lower circular curb 3626A. The belt mounting section 3623B of the lower part 3622B has four plugging holes named left plugging hole 3627L, front plugging hole 3627F, right plugging hole 3627R and rear plugging hole 3627B. Each plugging hole of the four plugging holes are configured to have circular feature.

The outer belt 3630B is mounted at outside surface of the belt mounting section 3623B of the lower part 3622B. The inner belt 3634B is mounted at inside surface of the belt mounting section 3623B of the lower part 3622B. The upper part 3628 is mounted at the upper part mounting section 3624 of the lower part 3622B. The outer belt 3630B and the inner belt 3634B are mounted and fastened to the belt mounting section 3623B of the lower part 3622B in such a way that the belt mounting section 3623B of the lower part 3622B is between the outer belt 3630B and the inner belt 3634B. And the lower section 3629 of the upper part 3628 is mounted on the upper part mounting section 3624 of the lower part 3622B above the belt mounting section 3623B of the lower part 3622B.

The outer belt 3630B has a left plugging hole 3631L, a front plugging hole 3631F, a right plugging hole 3631R and a rear plugging hole 3631B, each plugging hole of the four plugging holes is configured to have the circular plugging hole feature 3632 and above the circular plugging hole feature 3632 the rectangular rotational movement curbing hole 3633. The inner belt 3634A has a left plugging hole 3635L, a front plugging hole 3635F, a right plugging hole 3635R and a rear plugging hole 3635B, each plugging hole of the four plugging holes is configured to have the circular feature.

The top element 3636B is illustrated in FIGS. 17A and 17B. The top element 3636B includes the cylindrical component 3637A, a component 3609D, and a cone frustum shaped component 3641. The cylindrical component 3637A has outside vertical surface 3603B; inside vertical surface 3604B; the top circular edge 3605C having surface wherein plurality of screw holes being configured to be fastened with screws to the screw holes configured at the bottom edge of the cone frustum shaped component 3641; the bottom circular edge 3605D having surface wherein the screw hole 3606J, the screw hole 3606K, and the screw hole 3606L being configured to be fastened with screws respectively to the screw hole 3606G, the screw hole 3606H, and the screw hole 3606I of the upper circular curb 3626B of the middle element 3621B.

The component 3609D is mounted inside the cylindrical component 3637A being fastened to inside vertical surface 3604B of the cylindrical component 3637A with screws thereby the top element 3636B has opened down plugging feature 3611C below the component 3609D. The component 3609D has a top surface 3612B and a bottom 3613D to the side of the opened down plugging feature 3611C wherein the circular feature 3614B being configured for mounting the upper plugging part 3625B of the middle element 3621B. At the middle of the peripheral circular feature 3614B another circular feature 3615B is configured.

The frustum shaped component 3641 is mounted on top edges of the cylindrical component 3637A and having an outside slanting surface 3642 and an inside slanting surface 3643 beginning from bottom circular edge 3644 having the shortest diameter of the frustum shaped component 3641 and ended at a top circular edge 3645 having the longest diameter of the frustum shaped component 3641.

The Peripheral Stand Members

In case of the four peripheral stand members, each peripheral stand member 3700C includes a horizontally elongated stand 3701B, and a vertically elongated stand 3703C of light bulb. The horizontally elongated stand 3701B is fastened to the central stand member 3600C; and has the plugging section 3704 at one end having externally threaded feature to be screwed in the nut 3721 after being plugged in the central stand member 3600C, the plugging hole section 3705 at other end, and a section 3706B between the plugging section 3704 and the plugging hole section 3705.

The vertically elongated stand 3703C of light bulb includes the light bulb holder 3713A; and a vertically standing part 3714B having the bottom section 3711 to be plugged in and fastened to the plugging hole section 3705 of the horizontally elongated stand 3701B, and the top screw hole 3712 wherein the screw section of the light bulb holder 3713A be screwed in.

The Electrical System 3800B

The electrical system 3800B is installed in the central stand member 3600C and in each peripheral stand member 3700C. The electrical system 3800B includes a power connector board 3803B; the electrical connection device 3807B; a bundle of wires 3811T; four electrical connection cords, each electrical connection cord 3812 of the four cords being mounted in each peripheral stand member 3700C; the battery chamber 3801 housing rechargeable battery 3802 and being mounted in the rectangular compartment 3616B; and a sub bundle of electric connection wires 3811E being connected to the power connector board 3803B at one end and to the battery chamber 3801 at other end.

The power connector board 3803B is mounted in the hole 3607 being configured at the outside vertical surface 3603A of the cylindrical component 3602A. The power connector 3806, the switch on-off button 3805, and the light dimmer switch 3804A are mounted on the power connector board 3803B.

The electrical connection device 3807B includes a six sided box 3809B and the standing part 3810. The six sided box 3809B has one electrical connection plugging hole at left, one electrical connection plugging hole at right, one electrical connection plugging hole at front, one electrical connection plugging hole at rear, totally four electrical connection plugging holes. Four the electrical connection cords are plugged into the electrical connection plugging holes of the six sided box 3809B. The four electrical connection cords are mounted in the peripheral stand members in such a way that an electrical connection cord 3812 is mounted in a peripheral stand member 3700C; one end of an electrical connection cord 3812 is plugged into a light bulb holder 3713A mounted on a vertically elongated part 3714B; and by passing through a vertically elongated part 3714B and a horizontally elongated stand 3701B other end of an electrical connection cord 3812 is plugged into an electrical connection plugging hole of the six sided box 3809B.

The standing part 3810 has inside hollow space for mounting the bundle of wires 3811T, the bottom section 3808A screwed down in the circular lid 3619, and the top section 3808B screwed up in a bottom side of the six sided box 3809B having internally threaded screw hole.

The bundle of wires 3811T further includes a sub bundle of electric connection wires 3811F and the sub bundle of electric connection wires 3811B. Each sub bundle of electrical connection wires comprises wires connected to opposite electrical connections being covered and separated by insulating material.

The sub bundle of electric connection wires 3811F is connected at one side to the battery chamber 3801 and at another side to the electrical connection plugging hole of the six sided box 3809B being connected to the sub bundle of electric connection wires 3811B in accordance with electrical connection circuit system.

The sub bundle of electric connection wires 3811B is connected at one side to the light dimmer switch 3804A of the power connector board 3803B and at other side to each electrical connection plugging hole of the six sided box 3809B wherein each electrical connection cord 3812 being mounted in a peripheral stand member 3700C is plugged in. The light dimmer switch 3804A is configured on the power connector board 3803B to switch on-off electrical connection between the sub bundle of electrical connection wires 3811B and the cords 3812 being electrically connected the electrical connection plugging holes of the six sided box 3809B wherein the sub bundle of electrical connection wires 3811B being connected; or to increase or decrease the intensity of light output of bulbs electrically connected to the cords 3812 being connected to the electrical connection plugging holes of the six sided box 3809B wherein the sub bundle of electrical connection wires 3811B being connected.

The bundle of electric connection wires 3811E is connected at one side to the power connector 3806 of the power connector board 3803B and at other side to the battery chamber 3801. The switch on-off button 3805 is configured on the power connector board 3803B being connected to the power connector 3806 to switch on-off electrical connection between the inlet of electric power supply 3817 and the bundle of electric connection wires 3811E.

The battery chamber 3801 is electrically connected to the power connector 3806 with the sub bundle of electric connection wires 3811E and to each electrical connection plugging hole of the six sided box 3809B with the sub bundle of electric connection wires 3811F of the bundle of wires 3811T. The rechargeable battery 3802 is housed in the sealed battery chamber 3801 preferably fabricated of electrically insulating material. Enclosed in the sealed housing is a rechargeable battery assembly including a plurality of rechargeable battery cells electrically connected to electrical terminals.

Embodiment Four

Figure 18:
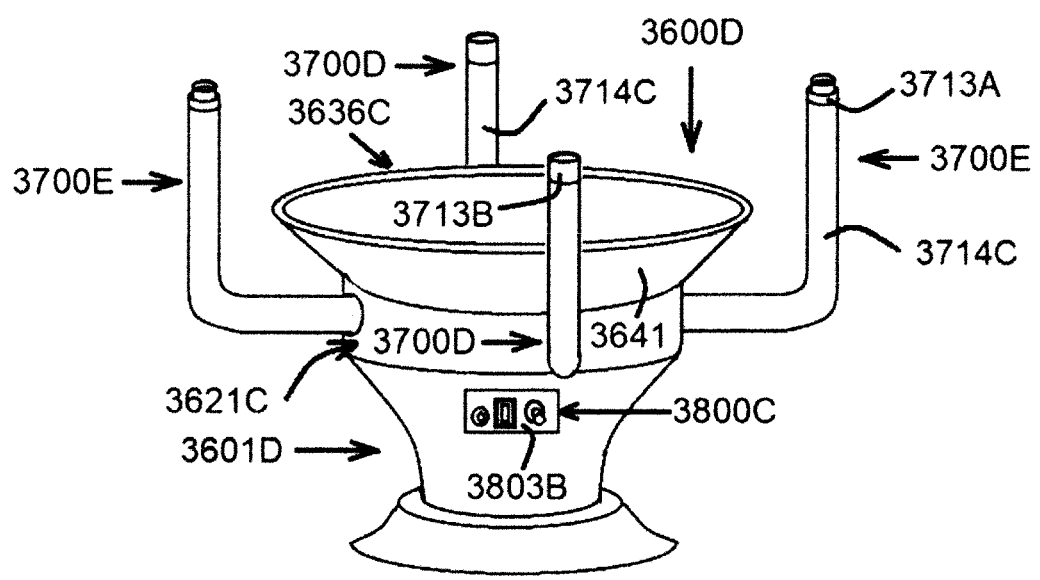
Figure 19:
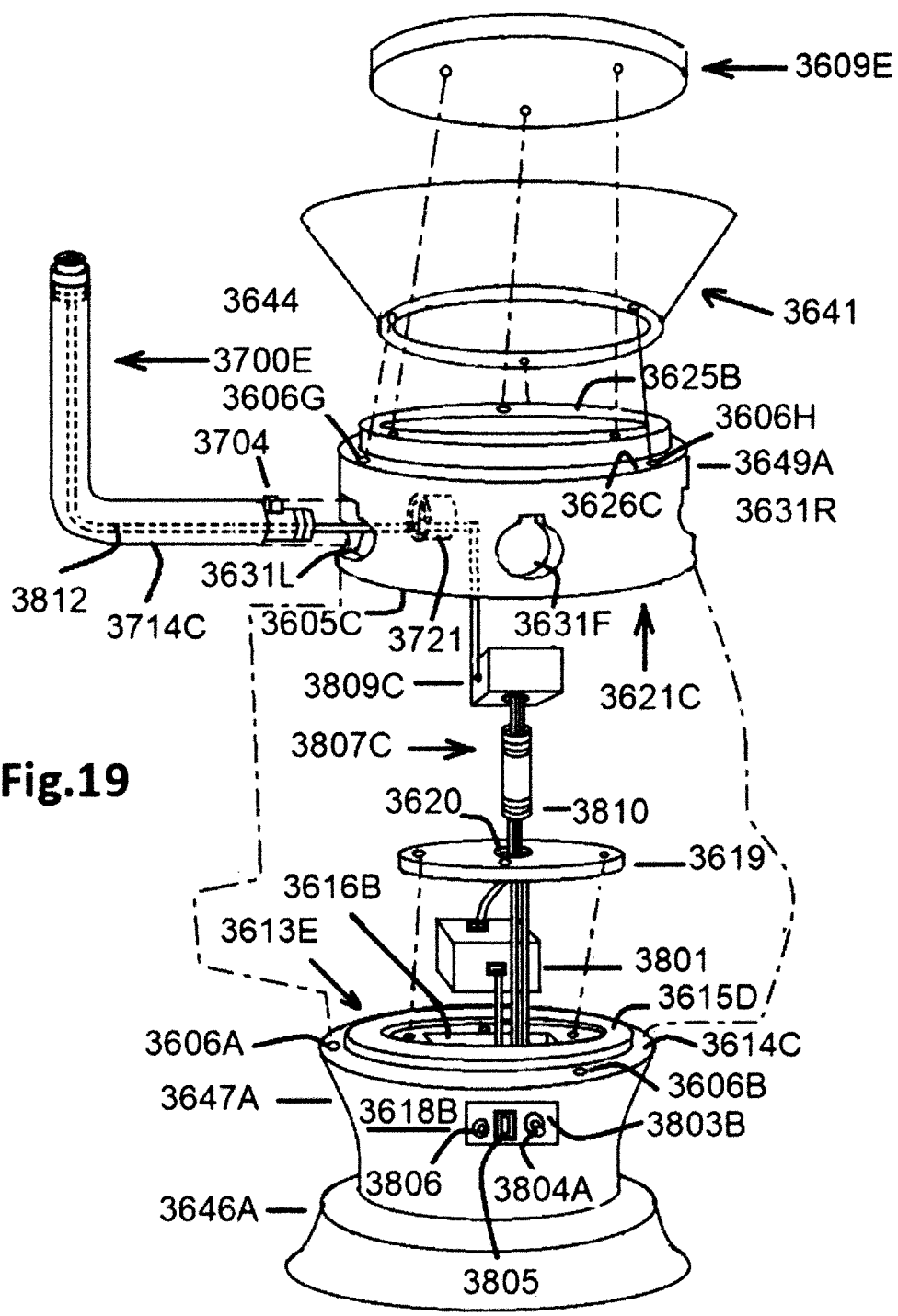
Figure 31A:
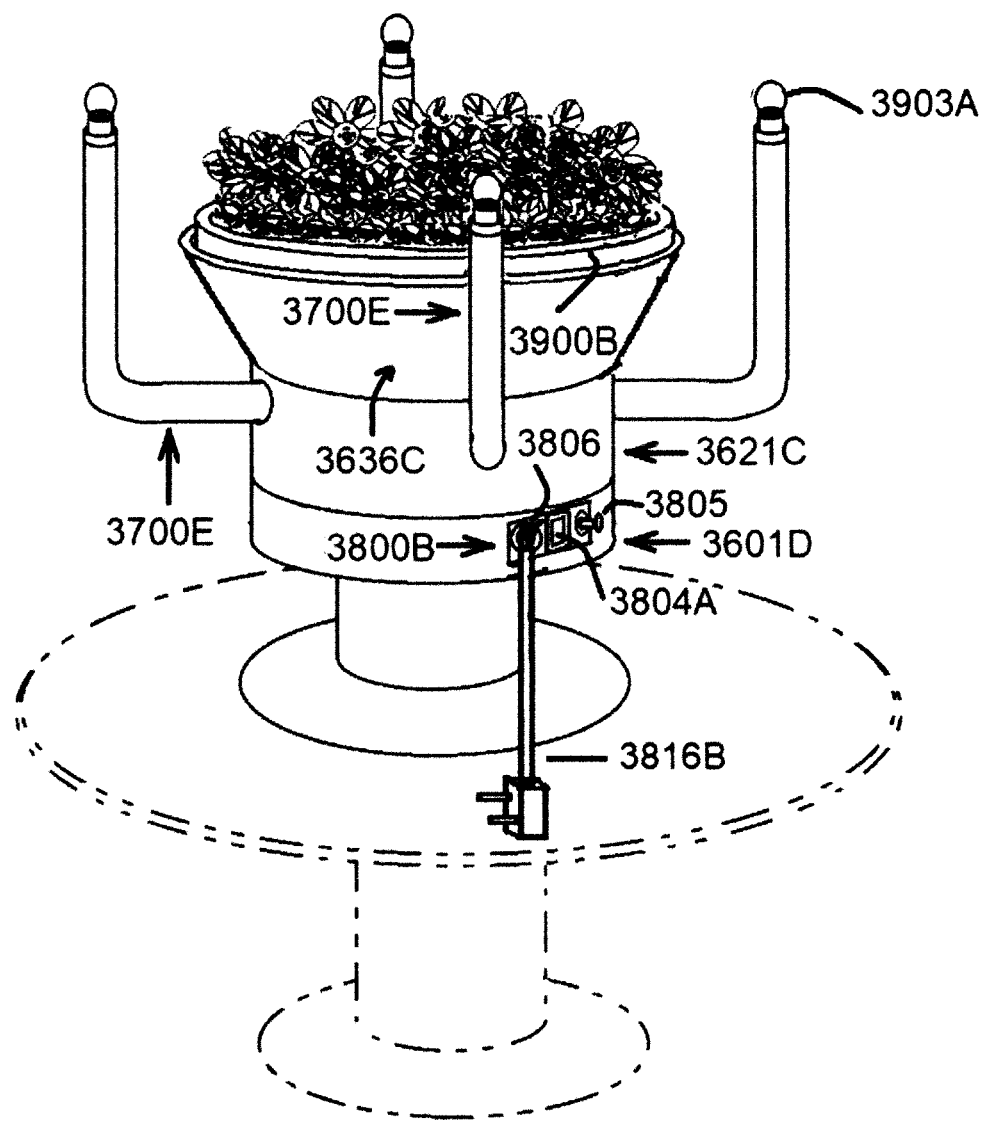
FIG. 31A shows front perspective from top view as the apparatus having plurality of stands in accordance with embodiment five being on a table; and a plant pot having plants being mounted on the top element of the central stand member, plurality of light bulbs being mounted on plurality of peripheral stand members.
Figure 31B:
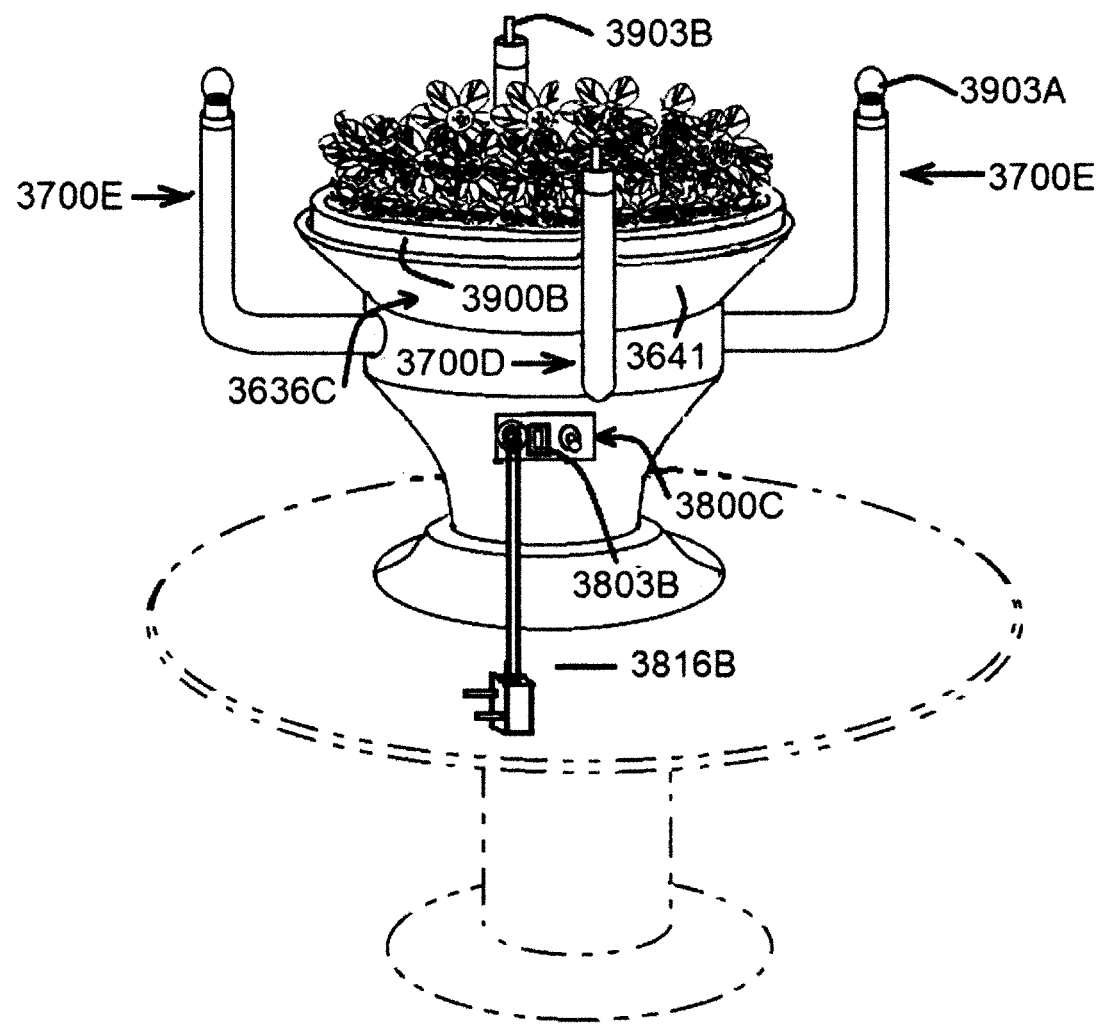

An apparatus having plurality of stands in accordance with embodiment four is illustrated in FIG. 18. The apparatus having plurality of stands in accordance with embodiment four includes a central stand member 3600D at middle; four peripheral stand members, each peripheral stand member of the four peripheral stand members being fastened to the central stand member 3600D; and an electrical system 3800C being installed in the central stand member 3600D, a left peripheral stand member 3700E and a right peripheral stand member 3700E. Further detail parts and/or components in embodiment four are illustrated in FIG. 19. And the manner of using and operating the apparatus having plurality of stands in accordance with embodiment four is illustrated in FIG. 31B.

The Central Stand Member 3600D

The central stand member 3600D includes a supporting base element 3601D, a middle element 3621C, and a top element 3636C.

The supporting base element 3601D includes a base part 3646A to stand, an upper part 3647A fastened to the base part 3646A at bottom, and the circular lid 3619 fastened to top of the upper part 3647A. The upper part 3647A has a top 3613E wherein a peripheral circular feature 3614C being configured to have screw hole 3606A, screw hole 3606B and screw hole 3606C to fasten the supporting base element 3601D to the middle element 3621C. At the middle of the peripheral circular feature 3614C other circular feature 3615D having the rectangular compartment 3616B at the center is configured. The hole 3617 to mount electrical connection means connecting electrical devices on power connector board 3803B to the battery chamber 3801 is configured between the rectangular compartment 3616B and the power connector board mounting hole 3607 being configured at the outside surface 3618B of the upper part 3647A for mounting power connector board 3803B. The circular lid 3619 has the hole 3620 at center wherein an electrical connection device 3807C is mounted.

The middle element 3621C has a bottom end circular surface 3605C, an upper plug-in section 3625B and an upper circular curb 3626C. The bottom end circular surface 3605C has the screw hole 3606D, the screw hole 3606E, and the screw hole 3606F being configured to be fastened with screws respectively to the screw hole 3606A, the screw hole 3606B, and the screw hole 3606C being configured on the peripheral circular feature 3614C of the supporting base element 3601D. The upper plugging section 3625B is plugged into the bottom side of the frustum shaped component 3641 of the top element 3636C. The upper circular curb 3626C has the screw hole 3606G, the screw hole 3606H, and the screw hole 3606I being configured to be fastened with screws to the bottom circular edges of the frustum shaped component 3641 of the top element 3636C.

Between the bottom end circular surface 3605C and the upper circular curb 3626C is a middle section 3649A of the middle element 3621C wherein the left plugging hole 3631L, the front plugging hole 3631F, the right plugging hole 3631R and the rear plugging hole 3631B, each plugging hole of the four plugging holes being configured to have the circular plugging hole feature 3632 and above the circular plugging hole feature 3632 the rectangular rotational movement curbing hole 3633 so that the plugging section 3704 of a peripheral stand member 3700D or the peripheral stand member 3700E be plugged in the circular plugging hole feature 3632 and clockwise and anticlockwise movement of the plugging section 3704 be prevented by the rectangular rotational movement curbing hole 3633.

The top element 3636C includes the frustum shaped component 3641 being mounted on the upper circular curb 3626C of the middle element 3621C, and the circular shaped component 3609E having the diameter longer than the bottom inside diameter of the frustum shaped component 3641. The circular shaped component 3609E is mounted inside the frustum shaped component 3641 and fastened to the top edges of the upper plugging section 3625B of the middle element 3621C with fastening means such as screws.
The Peripheral Stand Members The four peripheral stand members are a front peripheral stand member 3700D, a rear peripheral stand member 3700D, a left peripheral stand member 3700E and a right peripheral stand member 3700E.

The front peripheral stand member 3700D and the rear peripheral stand member 3700D, each includes an integral part 3714C having a vertically elongated section wherein the top 3712 being configured to plug in the candle holder 3713B and a lower horizontally elongated section wherein the plugging section 3704 having externally threaded feature to be screwed in the nut 3721 after being plugged into the plugging hole of the middle element 3621C; and the candle holder 3713B being mounted on the top 3712 of the vertically elongated section of the integral part 3714C.

The left peripheral stand member 3700E and the right peripheral stand member 3700E, each includes an integral part 3714C having the vertically elongated section wherein the top 3712 being configured to plug in the light bulb holder 3713A, and the lower horizontally elongated section wherein the plugging section 3704 being configured to be plugged into the plugging hole of the middle element 3621C; and the light bulb holder 3713A being mounted on the top 3712 of the vertically elongated section of the integral part 3714C.
The Electrical System The electrical system 3800C of the apparatus having plurality of stands in accordance with embodiment four is installed in the central stand member 3600D, in the left peripheral stand member 3700E, and in the right peripheral stand member 3700E. The electrical system 3800C includes the power connector board 3803B; an electrical connection device 3807C; the bundle of wires 3811T; two electrical connection cords, one cord 3812 being mounted in the left peripheral stand member 3700E, and the other cord 3812 being mounted in the right peripheral stand member 3700E; and the battery chamber 3801 housing rechargeable battery 3802 being mounted in the rectangular compartment 3616B of the supporting base element 3601D.

The power connector board 3803B is mounted in the hole 3607 being configured at the vertical surface of the upper part 3647A of the supporting base element 3601D. The power connector 3806, the switch on-off button 3805, and the light dimmer switch 3804A are mounted on the power connector board 3803C.

The electrical connection device 3807C includes a six sided box 3809C at top, and the standing section 3810. The six sided box 3809C has one electrical connection plugging hole at left, and another electrical connection plugging hole at right, totally two electrical connection plugging holes. Two electrical connection cords are plugged into the electrical connection plugging holes of the six sided box 3809C in such a way that one end of each cord 3812 being connected to a light bulb holder 3713A and other end each cord 3812 being connected to an electrical connection plugging hole of the six sided box 3809C.

The bundle of wires 3811T further includes sub bundles of electrical connection wires being connected to the power connector board 3803B or to the battery through the battery chamber at one side, and to the two electrical connection plugging holes of the six sided box 3809C at other side.

Embodiment Five

Figure 20A:
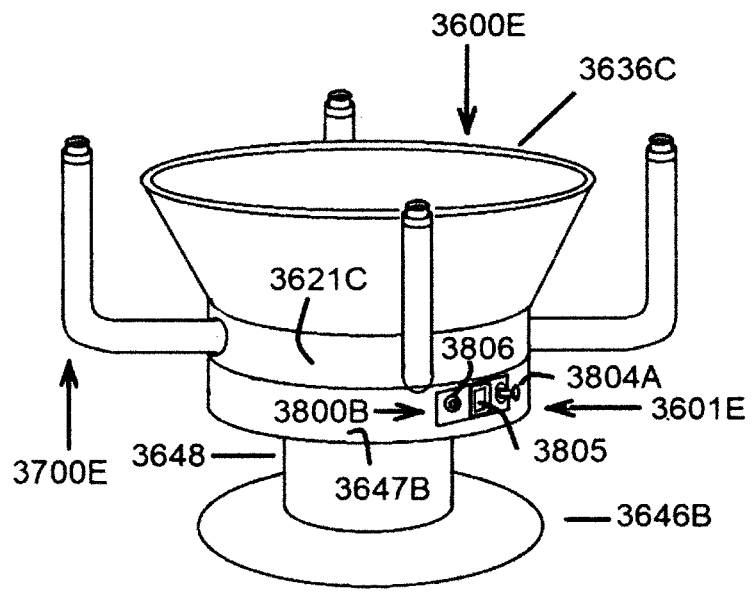
FIG. 20A shows front perspective from top view of an apparatus having plurality of stands in accordance with embodiment five.
Figure 20B:
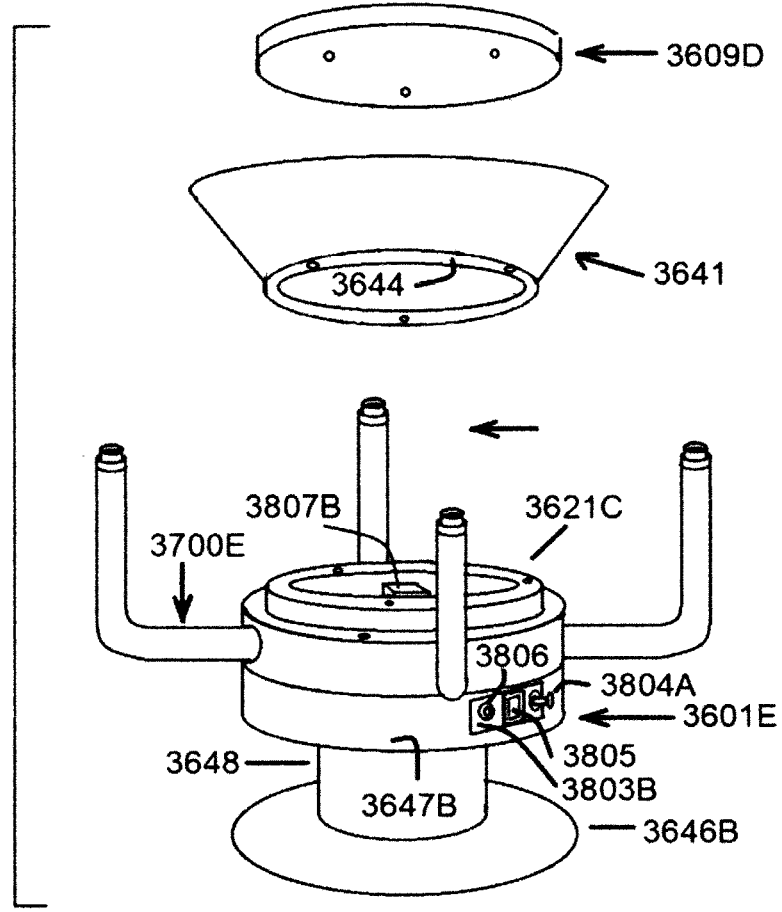
FIG. 20B shows exploded view of the apparatus having plurality of stands in accordance with embodiment five.

An apparatus having plurality of stands in accordance with embodiment five is illustrated in FIGS. 20A and 20B. The apparatus having plurality of stands in accordance with embodiment five includes a central stand member 3600E at middle; four peripheral stand members, each peripheral stand member 3700E of the four peripheral stand members being fastened to the central stand member 3600E; and the electrical system 3800B being mounted in the central stand member 3600E and in each peripheral stand member 3700E. For further illustration of detail parts or components in embodiment five see FIG. 21. And the manner of using and operating in accordance with embodiment five is illustrated in FIG. 31A.

The central stand member 3600E includes the top element 3636C, a supporting base element 3601E and the middle element 3621C.

The supporting base element 3601E has a base part 3646B to stand, a top part 3647B, and a neck part 3648 between the base part 3646B and the top part 3647B being fastened to the base part 3646B and the top part 3647B. The top part 3647B is configured to have the top 3613E. The hole 3617 to mount electrical connection wires connecting electrical devices on power connector board 3803B to the rectangular compartment 3616B is configured between the rectangular compartment 3616B and the power connector board mounting hole 3607. The power connector board mounting hole 3607 is configured at the outside vertical surface 3618B of the top part 3647B for mounting power connector board 3803B.

Embodiment Six

Figure 22:
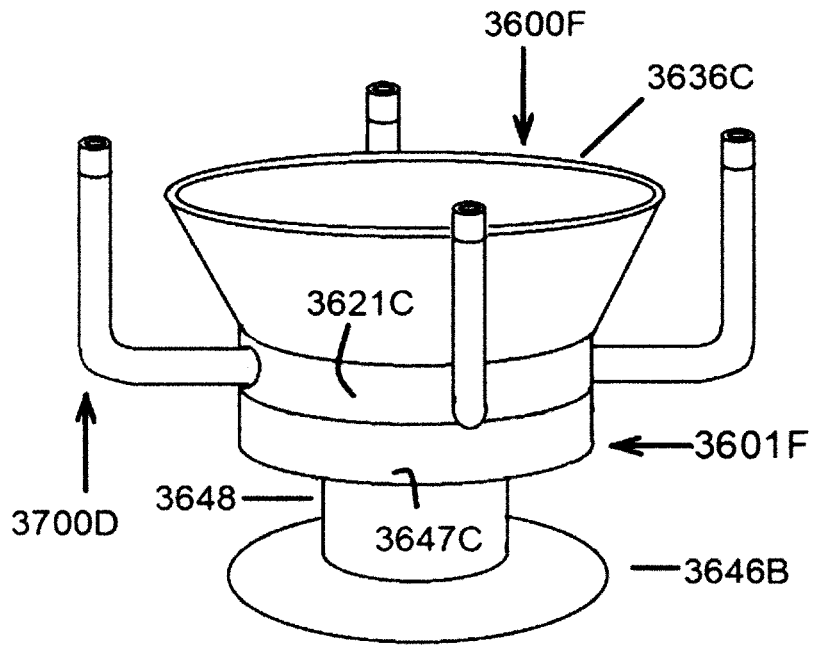

An apparatus having plurality of stands in accordance with embodiment six is illustrated in FIG. 22. The apparatus having plurality of stands in accordance with embodiment six includes a central stand member 3600F at middle; and plurality of peripheral stand members including the left peripheral stand member 3700D, the front peripheral stand member 3700D, the right peripheral stand member 3700D and the rear peripheral stand member 3700D. Each peripheral stand member 3700D of the four peripheral stand members are fastened to the central stand member 3600F.

Figure 23:
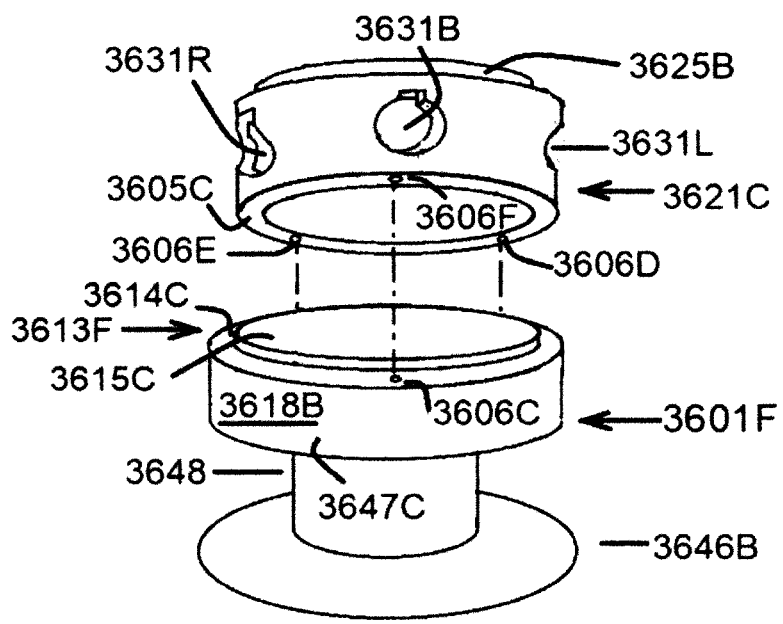

The central stand member 3600F includes the top element 3636C, a supporting base element 3601F and the middle element 3621C. The supporting base element 3601F and the middle element 3621C are shown in FIG. 23, and how they are connected is shown by projection lines in the same figure.

The supporting base element 3601F has the base part 3646B to stand, a top part 3647C, and the neck part 3648 between the base part 3646B and the top part 3647C being fastened to the base part 3646B and the top part 3647C. The top part 3647C is configured to have a top 3613F wherein a peripheral circular feature 3614C being configured to have screw hole 3606A, screw hole 3606B and screw hole 3606C to fasten the supporting base element 3601F to the middle element 3621C. At the middle of the peripheral circular feature 3614C other circular feature 3615C is configured.

Embodiment Seven

An apparatus having plurality of stands in accordance with embodiment seven is illustrated in FIG. 24. The apparatus having plurality of stands in accordance with embodiment seven includes a central stand member 3600G at the middle; plurality of peripheral stand members including a left peripheral stand member 3700F and a right peripheral stand member 3700F. Each peripheral stand member 3700F is fastened to the central stand member 3600G.

The central stand member 3600G further includes the supporting base element 3601F, the top element 3636C and a middle element 3621D. The middle element 3621C is shown in FIG. 25; and how the left peripheral stand member 3700F is connected to the middle element 3621D and to the nut 3721 is shown by projection lines of the same figure.

The middle element 3621D has the bottom end circular surface 3605C, the upper plugging section 3625B and the upper circular curb 3626C. Between the bottom end circular surface 3605C and upper circular curb 3626C is a middle section 3649B of the middle element 3621D wherein the left plugging hole 3631L at left side and the right plugging hole 3631R at right side being configured.

The left peripheral stand member 3700F includes an integral part 3714D having a middle section curved up to the left, a lower section wherein the plugging section 3704 to be plugged into the central stand member 3600G being configured, and the top 3712 being configured to plug in the candle holder 3713B; and the candle holder 3713B being mounted on the top 3712 of the integral part 3714D.

The right peripheral stand member 3700F is the right flip or the left flip of the left peripheral stand member 3700F; and includes an integral part 3714D having a middle section curved up to the right, a lower section wherein the plugging section 3704 to be plugged into the central stand member 3600G being configured, and the top 3712 being configured to plug in the candle holder 3713B; and the candle holder 3713B being mounted on the top 3712 of the integral part 3714D.

Embodiment Eight

An apparatus having plurality of stands in accordance with embodiment eight is illustrated in FIG. 26. The apparatus having plurality of stands in accordance with embodiment eight includes the central stand member 3600G at the middle; plurality of peripheral stand members including a left peripheral stand member 3700G and a right peripheral stand member 3700G. Each peripheral stand member 3700G is fastened to the central stand member 3600G.

The left peripheral stand member 3700G includes an integral part 3714E having a middle section curved up to the left then to the right, a lower section wherein the plugging section 3704 to be plugged into the central stand member 3600G being configured, and the top 3712 being configured to plug in the candle holder 3713B; and the candle holder 3713B being mounted on the top 3712 of the integral part 3714E.

The right peripheral stand member 3700G is the right flip or the left flip of the left peripheral stand member 3700G, and includes an integral part 3714E having a middle section curved up to the right then to the left, a lower section wherein the plugging section 3704 to be plugged into the central stand member 3600G being configured, and the top 3712 being configured to plug in the candle holder 3713B; and the candle holder 3713B being mounted on the top 3712 of the integral part 3714E.

Embodiment Nine

Figure 27:
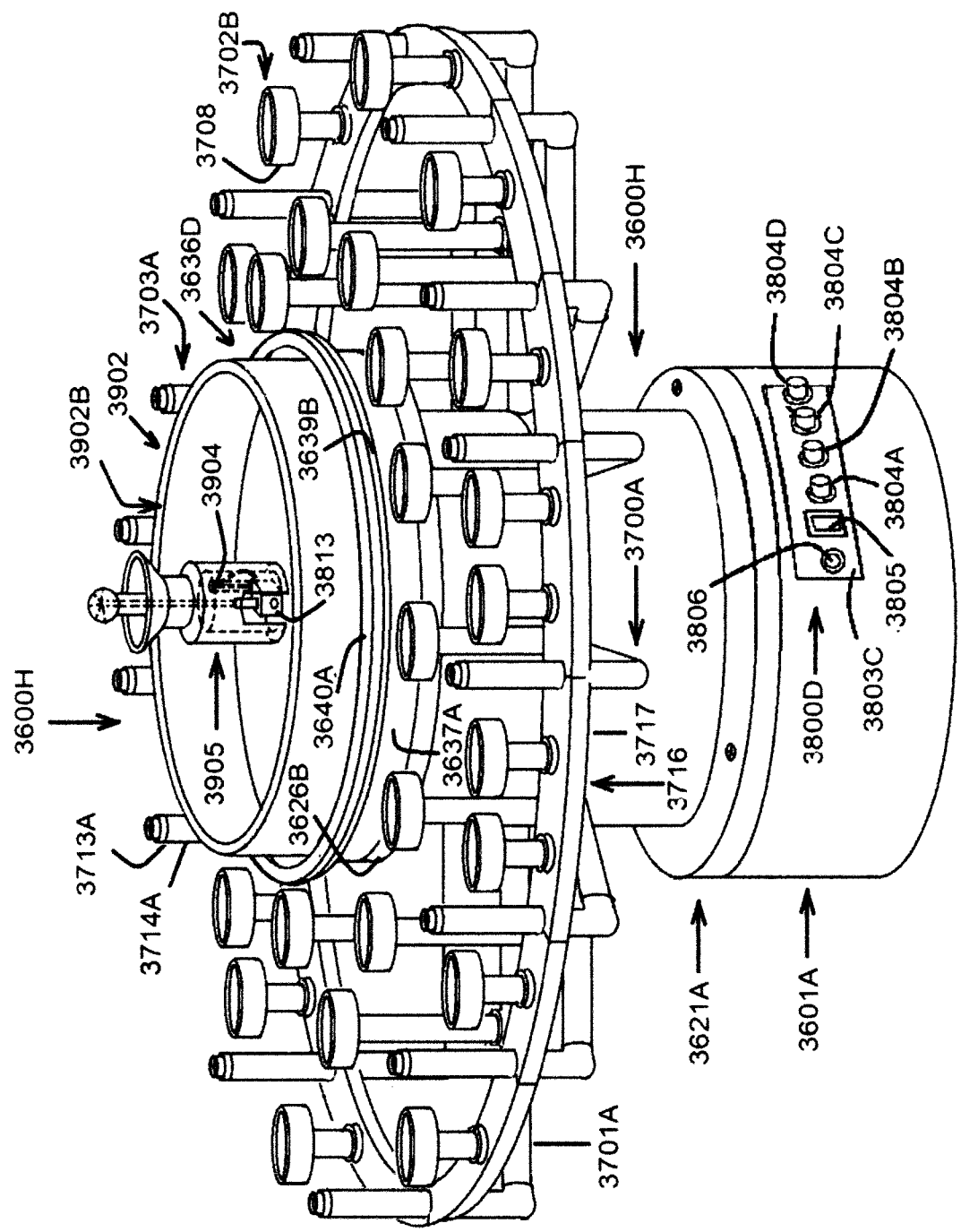

An apparatus having plurality of stands in accordance with embodiment nine is illustrated in FIG. 27. The apparatus having plurality of stands in accordance with embodiment nine includes a central stand member 3600H at middle; the plurality of peripheral stand members including the plurality of peripheral stand members wherein each peripheral stand member 3700A being illustrated in FIGS. 7A and 7B further including the horizontally elongated stand 3701A fastened to the central stand member 3600H, and the plurality of peripheral stand members wherein each peripheral stand member 3716 being illustrated in FIGS. 9A and 9B further including the horizontally curved stand 3717 mounted between and fastened to one peripheral stand member 3700A at left and other peripheral stand member 3700A at right; and an electrical system 3800D being installed in the central stand member 3600H and in the plurality of peripheral stand members wherein each peripheral stand member 3700A including the horizontally elongated stand 3701A. For further illustration of components or detail parts in embodiment nine, see FIGS. 28 and 29. And the manner of using and operating in accordance with embodiment nine is illustrated in FIG. 30D.

The central stand member 3600H includes the supporting base element 3601A for standing, the middle element 3621A illustrated from FIGS. 4A to 4C and mounted on the supporting base element 3601A, and a top element 3636D mounted on the middle element 3621A.

The top element 3636D includes the cylindrical component 3637A, a top component 3638B and a fountain component 3902.

The top component 3638B includes a circular subcomponent 3639B wherein a hole 3650A is configured at middle, the circular subcomponent 3639B being mounted horizontally on and fastened to the top circular edge 3605C of the cylindrical component 3637A, and to the side of the opened down plugging feature 3611B the circular feature 3615B being configured for mounting the upper plugging section 3625B of the middle element 3621A; and the cylindrical sub component 3640A mounted on top periphery of the circular sub component 3639B.

Figure 29:
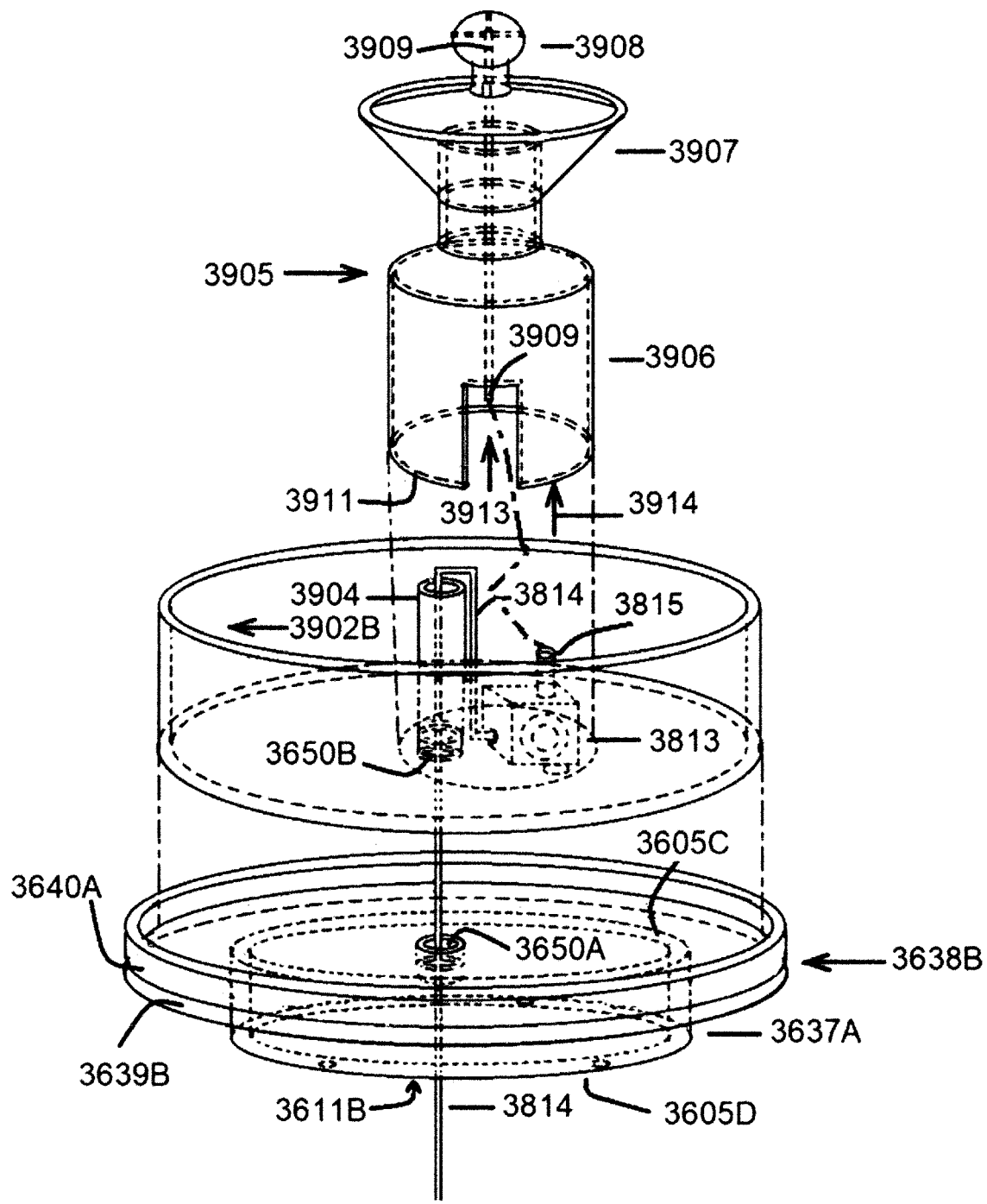

The fountain component 3902 is mounted on the top component 3638B and includes a water bowl 3902B wherein a hole 3650B is configured at middle for mounting a cord tube 3904; an apparatus 3905 having a water tube 3909 inside, and being mounted on a standing space 3912 at middle of the water bowl 3902B; see FIG. 29.

The apparatus 3905 has a lower part 3906, a middle part 3907, the top part 3908 and the water tube 3909. The lower part 3906 has a cutout space 3913, a bottom 3911 to stand on the standing space 3912, and inside hollow space 3914 being configured for housing a water pumping device 3813 and the cord tube 3904 mounted on the water bowl 3902B. The middle part 3907 has a tier or level being configured. The top part 3908 has a ball like feature. The water tube 3909 is configured inside middle of the apparatus 3905, and connected to the top part 3908 at top and the water tube 3815 of the water pumping device 3813 at bottom.

The electrical system 3800D is installed in the central stand member 3600H and in each peripheral stand member 3700A. The electrical system 3800D includes a power connector board 3803C; an electrical connection device 3807D; a bundle of wires 3811U; fourteen electrical connection cords, each electrical connection cord 3812 of the fourteen cords being mounted in each peripheral stand member 3700A; a water pumping device 3813; and an electrical connection cord 3814 connected to the electrical connection device 3807D and the water pumping device 3813.

The power connector board 3803C is mounted in the hole 3607 being configured at the outside vertical surface 3603A of the cylindrical component 3602A. The power connector 3806, the switch on-off button 3805, the light dimmer switch 3804A, the light dimmer switch 3804B, the light dimmer switch 3804C, and a fountain switch 3804D are mounted on the power connector board 3803C.

The electrical connection device 3807D includes a six sided box 3809D and the standing part 3810. The six sided box 3809D has three left electrical connection plugging holes at left side, three right electrical connection plugging holes at right side, four front electrical connection plugging holes at front side, four rear electrical connection plugging holes at rear side, one electrical connection plugging hole at top, totally fifteen electrical connection plugging holes, and internally threaded screw hole at bottom.

fourteen electrical connection cords are mounted in the peripheral stand members in such a way that an electrical connection cord 3812 is mounted in a peripheral stand member 3700A; one end of an electrical connection cord 3812 is plugged into a light bulb holder 3713A mounted on the vertically elongated part 3714A; and by passing through the vertically elongated part 3714A and the horizontally elongated stand 3701A other end of an electrical connection cord 3812 is plugged into an electrical connection plugging hole of the six sided box 3809D.

The standing part 3810 has inside hollow space for mounting the bundle of wires 3811U; the bottom section 3808A mounted in the circular lid 3619, see FIG. 21; and a top section 3808B mounted in the bottom side of the six sided box 3809D.

The bundle of wires 3811U further includes the sub bundle of electric connection wires 3811A, the sub bundle of electric connection wires 3811B, the sub bundle of electric connection wires 3811C, the sub bundle of electric connection wires 3811D, and a sub bundle of electric connection wires 3811G. The sub bundles of electrical connection wires are connected to the power connector board 3803C at one side and to the electrical connection plugging holes of the six sided box 3809D at other side. Each sub bundle of electrical connection wires comprises wires connected to opposite electrical connections being covered and separated by insulating material.

The sub bundle of electric connection wires 3811A is connected at one end to the power connector 3806 of the power connector board 3803C and at other end to the fifteen electrical connection plugging holes of the six sided box 3809D being connected to the sub bundle of electric connection wires 3811B, the sub bundle of electric connection wires 3811C, the sub bundle of electric connection wires 3811D and the sub bundle of electric connection wires 3811G in accordance with electric connection circuit system.

The sub bundle of electric connection wires 3811G is connected at one end to the fountain switch 3804D of the power connector board 3803C and at other end to the electrical connection plugging hole configured at the top side of the six sided box 3809D. The fountain switch 3804D is configured on the power connector board 3803C to switch on-off electrical connection between the sub bundle of electrical connection wires 3811G and the cord 3814 being connected to the top electrical connection plugging hole of the six sided box 3809D wherein the sub bundle of electrical connection wires 3811G being connected; or to increase or decrease the power of water pumping of the water fountain pumping device 3813 electrically connected to the cords 3814 being connected to the top electrical connection plugging hole of the six sided box 3809D wherein the sub bundle of electrical connection wires 3811G being connected.

The water pumping device 3813 is mounted on the water bowl 3902B and inside the apparatus 3905, and has an electric connection means to be connected to the electrical connection cord 3814 and a water tube 3815 to be connected to the water tube 3909 of the apparatus 3905.

The electrical connection cord 3814 is connected to the water fountain pumping device 3813 at one end. The electrical connection cord 3814 being mounted through the cord tube 3904 plugged in the hole 3650B of the water bowl 3902B, and through the hole 3650A of the circular subcomponent 3639B, it is plugged into a top electrical connection plugging hole of the six sided box 3809D at other end.

Figure 28:
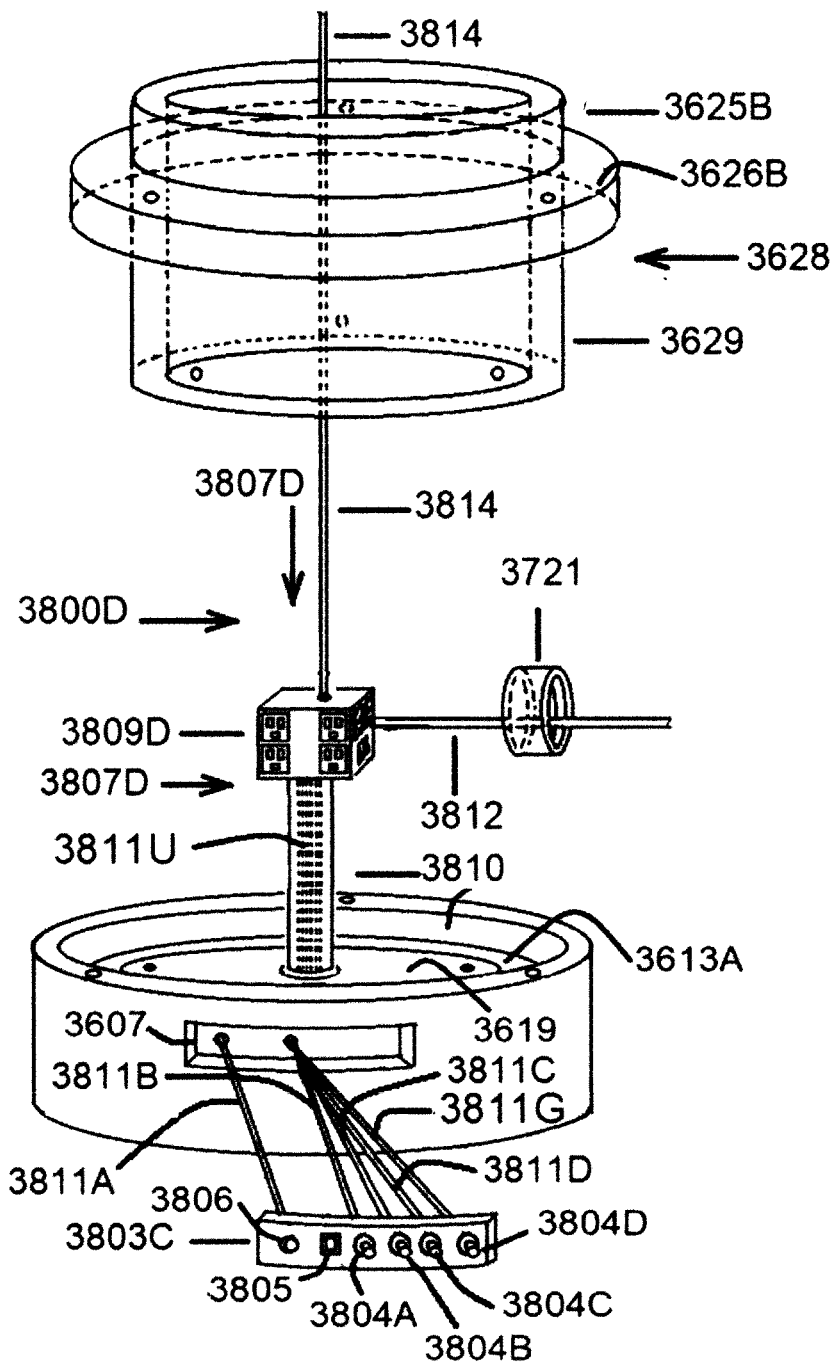

FIG. 28 shows the electrical connection cord 3814 and the electrical connection cord 3812 at one end being connected to parts of the electrical system 3800D installed in the supporting base element 3601A; the electrical connection cord 3814 passing through the upper part 3628 of the middle element 3621A and the electrical connection cord 3812 passing through the nut 3721. FIG. 29 shows the electrical connection cord 3814 passing through the hole 3650A of the circular subcomponent 3639B, the cord tube 3904 being mounted in the hole 3650B of the water bowl 3902B and connected to the water fountain pumping device 3813 at another end. FIG. 8 also provides more detail how an electrical connection cord 3812 is mounted through a peripheral stand member 3700A and connected to other parts at its two ends.

Operation and Manner of Using from Embodiment Two to Embodiment Nine

The manner of using and operating the apparatus having plurality of stands in accordance with embodiment nine is similar to the manner of using and operating the apparatus having plurality of stands in accordance with embodiment one except that embodiment nine has water pumping operation and water fountain decoration thereof as illustrated in FIG. 30D.

The top element 3636D includes the cylindrical component 3637A, the top component 3638B and the fountain component 3902. The circular sub component 3639B of the top component 3638B has the hole 3650A being configured at the center to mount the electrical connection cord 3814 being connected to the top electrical connection plugging hole of the six sided box 3809D. The fountain component 3902 is mounted on the top component 3638B. And the water bowl 3902B of the fountain component 3902 is filled with water thereby a water reservoir 3910 is created.

The apparatus 3905 has the lower part 3906 having the cutout space 3913 to allow water pass in from reservoir 3910 for pumping. The water tube 3909 is configured inside the apparatus 3905 to be connected to the water tube 3815 of the water pumping device 3813 at bottom and to the top part 3908 at top for water pump up. The middle part 3907 of the apparatus 3905 has the tier or level at outside being configured for holding water flowing from the top part 3908 and allowing water flowing down to water reservoir 3910. The top part 3908 of the apparatus 3905 has the ball like feature being configured for water distribution being pumped up through the water tube 3909.

The water pumping device 3813 having the electric connection means being connected to the electrical connection cord 3814, and the water tube 3815 being connected to the water tube 3909 of the apparatus 3905 pumps up water from the water reservoir 3910 by switching on the fountain switch 3804D mounted on the power connector board 3803C for water pumping operation and water fountain decoration.

The manner of using and operating the apparatus having plurality of stands in accordance with embodiment two is similar to the manner of using and operating the apparatus having plurality of stands in accordance with embodiment one except that embodiment two has no built in electrical system for lighting light bulbs. Instead embodiment two has plurality of candles mounted on plurality of vertically elongated stands in such a way that each candle 3903B is mounted on a candle holder 3713B being mounted on a vertically elongated stand 3703B of a candle holder 3713B so that the candles be lighted to give light decoration.

With respect to the apparatus having plurality of stands in accordance with embodiment three, embodiment four, embodiment five, embodiment six, embodiment seven or embodiment eight a flowerpot 3900B having flowers is mounted on top of a top element of a central member.

In case of embodiment three and embodiment five a light bulb 3903A is mounted on a light bulb holder 3713A of each peripheral stand member. A battery charger 3816B being removably connected to the inlet of electric power supply 3817 is connected to the power connector 3806 being mounted in the power connector board 3803B to charge the rechargeable battery 3802 with power by switching on the switch on-off button 3805. A light bulb 3903A is mounted on a light bulb holder 3713A of each peripheral stand member being mounted at top 3712. And by switching on the light dimmer switch 3804A the apparatus having plurality of stands in accordance with either embodiment can provide a flower decoration combined with plurality of electric bulb light decorations having the same color or plurality of light colors.

In case of embodiment six, embodiment seven and embodiment eight, by mounting a candle 3903B on a candle holder 3713B of each peripheral stand member and by lighting each candle 3903B, a candle 3903B on a candle holder 3713B being mounted on top 3712 of each peripheral stand member can provide light so that the apparatus having plurality of stands in accordance with either embodiment can provide a flower decoration combined with plurality of candle light decorations.

In case of embodiment four one light bulb 3903A is mounted on the light bulb holder 3713A of the left peripheral stand member 3700E and another light bulb 3903A is mounted on the light bulb holder 3713A of the right peripheral stand member 3700E. The battery charger 3816B being removably connected to the electric power supply 3817 is connected to the power connector 3806 being mounted in the power connector board 3803B to charge the rechargeable battery 3802 with power by switching on the switch on-off button 3805. Each light bulb 3903A provides light by switching on the light dimmer switch 3804A. One candle 3903B is mounted on the candle holder 3713B of the front peripheral stand member 3700D and another candle 3903B is mounted on the candle holder 3713B of the rear peripheral stand member 3700D. And by lighting each candle 3903B, a candle 3903B on a candle holder 3713B mounted on top 3712 of each peripheral stand member 3700D provides light. Therefore, the apparatus having plurality of stands in accordance with embodiment four provides a flower decoration combined with plurality of candlelight and electric bulb light decorations.

An apparatus having plurality of stands in accordance with embodiment three, embodiment four, embodiment five, embodiment six, embodiment seven or embodiment eight, having bigger size can be used on a floor. An apparatus having plurality of stands in accordance with embodiment three, embodiment four, embodiment five, embodiment six, embodiment seven or embodiment eight, having smaller size can be used on a table as illustrated in FIGS. 31A and 31B

A decorator of ceremonies such as a party, a wedding or other events may use plurality of apparatuses each having plurality of stands of different embodiments thereby increasing the diversity of decoration to large extent and having more decoration view therefrom.

Conclusion and Ramifications

Thus the reader will see that an apparatus having plurality of stands of various embodiments can be used for holding plurality of items or objects of different purposes or utilities such as decorative items. For example an apparatus having plurality of stands wherein plurality of decorative objects being mounted on plurality of stands can be used for decorating indoor or outdoor tables or spaces at home or public service places such as restaurants and hotels, or for decorating places of parties, wedding or other ceremonies.

While my above description contains many specificities, these should not be construed as limitations on the scope, but rather as exemplification of several embodiments thereof. Many other variations are possible. An apparatus having plurality of stands may have an embodiment with an integral central stand member, or a supporting base element and a middle element be one integral part or a middle element and a top element may constitute one integral part and configuration be made accordingly. Or a central stand member may further include a supporting base element, a middle element and a top element, each element having different configurations or other shapes such as frustum, prism or cylindrical. Or each element of a central stand member may have an integral part having cylindrical, frustum, prism, cylindrical or other shapes. Or each element of a central stand member may further include separate sub components having features or configurations to be connected to other sub component and/or for installing device of an electric system.

An apparatus having plurality of stands may have an embodiment with two or more peripheral stand members, each peripheral stand member having similar configuration, shape or size, or each peripheral stand member having configurations, shape or size different from configurations, shape or size of another peripheral stand member or other peripheral stand members. An apparatus having plurality of stands may have an embodiment with two or more peripheral stand members, each peripheral stand member being one integral part, or some peripheral stand members each having one integral part and other peripheral stand members each having separable connected parts or further sub components.

A top element of a central stand member or a flowerpot holder of a peripheral stand member may be configured to mount on it a light bulb, a flowerpot or another item of either decorative utility or of different utility instead of a flowerpot or a light bulb. For example, a light bulb holder or a candle holder of a peripheral stand member may be configured to mount on it a flowerpot or another item of either decorative utility or of different utility instead of a light bulb or a candle; and/or a top element of a central stand member may be configured to mount on it a light bulb, a candle or another item of either decorative utility or of different utility instead of a flowerpot.

The Apparatus Having Plurality of Stands Wherein a Peripheral Table is Configured The above first sub section deals with the detailed description of the apparatus having plurality of stands being illustrated from FIGS. 1 to 31B and being exemplified by specificities from embodiment one to embodiment nine, and further having various embodiments as described in the conclusion and ramifications description. Following is the second sub section dealing with detailed description of the apparatus having plurality of stands wherein a peripheral table is configured. One embodiment of various embodiments detailed in this second sub section is illustrated from FIGS. 32 to 35.

Figure 32:
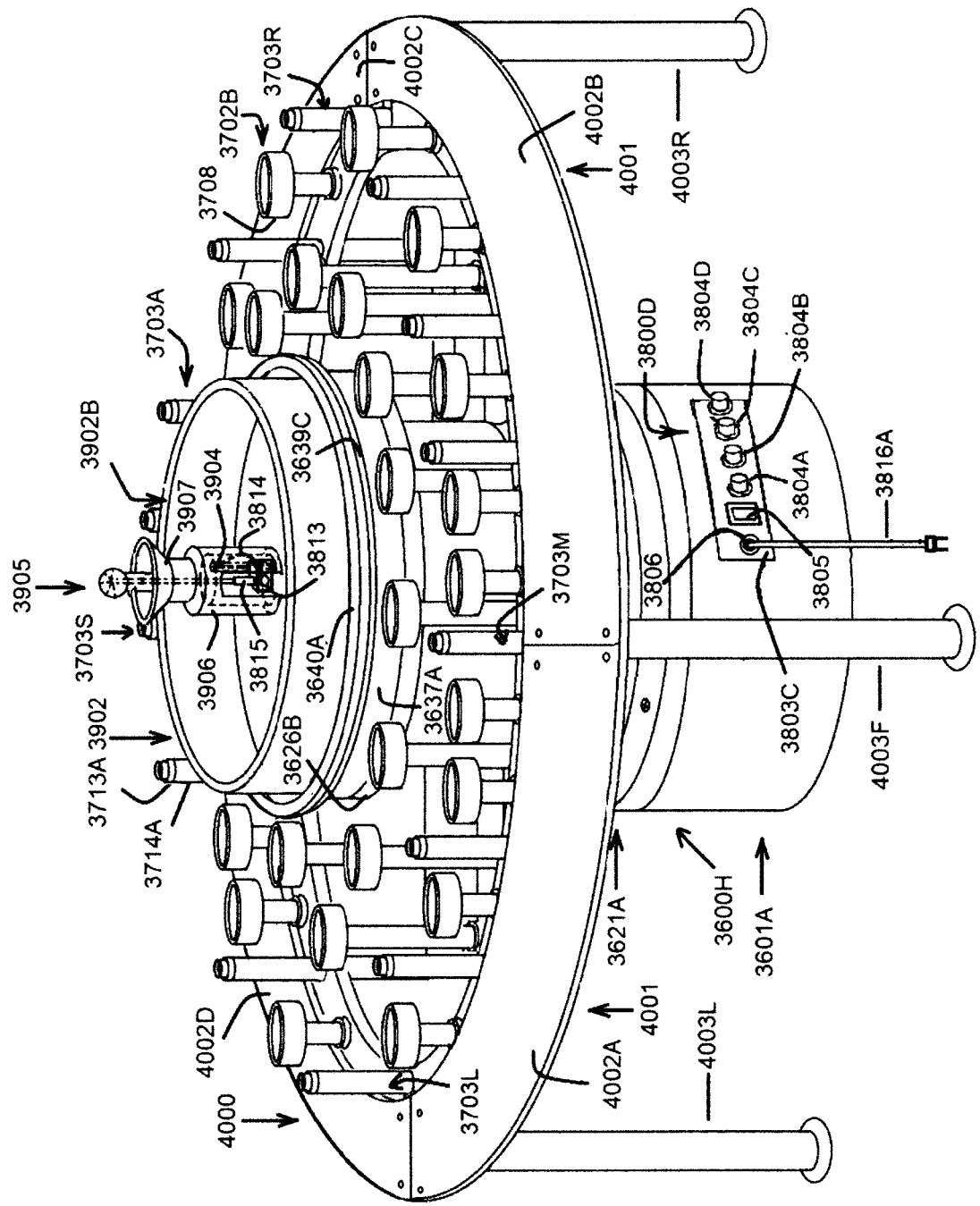
FIGS. 32 to 35 show one embodiment of an apparatus having plurality of stands wherein a peripheral table is configured, and components and/or parts thereof.

One embodiment of the apparatus having plurality of stands wherein the peripheral table being configured is illustrated in FIG. 32; and includes an apparatus having plurality of stands element and a peripheral table 4000 element. Components and/or parts of one embodiment of the apparatus having plurality of stands wherein the peripheral table being configured and illustrated in FIG. 32 are shown from FIGS. 33 to 35.

Figure 33:
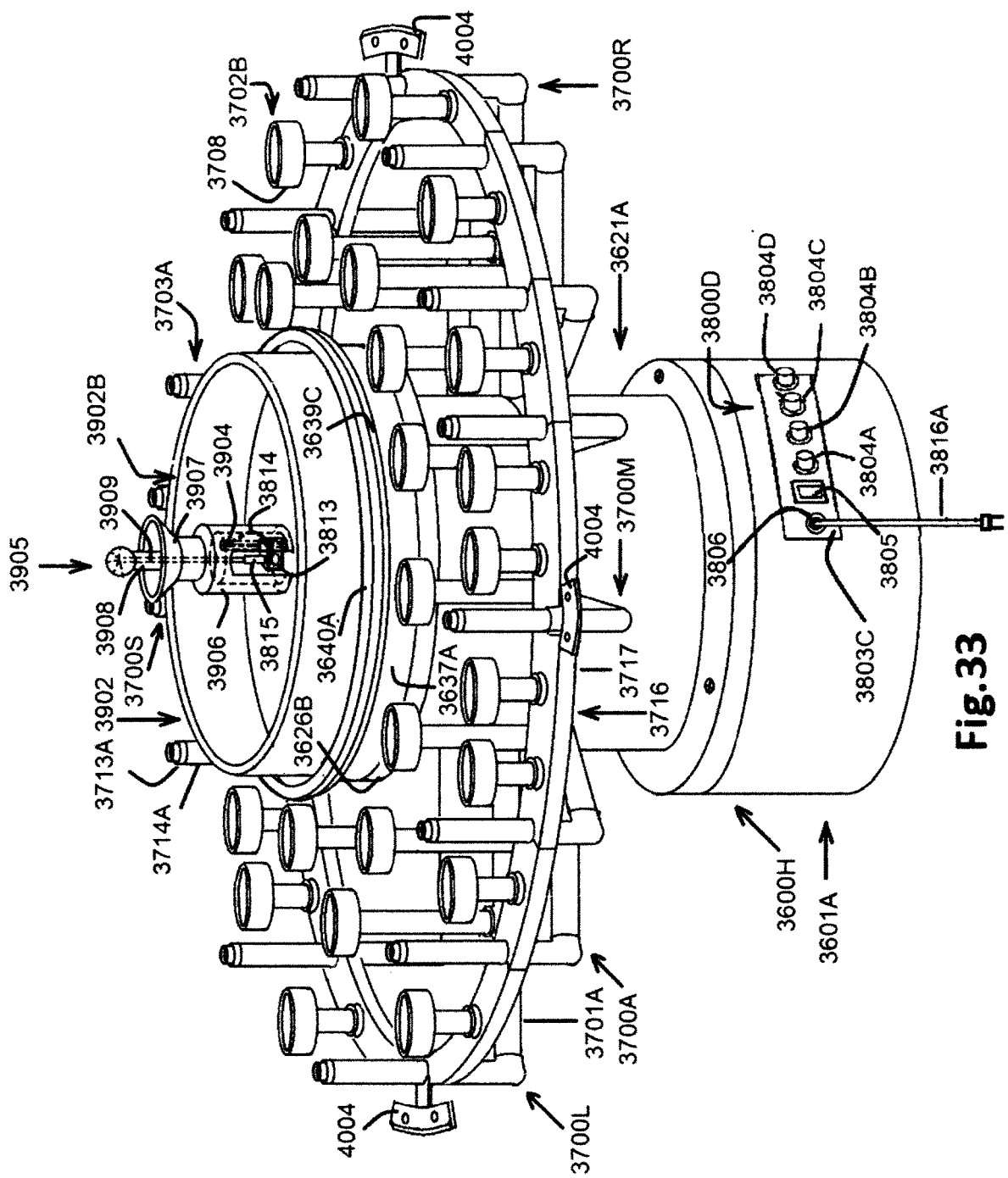

The apparatus having plurality of stands element in accordance with one embodiment is illustrated in FIG. 33, and includes the central stand member 3600H at middle; the plurality of peripheral stand members including the plurality of peripheral stand members each having the horizontally elongated stand 3701A fastened to the central stand member 3600H, and the plurality of peripheral stand members wherein each peripheral stand member 3716 being illustrated in FIGS. 9A and 9B mounted between and fastened to one peripheral stand member having the horizontally elongated stand 3701A at left and other peripheral stand member having the horizontally elongated stand 3701A at right; and the electrical system 3800D being installed in the central stand member 3600H and in the plurality of peripheral stand members wherein each peripheral stand member having the horizontally elongated stand 3701A.

Included in the plurality of peripheral stand members each having a horizontally elongated stand 3701A are plurality of peripheral stand members wherein each peripheral stand member 3700A being illustrated in FIGS. 7A and 7B, a left peripheral stand member 3700L, a front peripheral stand member 3700M, a right peripheral stand member 3700R and a rear peripheral decoration stand member 3700S.

The left peripheral stand member 3700L, the front peripheral stand member 3700M, the right peripheral stand member 3700R and the rear peripheral stand member 3700S, each includes a horizontally elongated stand 3701A, a mini flowerpot stand 3702A mounted on a middle section 3706 of a horizontally elongated stand 3701A, and a vertically elongated stand of a light bulb plugged into a plugging hole section 3705 of a horizontally elongated stand 3701A.

A vertically elongated stand 3703L of light bulb of the left peripheral stand member 3700L, a vertically elongated stand 3703M of light bulb of the front peripheral stand member 3700M, a vertically elongated stand 3703R of light bulb of the right peripheral stand member 3700R and a vertically elongated stand 3703S of light bulb of the rear peripheral stand member 3700S, each includes a light bulb holder 3713A, a vertically elongated part 3714A and a holder being mounted at middle of a vertically elongated part 3714A.

A holder 3715B of the vertically elongated stand 3703L, a holder 3715C of the vertically elongated stand 3703M, a holder 3715D of the vertically elongated stand 3703R and a holder 3715E of the vertically elongated stand 3703S, each has sub holders named a left holder 3715L configured at bottom left to hold left horizontally curved stand 3717, a right holder 3715R configured at bottom right to hold right horizontally curved stand 3717, and a table top holder 4004 configured at top to hold a table top 4001 of the peripheral table 4000.

The peripheral table 4000 element is mounted at peripheral parts of the apparatus having plurality of stands element. The peripheral table 4000 includes plurality of table legs, and a table top 4001 being mounted at and fastened to plurality of table legs and peripheral parts of the apparatus having plurality of stands element illustrated in FIG. 33.

The table top 4001 is fastened to the table top holder 4004 of the holder 3715B and a left table leg 4003L at left, the table top holder 4004 of the holder 3715C and a front table leg 4003F at front, the table top holder 4004 of the holder 3715D and a right table leg 4003R at right, and the table top holder 4004 of the holder 3715E and a rear table leg 4003B at rear.

The table top 4001 of the peripheral table 4000 has a left front quadrant peripheral table top 4002A, a right front quadrant peripheral table top 4002B, a right rear quadrant peripheral table top 4002C and a left rear quadrant peripheral table top 4002D. These four quadrant peripheral table tops and the projection lines showing how these quadrant peripheral table tops are mounted on and fastened to table legs and peripheral parts of the apparatus having plurality of stands are illustrated in FIG. 34.

Figure 34:
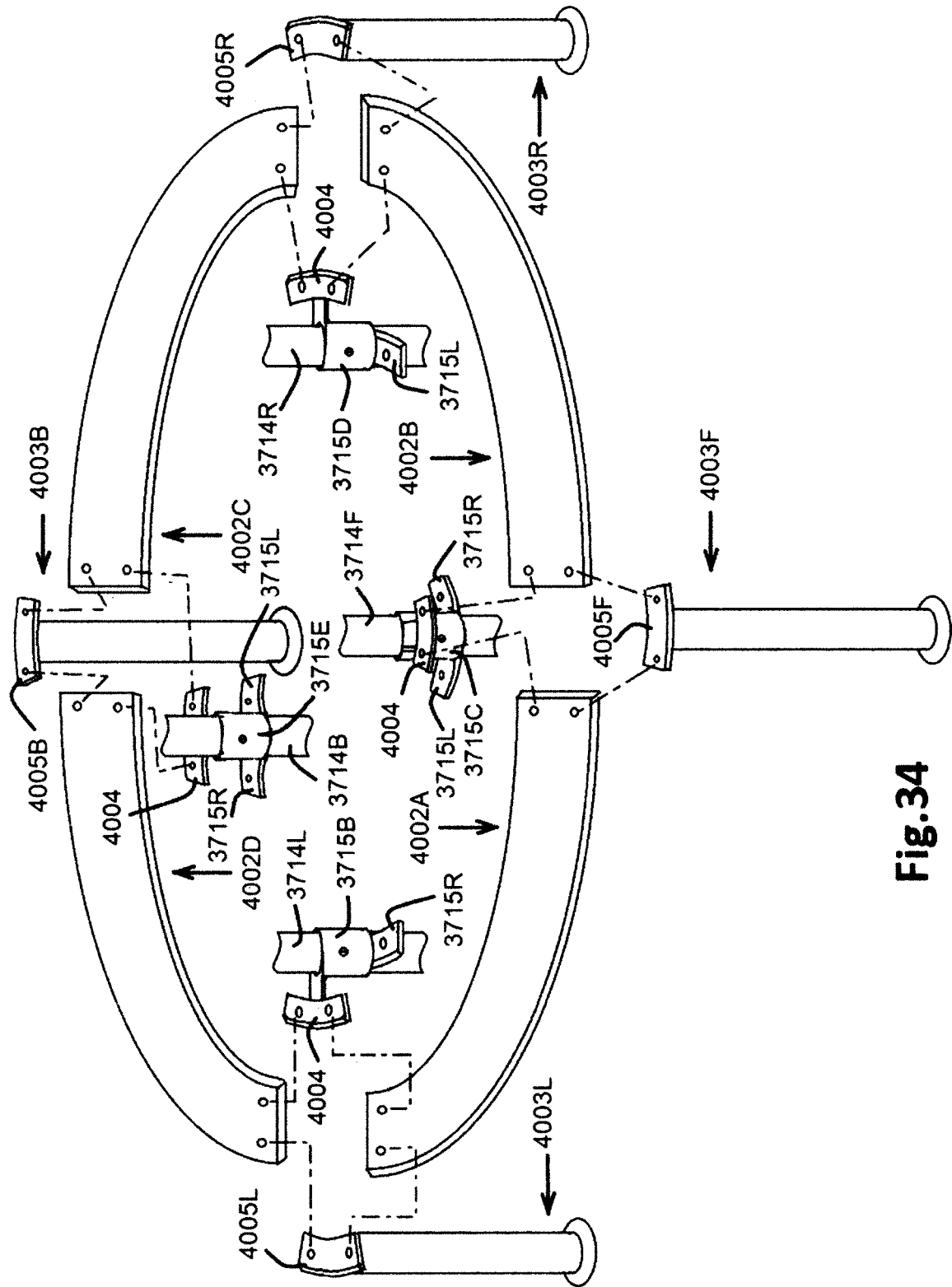

Further in FIG. 34 parts shown by reference characters 3714L, 3714F, 3714R and 3714B refer to cutout middle sections of the vertically standing part 3714A of the left peripheral stand member 3700L, the front peripheral stand member 3700M, the right peripheral stand member 3700R and the rear peripheral stand member 3700S respectively. A holder wherein the horizontally curved stand holders at bottom and a table top holder at top being configured is mounted at each cutout middle section of a vertically standing part 3714A.

The left front quadrant peripheral table top 4002A and the left rear quadrant peripheral table top 4002D are fastened to the table top holder 4004 of the holder 3715B of the vertically elongated stand 3703L and to a table top holder 4005L of the left table leg 4003L. The left front quadrant peripheral table top 4002A and the right front quadrant peripheral table top 4002B are fastened to the table top holder 4004 of the holder 3715C of the vertically elongated stand 3703M and to a table top holder 4005F of the front table leg 4003F. The right front quadrant peripheral table top 4002B and the right rear quadrant peripheral table top 4002C are fastened to the table top holder 4004 of the holder 3715D of the vertically elongated stand 3703R and to a table top holder 4005R of the right table leg 4003R. The right rear quadrant peripheral table top 4002C and the left rear quadrant peripheral table top 4002D are fastened to the table top holder 4004 of the holder 3715E of the vertically elongated stand 3703S and to a table top holder 4005B of the rear table leg 4003B.

Operation and Manner of Using

Figure 35:
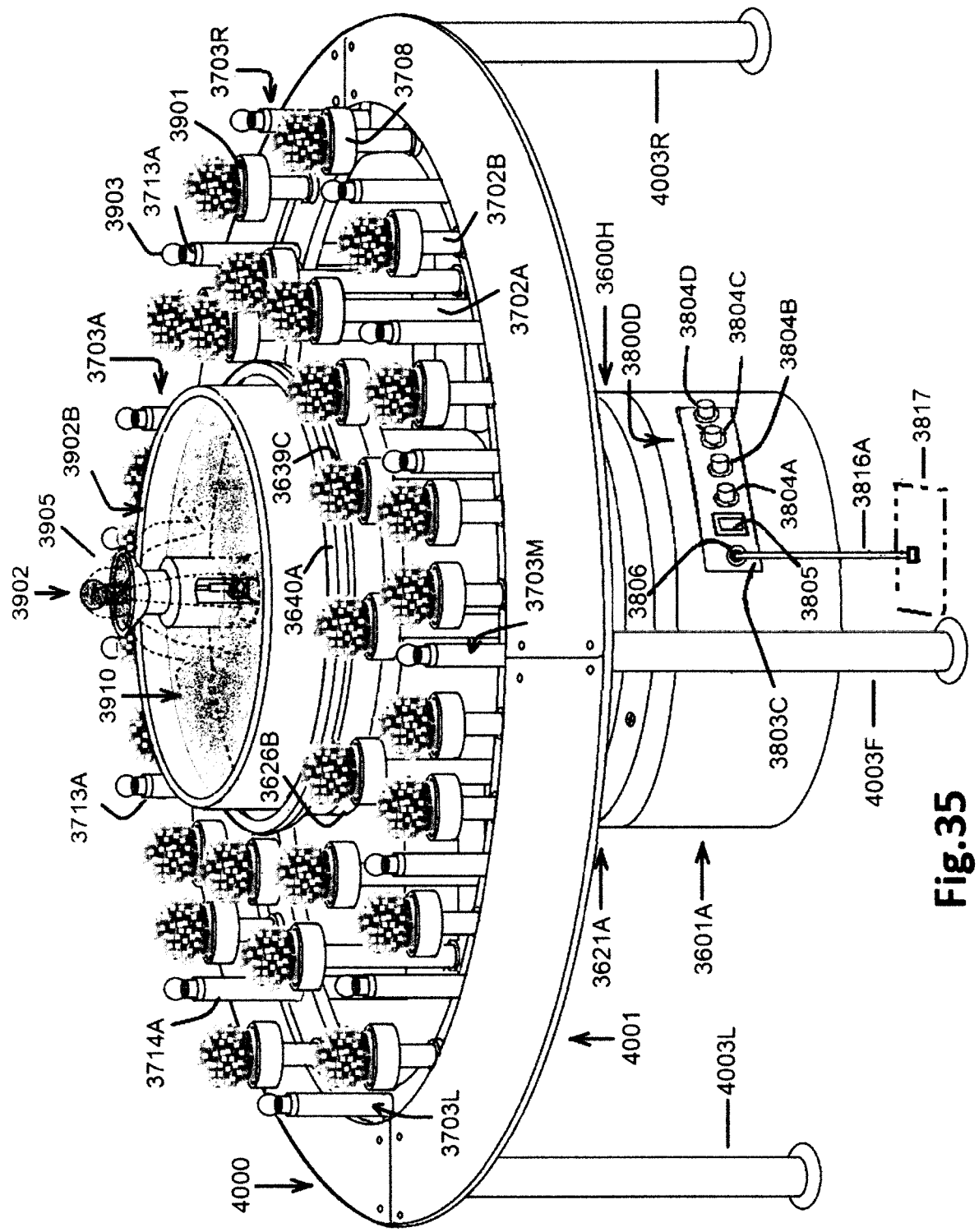

The manner of using and operating the apparatus having plurality of stands wherein a peripheral table is configured in accordance with one embodiment described in this second sub section is similar to the manner of using and operating the apparatus having plurality of stands in accordance with embodiment nine described in the first sub section except that the apparatus having plurality of stands wherein a peripheral table is configured further provides utility as a table provides; see FIG. 35.

Conclusion and Ramifications

The apparatus having plurality of stands wherein a peripheral table is configured may have other embodiments. The peripheral table may have one integral table top or a plurality of separable parts connected together to make a table top circumscribing an apparatus having plurality of stands of either embodiment described in the first sub section from embodiment one to embodiment nine or in the conclusion and ramifications description of the apparatus having plurality of stands, thereby having shapes, configurations and/or features accordingly.

For example, an integral table top or plurality of separable parts connected together to make a table top being mounted on the plurality of peripheral table top holders can have different shapes such as a circular, a rectangular, a pentagonal or a hexagonal and features configured accordingly; and/or an integral table top, or plurality of separable parts being connected together to create a table top and being mounted on the plurality of peripheral table top holders may not have legs where peripheral table top holders are enough to hold and support securely. The peripheral table top holder or the plurality of peripheral table top holders may be configured either to be fastened to the central stand member or to be fastened to the peripheral stand member. Or each peripheral table top holder of the plurality of peripheral table top holders may be configured either at the peripheral stand members wherein each peripheral stand member having the horizontally elongated stand or at the peripheral stand members wherein each peripheral stand member having the horizontally curved stand.

Scope

For the sake of completeness, it should be noted that in the above descriptions and in claims of an apparatus having plurality of stands and an apparatus having plurality of stands wherein a peripheral table is configured "including" and "having" do not exclude the possibility of other elements or means. And the meaning of "an" or "a" in the above descriptions and in claims of an apparatus having plurality of stands and an apparatus having plurality of stands wherein a peripheral table is configured may show singularity or may include the possibility of plurality either jointly or severally; and the meaning of "the" in above descriptions and in following claims referring to an object or matter shown by "an" or "a" should be construed in the context accordingly. It should further be noted that features or means in claims may include other means or features not limited to features or means mentioned in above-described embodiments.

Furthermore, illustrations by figures should not be construed as limitations of the scope. The scope emphasizes the possibility of many other variations. Therefore, in case of an apparatus having plurality of stands and/or an apparatus having plurality of stands wherein a peripheral table is configured the scope of embodiments should be determined not by the examples, but by the appended claims and their legal equivalents.

The invention claimed is:

1. An apparatus having plurality of stands including:
   a central stand member at middle further including:
      a top element wherein features configured at top for holding objects such as flowerpot, water bowl or water fountain apparatus, and wherein features being configured at bottom for mounting said top element on a middle element;
      a supporting base element wherein a base is configured for standing and a top is configured for mounting the middle element;
      the middle element between the top element and the supporting base element, said middle element including:
         a lower part having a lower section, an upper part mounting section and a belt mounting section between said lower section and said upper part mounting section; said lower section is configured for being mounted on top of the supporting base element; said belt mounting section having inside and outside vertical surfaces wherein a plurality of plugging holes are configured for mounting a plurality of peripheral stand members,
         an outer belt being mounted at outside vertical surface of the belt mounting section of the lower part for mounting plurality of peripheral stand members; said outer belt having plurality of plugging holes, each plugging hole of said plurality of plugging holes being configured for curbing clockwise and anticlockwise movement of said peripheral stand member,
         an inner belt being mounted at inside vertical surface of the belt mounting section of the lower part, said inner belt having a plurality of plugging holes, each plugging hole of said plurality of plugging holes being configured for mounting a peripheral stand member,
         an upper part being mounted on upper part mounting section of the lower part above the belt mounting section, and being configured at top for mounting the top element; and
   a plurality of peripheral stand members fastened to the middle element of the central stand member, each peripheral stand member of the plurality of peripheral stand members including:
      a horizontally elongated stand being configured for mounting a vertically elongated stand or plurality of vertically elongated stands, said horizontally elongated stand having two ends, one end of said horizontally elongated stand being configured to be fastened to the outer belt, belt mounting section and inner belt of the middle element of the central stand member and another end of said horizontally elongated stand being configured to be fastened to a vertically elongated stand, and a vertically elongated stand or plurality of vertically elongated stands being mounted on the horizontally elongated stand; each said vertically elongated stand having two ends, one end of said vertically elongated stand being configured for being mounted on the horizontally elongated stand, and another end of said vertically elongated stand being configured for holding an item such as a light bulb, a candle, a flowerpot, or another decorative or nondecorative object.

2. The apparatus having plurality of stands of claim 1, wherein plurality of peripheral stand members further configured to include plurality of horizontal stands such as plurality of horizontally curved stands each being configured for mounting a vertically elongated stand or plurality of vertically elongated stands and wherein a vertically elongated stand or plurality of vertically elongated stands being mounted accordingly; each of said plurality of horizontal stands having two ends, one end being configured to be fastened to a part of one peripheral stand member at one side and another end being configured to be fastened to a part of another peripheral stand member at another side.

* * * * *